US008755372B2

(12) United States Patent
Fried et al.

(10) Patent No.: US 8,755,372 B2
(45) Date of Patent: Jun. 17, 2014

(54) SECURE CUSTOMER SERVICE PROXY PORTAL

(75) Inventors: Lance Fried, Aventura, FL (US); Joseph Katz, Atlanta, GA (US); Edwin Kenneth Margulies, Henderson, NV (US)

(73) Assignee: Five9, Inc., San Ramon, CA (US)

( * ) Notice: Subject to any disclaimer, the term of this patent is extended or adjusted under 35 U.S.C. 154(b) by 275 days.

(21) Appl. No.: 12/767,544

(22) Filed: Apr. 26, 2010

(65) Prior Publication Data
US 2011/0110364 A1 May 12, 2011

Related U.S. Application Data

(60) Provisional application No. 61/173,048, filed on Apr. 27, 2009.

(51) Int. Cl.
G06F 15/16 (2006.01)
(52) U.S. Cl.
USPC .......................................... 370/352; 709/203
(58) Field of Classification Search
USPC ......... 370/352, 389, 400, 401, 428, 465, 466, 370/467; 709/203, 220, 224, 227, 330
See application file for complete search history.

(56) References Cited

U.S. PATENT DOCUMENTS

| 4,585,906 | A | 4/1986 | Matthews et al. |
|---|---|---|---|
| 4,602,129 | A | 7/1986 | Matthews et al. |
| 5,046,088 | A | 9/1991 | Margulies |
| 5,377,191 | A | 12/1994 | Farrell et al. |
| 5,457,683 | A | 10/1995 | Robins |
| 5,835,565 | A | 11/1998 | Smith |
| 5,915,001 | A | 6/1999 | Uppaluru |
| 5,923,745 | A | 7/1999 | Hurd |
| 5,940,476 | A | 8/1999 | Morganstein et al. |
| 5,960,411 | A | 9/1999 | Hartman et al. |
| 5,970,065 | A | 10/1999 | Miloslavsky |
| 6,009,469 | A | 12/1999 | Mattaway et al. |
| 6,011,844 | A | 1/2000 | Uppaluru et al. |
| 6,275,490 | B1 | 8/2001 | Mattaway et al. |
| 6,359,971 | B1 | 3/2002 | Haimi-Cohen |
| 6,496,501 | B1 | 12/2002 | Rochkind |
| 6,496,855 | B1 | 12/2002 | Hunt et al. |
| 6,529,717 | B1 | 3/2003 | Blants |

(Continued)

FOREIGN PATENT DOCUMENTS

WO     01 35617 A2    5/2001

OTHER PUBLICATIONS

Extended European Search Report. issued a Apr. 9, 2014, by the EPO for EP application 10770192.2.

*Primary Examiner* — Habte Mered
*Assistant Examiner* — Prince A Mensah
(74) *Attorney, Agent, or Firm* — Jones Day

(57) ABSTRACT

A portal system for secure, aggregated and centralized management and access of disparate customer service and social networking environments is disclosed. A user interface provides multiple, parameter-based automated service scripts, each configured to utilize customer information. The scripts link to vendor-specific, scenario-specific, and social networking-specific interfaces that have common user interface elements. Shared and dedicated reverse automation gateways are configured to emulate the step-by-step self-service aspects of web sites and interactive voice response systems. The portal system eliminates or reduces inbound toll-free telephone charges for vendor contact centers and additionally links the same to social networking systems.

24 Claims, 25 Drawing Sheets

(56) References Cited

U.S. PATENT DOCUMENTS

| | | |
|---|---|---|
| 7,149,208 B2 * | 12/2006 | Mattaway et al. ............ 370/352 |
| 7,269,431 B1 | 9/2007 | Gilbert |
| 7,330,876 B1 | 2/2008 | Rawat et al. |
| 7,383,231 B2 | 6/2008 | Gupta et al. |
| 7,395,319 B2 | 7/2008 | Harris et al. |
| 7,433,967 B2 | 10/2008 | Anson |
| 7,437,331 B1 | 10/2008 | Rosenberger |
| 7,464,342 B2 | 12/2008 | Savage et al. |
| 7,468,729 B1 * | 12/2008 | Levinson ..................... 345/473 |
| 7,484,176 B2 | 1/2009 | Blattner et al. |
| 7,490,063 B2 | 2/2009 | Garrison et al. |
| 7,512,548 B1 | 3/2009 | Bezos et al. |
| 2001/0007589 A1 | 7/2001 | Uppaluru et al. |
| 2002/0106071 A1 | 8/2002 | Uppaluru et al. |
| 2003/0069922 A1 * | 4/2003 | Arunachalam ............... 709/203 |
| 2004/0185825 A1 | 9/2004 | Preiss et al. |
| 2004/0246941 A1 * | 12/2004 | Lobig ......................... 370/352 |
| 2006/0095568 A1 * | 5/2006 | Makagon et al. ............ 709/224 |
| 2007/0133522 A1 | 6/2007 | Morgan |
| 2007/0133575 A1 * | 6/2007 | Cai et al. .................... 370/401 |
| 2008/0004976 A1 * | 1/2008 | Beachum et al. ............ 705/26 |

* cited by examiner

SECURE CUSTOMER SERVICE PROXY PORTAL

CROSS-REFERENCE TO RELATED APPLICATIONS

This application relates to and claims the benefit of U.S. Provisional Application No. 61/173,048 filed Apr. 27, 2009 and entitled Secure Customer Service Proxy Portal, the entire content of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to telecommunications systems, and more particularly, to automating and aggregating access to customer service, entertainment, and social networking systems.

2. Related Art

Organizations with large constituencies often use customer service automation systems such as web sites with self-service elements and interactive voice response systems as a means to reduce costs and reduce the need for live operators to handle customer inquiries. The same is true of social networking sites, which rely heavily on automated email responders and other self-service mechanisms to avoid direct, live interaction with users.

It is typical for larger organizations to receive thousands of customer inquiries each day. These may come in the form of emails, web site visits, interactive voice response (IVR) dialogs or even face-to-face interaction in a retail scenario. It is typical for these larger organizations to spend millions of dollars each year on the development and maintenance of systems used to handle such customer interaction. For live interactions, enterprises employ automatic call distributors (ACDs) or private branch exchanges (PBXs) and various computer-telephony integration (CTI) techniques.

The popularity of the Internet ushered in many new ways of dealing with customers in an automated fashion, including speech recognition systems, SMS auto-response functionality, and automated email reminders. The uptake of these types of technologies has been aggressive. Whole divisions of certain large organizations are now dedicated to finding new and innovative ways to automate customer service oriented transactions. This partly due to live, agent assisted transactions having high costs, which can be as much as 15 to 20 dollars per transaction in overhead. Cast against the relatively low cost of 10 cents for an Internet-based automated transaction, companies scramble to cut costs with these automated systems. One of the contributing factors to the high costs is the 800 or toll-free number carriage. Companies have not adapted to the newer Voice Over Internet Protocol (VoIP) capabilities because it is difficult to link these capabilities to an 800 number. Furthermore, customers do not have an incentive to use a VoIP-based phone when the number they are calling is free to them. Nonetheless, a means to eliminate 800 number charges so companies can take advantage of VoIP-like technology has remained elusive.

The wholesale adoption of self-service automation has created customer backlash. With the advent of the Internet and its ubiquity and easy access to competing vendors, customers have become more fickle and apt to switch alliances with favored vendors at a moment's notice. Increasingly, loyalty and "high touch," or more personalized customer service, has become a competitive distinction amongst some companies. For example, Southwest Airlines has sworn off automation in their call center, thereby eliminating the use of IVR systems so that customers always get a live agent. Customer service industry analysts and researchers have been counseling companies with high transaction volumes to be careful about not "over-automating."

Many attempts over the years have been made to 'soften' self-service forms of customer service (such as IVR) or make it easier to use. For example, the Analog Display Services Interface (ADSI) standard was internationally adopted after it was issued by BellCore in December of 1992. In essence, ADSI allows for "Visual IVR" by transmission of data mapped to voice-based IVR into remote screen prompts for phones with soft key capability. The conventional analog for circa 1992 screen-based phones is the Smart Phone.

Before the BellCore ADSI "Visual IVR" specification was finalized, its use was promoted by sharing the information with various third parties. For example, Dialogic put algorithms on its boards to communicate via ADSI to enable Visual IVR on phones from Nortel and others. Other popular IVR-oriented suppliers quickly developed ADSI-Visual IVR systems. In addition to Dialogic, others such as Intervoice, VoiceTek, Fanstel, and Nortel followed suit.

Other customer service systems besides Visual IVR are known in the art, and companies such as Venturian Software, NetCall Technologies, Securicor Telecoms and Lansys have demonstrated Web-based callback and ACD callback systems dating back to 1995. One noteworthy system is the CyberCall product from Venturian, which was a major collaboration between these well-known telecommunications companies at the time. CyberCall allowed any ACD to be hooked up to both web sites and CTI servers so consumers could ask for an automated call back to their regular phone line. Such Web-based callback systems, however, did not see widespread deployment because it could only be activated from a website, and could only be installed with substantial systems integration behind the enterprise firewall. There were many interdependencies to consider since enterprises oftentimes deployed a wide variety of disparate systems. In addition to difficulties associated with management, the static nature of the user interface, such as there being no customized menu choices, ACD systems have only seen nominal adoption.

Customers often find automated systems to be useful, especially if the business cannot respond to a customer service inquiry immediately because it was initiated after business hours. Many IVR systems, for example, are accessible 24 hours a day and able to dispense valuable information to users at any time. Likewise, web sites are typically not bound by regular business hours.

From the user's perspective, however, there are two fundamental problems associated with automated systems. Most systems are poorly designed and can be very frustrating for the user to navigate. Indeed, some customers are so loathe to use automated systems for this reason, that they will instantly "opt out" of an automated system and demand live service. Of course, the wholesale adoption of this practice is costly for companies that employ automation systems. Additionally, users must traverse a veritable jungle of disparate, varyingly complex automation systems. There is no single, unifying experience for the customer. Each automated system is different, with its own, unique interface, rules, protocols and foibles. The modality of most approaches is singular, that is, interfaces for the user do not transcend modalities such as web, phone, smart phone, IPTV, and so forth.

These issues cause a great deal of frustration on the side of the user community, or customers. On one hand, companies have a need to differentiate from competitors, but nonetheless have a compelling need to automate customer service in the interest of lowering costs. On the other hand, customers have become disillusioned about automation, and the ease with which a live service agent can be reached is a significant retention factor. Therefore, customer loyalty remains ever elusive.

Accordingly, it is desirable to achieve a balance between good, personalized customer service, and collecting a high volume of information through automation in order to save significant costs for each transaction.

BRIEF SUMMARY

In accordance with various embodiments of the present invention, the capability to create, configure, deploy, and manage a library of reverse automation scripts and associated software that act as customer service concierge robots on behalf of customers is contemplated. These robots are programmed to wait in line, fetch data, and ask questions on behalf of customers so that customers can avoid having to use self-service systems.

In another aspect, the ability to place remote control gateways at a company location, which use VoIP or other economical transmission methods to deliver customer communications directly to a company's contact center or IVR system whilst bypassing traditional toll-free carriage vendors and associated charges is contemplated. Furthermore, portal is understood to manage a plurality of remote automation gateways on behalf of many companies and to aggregate access to a plurality of companies under the same, unified software control.

There is also contemplated a "reverse" automation of existing automated systems with a service creation environment that uses templates for creating customer emulator Scripts. Such "reverse" automation of existing automated systems eliminates the need for proprietary, custom, and costly systems integration. Instead, the portal, using its customer emulator scripts, adapts to existing systems which has the effect of rapid development and inexpensive deployment for the company. This is advantageous for a number of reasons, including lowering the cost to deploy access to the portal and offering a higher level of "concierge" service for the customer without having to change-out the automation systems already in use.

Customers can configure their own preferences for communicating with both companies and social networking sites according the level of security and intimacy they wish to convey to the company or social site. In accordance with various embodiments, this may involve the creation of multiple personas, each linked to their own user. These personas have attributes including financial information and script preferences which allow the user to select the "personality" or attributes that are to be exposed on a transaction-by-transaction basis. Such personas appear in a unified user interface and eliminate the tedium of individual log-ons and individual traversals of automation systems. The portal also provides a modality to associate one user persona with multiple companies so the same type of interaction can be launched for each company with one command. In another aspect of the present invention, one user persona can be associated with multiple social networking sites in order to automate the posting of information on each site.

The secure customer service proxy portal may employ a media server function that, in addition to emulating the actions of a human being and toll network in executing reverse automation scripts, can present audio signals back to the user endpoint device such as telephones, smart phones, IPTV set top box and controllers, etc., for the purposes of simulating call progress tones, music on hold and announcements in lieu of the actual progress tones, music on hold and announcements the automated service is producing for the reverse automation gateway to hear. This aspect involves the ability for the user to select the call progress and other status messages to be customized as per the persona of choice selected by the user.

The secure customer service proxy portal may be located either between or in a cable TV, satellite or other high-speed multimedia network and various company web sites and IVR systems. In the alternative, it may be located between or on traditional networks and company web sites and IVR systems. It acts as a protocol converter and aggregator of disparate communications streams converging from disparate networks in order to unify and equalize the interface between multiple business entities and multiple customers.

The reverse automation gateways may be utilized as a shared network device, such that each gateway holds and executes on reverse automation scripts on behalf of a plurality of companies automation systems. The reverse automation gateways can be deployed also as a dedicated device where it is co-located with the company contact center or IVR system. Thus, the 800 number toll-free carriage charges may be bypassed. The reverse automation gateway may thus carry command and reply messages to and from the portal in order to execute on customer emulator scripts. Such command and reply messages may be carried over TCP/IP. As such, the Reverse Automation Gateways may also carry voice traffic and be connected directly to the company contact center, providing a non-800 access directly to the system via the portal. In the same manner, the secure customer service proxy portal in tandem with either hosted and/or dedicated reverse automation gateways, can be used to bypass the 800 toll network in setting up multi-party conference calls by making less expensive outbound calls to pre-programmed consumers and agents and further combining these calls together under the control of the reverse automation gateways.

A particular user's experience with the secure customer service proxy portal is personalized via the use of a common user interface aggregator matrix. The user interface aggregator matrix may be adapted to run on a variety of terminal devices including multimedia/TV set top boxes, web browsers and smart phones. The user is able to create a "persona corral" where each persona having its own, unique attributes, which allows the level of automation, level of security, and level of live interaction desired, to be dictated by the user. In this fashion, the user of the Secure Customer Service Proxy Portal is able to maintain a unified, dignified, automated and secure dialog with favored vendors and social networking sites.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
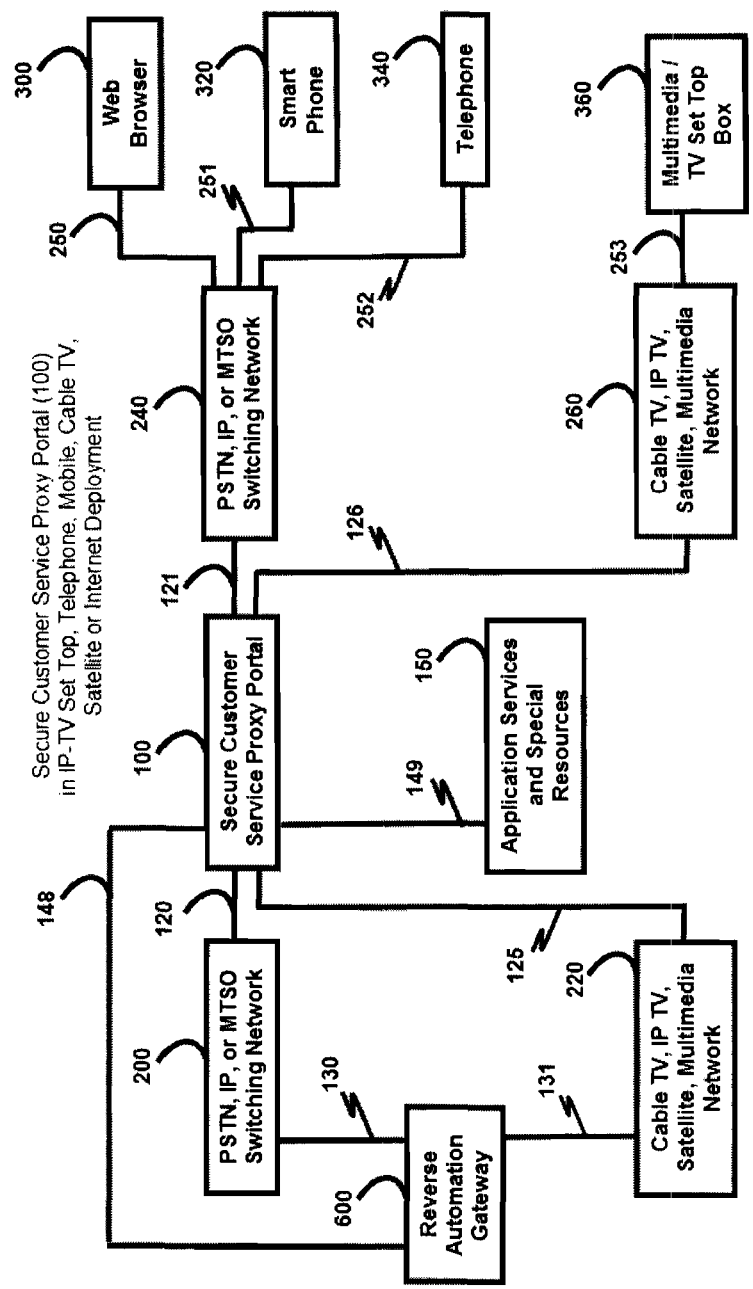
FIG. 1 is a block diagram illustrating one embodiment of a secure customer service proxy portal, deployed in a variety of environments including IPTV set top, telephone, mobile, cable television, satellite and Internet.

With reference to the block diagram of FIG. 1, one embodiment of the secure customer service proxy portal 100 interfaces between multiple telecommunications and computing networks. including, but not limited to, the Public Switched Telephone Network (PSTN), IP-based networks such as the Internet, mobile cellular networks and multimedia-oriented high speed networks including, but not limited to cable TV, IP TV, and satellite networks. The secure customer service proxy portal 100 also interfaces between two general types of server equipment, such as a contact center and associated interactive voice response (IVR) systems and web servers accessible to the internet or other networks. In addition, the secure customer service proxy portal 100 is designed to allow interaction with its services via a plurality of terminal devices with a common user interface.

A first type of telecommunications and computing network represented in FIG. 1 is PSTN, IP, or Mobile Telephone Switch Office (MTSO) switching networks 200. This network represents the service side of the deployment, where the network is arranged to host services and capabilities of vendors, network providers, contact centers, customer service web sites and social networking sites. In addition, another network depicted called PSTN, IP, or MTSO switching networks 240 represents the user side of the deployment, where terminal devices such as web browsers 300, smart phones 320, and telephones 340 are used by customers to access the secure customer service proxy portal 100.

A second type of telecommunications and computing network represented in FIG. 1 is cable TV, IP TV, satellite, multimedia networks 220. This network represents an alternate service side of the deployment, where the network is arranged to host services and capabilities of vendors, network providers, contact centers, customer service web sites and social networking sites. In addition, another group of cable TV, IP TV, satellite, Multimedia Networks 260 represents the user side of the deployment, where terminal (user) devices such as multimedia and TV set-top boxes 360 and related controllers are used by customers to access the secure customer service proxy portal 100.

The telecommunications and computing networks shown in FIG. 1 use a variety of commonly deployed transmission schemes and protocols. These networks (200, 220, 240, 260) can be used both for command and control and for the carriage of content. Command and control are signals that allow for the general collaboration between devices, whereas content signals carry media such as telephone calls, video, email, chats, and Short Message Service (SMS) messages. Command and control and content signaling protocols and standards used on these networks include, but are not limited to: TCP (Transmission Control Protocol), Internet Protocol (IP), Hypertext Transfer Protocol (HTTP), File Transfer Protocol (FTP), Real-Time Transport Protocol (RTP), User Datagram Protocol (UDP), Session Initiation Protocol (SIP), Simple Mail Transfer Protocol (SMTP), Post Office Protocol 3 (POP3), Internet Message Access Protocol (IMAP4), PCM/TDM (Pulse Code Modulation/Time Division Multiplexing in T-1 signaling), PRI (Primary Rate and Integrated Services Digital Network telephone signaling), 10 Gigabit Ethernet, 3G networking, and IPTV.

FIG. 1 also shows the logical placement of a reverse automation gateway 600 that has a telecommunications link 148 to the secure customer service proxy portal. The reverse automation gateway 600 also has a telecommunications link 130 to multiple traditional telecommunications and computing networks represented by PSTN, IP or MTSO Switching Network 200. In addition, the reverse automation gateway 600 also has a telecommunications link 131 to multiple multimedia high-speed networks represented by cable TV, IP TV, satellite, multimedia network 220.

Additionally, the block diagram of FIG. 1 further illustrates the logical placement of the secure customer service proxy portal 100 and its relationship with an application services and special resources array 150, representing a network of resources, databases and server applications that are part of the overall architecture. The secure customer service proxy portal 100 and the application services and special resources 150 array are connected by a telecommunications link 149. Through the telecommunications link 149, the secure customer service proxy portal 100 has access to its own application services and special resources. Through these telecommunications and computing networks, the secure customer service proxy portal also has access to all four network types (200, 220, 240, 260) via access links 120, 125, 121 and 126, respectively.

FIG. 1 also shows the logical placement of telecommunications and computing network called PSTN, IP, or MTSO switching networks 240 and its connections to terminal (user) devices including, but not limited to web browsers 300, smart phones 320, and telephones 340. This arrangement depicts the user side of the secure customer service proxy portal 100 deployment. These devices are able to communicate to the secure customer service proxy portal 100, via the networks 240 using the telecommunications links 250, 251, and 252, respectively.

FIG. 1 also shows the logical placement of telecommunications and computing network called cable TV, IP TV, Satellite, multimedia network 260 and its connections to terminal (user) devices including, but not limited to multimedia and television set-top boxes 360. This arrangement depicts another aspect of the user side of the secure customer service proxy portal 100 deployment. These devices are able to communicate to the secure customer service proxy portal 100, via the networks 260 using the telecommunications link 253.

Figure 2:
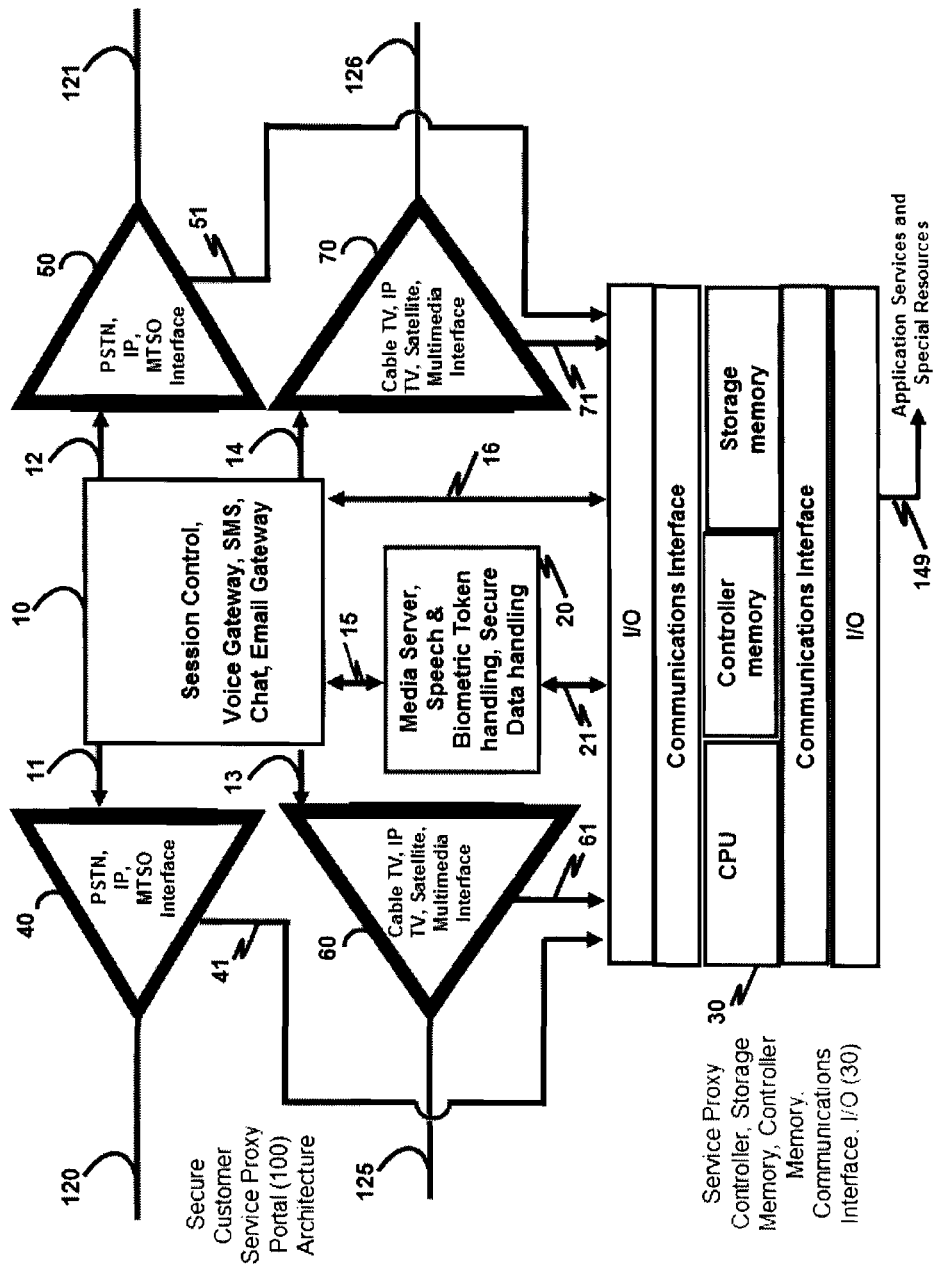
FIG. 2 is a detailed block diagram of the communications and control architecture of the secure customer service proxy portal.

FIG. 2 shows the communications and control architecture aspect of the secure customer service proxy portal 100. The session control, voice gateway, SMS, chat, email gateway 10 is depicted as a centralized control device for multiple network signaling interfaces. This is also generally referred to as a network gateway. The session control, voice gateway, SMS, chat, email gateway 10 is connected to these network signaling interfaces by way of a communications path and driver depicted in FIG. 2 as access paths 11, 12, 13 and 14. Session control, voice gateway, SMS, chat, email gateway 10 uses the network signaling interfaces for controlling telephone calls between terminal (user) devices and the reverse automation gateway 600 which acts as a proxy to a plurality of contact centers. This control of media transmissions is not limited to telephone calls. In one embodiment, the session control, voice gateway, SMS, chat, email gateway 10 will also control the transmission of other communications including, but not limited to chats, SMS and email. A processor is connected to the network signaling interfaces via session control, voice gateway, SMS, chat, email gateway (10) and the service proxy controller, storage memory, controller memory, communications interface, I/O 30. All network signaling interfaces are controlled by the session control, voice gateway, SMS, chat, email gateway 10.

FIG. 2 also shows the logical placement of a media server, speech and biometric token handling, secure data handling module 20, also referenced as media server 20. The media server 20 is a connected to the session control, voice gateway, SMS, chat, email gateway 10 with access point 15. This access point allows these two elements to work collaboratively. Media servers are used to play out audio, conference audio, play out call progress tones, play out pre-recorded files, music, private messages, etc. Media servers are also able to manipulate fax transmissions and other message media. Media servers are also commonly available hardware apparatus, built primarily with off-the-shelf microprocessors and related gear. Vendors such as Dialogic, with their Contata media server and Radisys Convedia CMS-3000 media server are commonly available. For speech recognition, and biometric security applications, special media servers can be equipped with media resource control protocol (mrcp). Technology to control media as with mrcp is commonly available from vendors such as Aumtech and Voxeo. Biometric technology in the form of speaker verification is commonly available from vendors such as the IBM Conversational Biometrics Group or Valid Voice of Melbourne.

FIG. 2 depicts how both the media server 20 and the session control, voice gateway, sms, chat, email gateway 10 are not only connected together, but also both connected to the service proxy controller 30 via access points 21 and 16 respectively. The service proxy controller 30 operates as an outboard software state controller. The service proxy controller 30 is comprised of a standard microcomputer apparatus which includes but is not limited to multiple input/output devices, a communications interface, storage memory, and a CPU. Such standard microcomputer apparatuses are commonly available from vendors such as HP or Sun Microsystems.

The service proxy controller 30 gets status messages from the media server 20 and the session control, voice gateway, SMS, chat, email gateway 10. The messages derive from media server 20 and the session control, voice gateway, SMS, chat, email gateway 10 detection of events and processes on the network signaling interfaces.

For example, the network signaling interfaces will both receive commands to execute on or send messages alerting the status of telephone lines, email transmissions and chat signals. The service proxy controller 30 will send network routing and/or origination information to the Media Server 20 and the session control, voice gateway, SMS, chat, email gateway 10 to facilitate the set-up and tear-down of various transactions. The service proxy controller 30 is afforded the intelligence it needs to make these commands and process these status messages owing to the services of the applications services and special resources 15 which the service proxy controller 30 is connected to over access point 149.

In an embodiment of the invention, multiple secure customer service proxy portals 100 and associated service proxy controllers would be clustered in an N+1 resilient arrangement. Multiple access points or a common TCP/IP communications bus would be used to connect an array of these servers together to achieve higher density and a modicum of service resiliency. Such an arrangement would call for the use of commonly available load balancers, such as content switches and load balancers from Big IP or Cisco.

An embodiment of the secure customer service proxy portal 30 is designed for interfacing with a variety of telecommunications and computing networks under software state control. These are the same networks as described in FIG. 1. A standard method for accessing networks is a network signaling interface. Such devices are commonly available from Cisco, Dialogic, and AudioCodes, for example.

A first type of network signaling interface is represented in FIG. 2 as PSTN, IP, MTSO Interface 40. This network signaling interface is connected to the appropriate network via a telecommunications link 120 which in turn connects the secure customer service proxy portal 100 to the PSTN, IP or MTSO Switching Network 200 as shown in FIG. 1. PSTN, IP, MTSO interface 40 is also connected to the service proxy controller 30 via access point 41. This PSTN, IP, MTSO interface 40 represents access to the network on the service side of the deployment, where the network is arranged to host services and capabilities of vendors, network providers, contact centers, customer service web sites and social networking sites.

FIG. 2 depicts another network signaling interface represented as PSTN, IP, MTSO interface 50. This network signaling interface is connected to the appropriate network via a telecommunications link 121 which in turn connects the secure customer service proxy portal 100 to the PSTN, IP or MTSO switching network (240) as shown in FIG. 1. PSTN, IP, MTSO interface 50 is also connected to the service proxy controller 30 via access point 51. This PSTN, IP, MTSO interface 50 depicts the user side of the secure customer service proxy portal deployment as it relates to web browsers, smart phones and telephones.

A second type of network signaling interface is represented in FIG. 2 as cable TV, IP TV, satellite, multimedia interface 60. This network signaling interface is connected to the appropriate network via a telecommunications link 125 which in turn connects the secure customer service proxy portal 100 to the Cable TV, IP TV, satellite, multimedia network 220 as shown in FIG. 1. Cable TV, IP TV, satellite, multimedia interface 60 is also connected to the service proxy controller 30 via access point 61. This cable TV, IP TV, satellite, multimedia interface 60 represents access to the network on the service side of the deployment, where the network is arranged to host services and capabilities of vendors, network providers, contact centers, customer service web sites and social networking sites.

FIG. 2 depicts another network signaling interface represented as cable TV, IP TV, satellite, multimedia interface 70. This network signaling interface is connected to the appropriate network via a telecommunications link 126, which in turn connects the secure customer service proxy portal 100 to the cable TV, IP TV, satellite, multimedia network (260) as shown in FIG. 1. cable TV, IP TV, satellite, multimedia interface 70 is also connected to the service proxy controller 30 via access point 71. This cable TV, IP TV, satellite, multimedia interface 70 depicts the user side of the secure customer service proxy portal 100 deployment as it relates to multimedia and TV set top boxes.

The service proxy controller 30 receives the routing and media type information from the processor and accesses various databases to ascertain the proper routing per transaction. The service proxy controller 30 uses retrieval triggers in the database via a secure database access method 175 as will be discussed in further detail below. Here, the database contains all of the stored reverse automation scripts which include telephone routing and destination information. In addition, there are databases which include signaling scripts for IVR systems, web systems, and the routing and phone number information for various terminal (user) devices.

Figure 6:
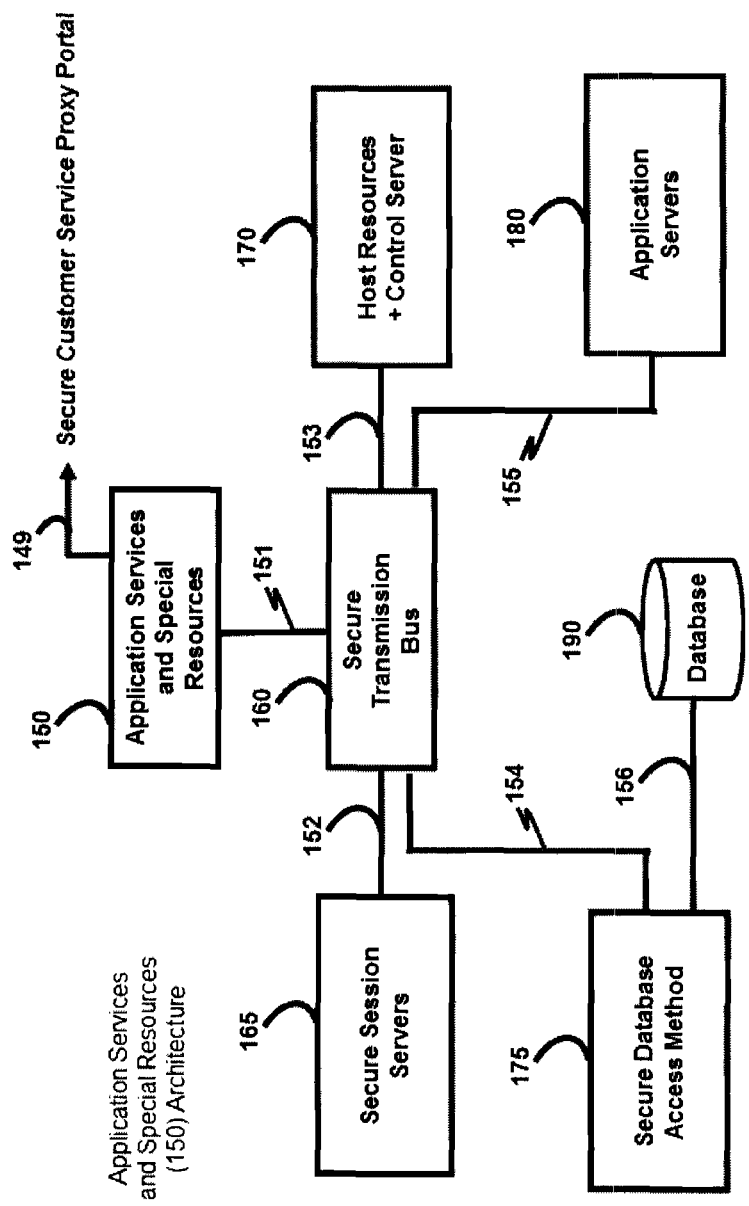
FIG. 6 is a block diagram of a high-level view of the application services and special resources architecture.

The service proxy controller 30 will also control (along with the secure session servers 165 as shown in FIG. 6) access to transactions via the validation of a user session token. Such token will be generated for each session and triggered only by a successful biometric (spoken by the user) challenge.

Figure 3:
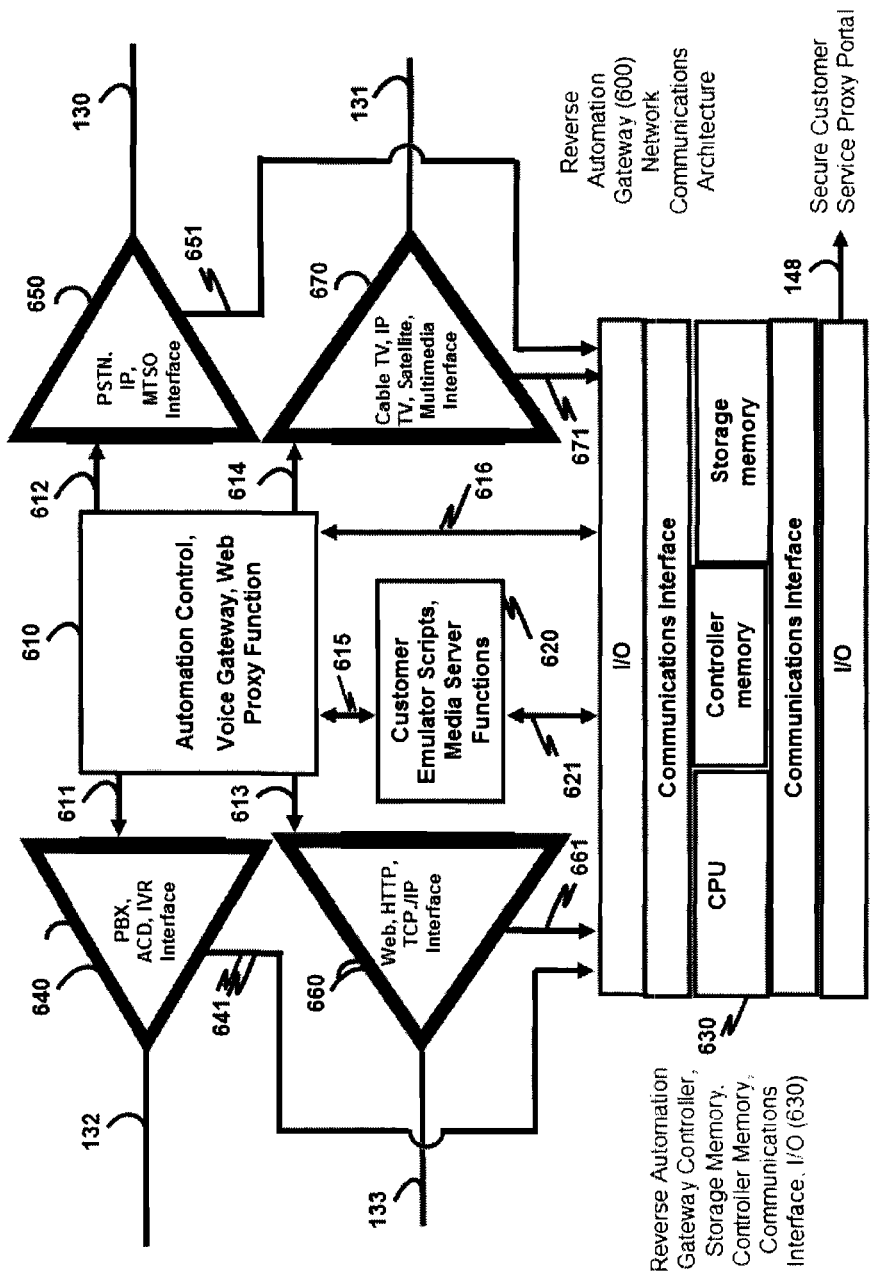
FIG. 3 is a detailed block diagram of the architecture of the reverse automation gateway in a network communications context.
Figure 4:
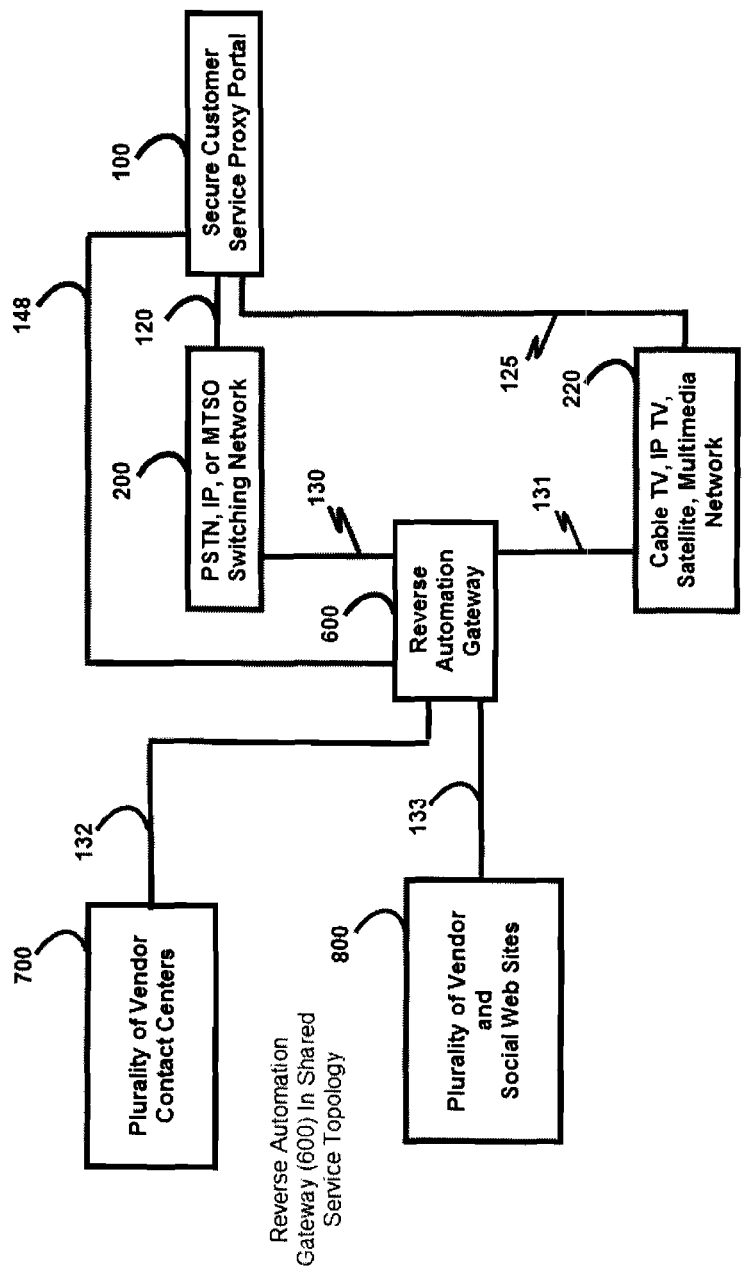
FIG. 4 is a detailed block diagram illustrating the reverse automation gateway in a shared service arrangement.

FIG. 3 is a block diagram of the architecture of the reverse automation gateway 600 in a network communications context. Specifically, the communications and control aspect is shown. The automation control, voice gateway, web proxy function 610 is depicted as a centralized control device for multiple network signaling interfaces, vendor contact centers and both vendor and social web sites. The Automation control, voice gateway, web proxy function 610 is connected to these network signaling interfaces by way of a communications path and driver depicted in FIG. 3 as access paths 611, 612, 613 and 614. The automation control, voice gateway, web proxy function 610 uses the network signaling interfaces for controlling telephone calls between vendor contact centers 700 as depicted in FIG. 4 and the secure customer service proxy portal 100. The secure customer service proxy portal 100 does not necessarily have to be in the direct communication path for phone calls and web traffic passing through the reverse automation gateway 600. The reverse automation gateway 600 acts as a proxy to a plurality of contact centers and web sites on the vendor/service side of the equation. In this context, the reverse automation gateway 600 can be used as a remote slave switching device, dutifully carrying out commands from the secure customer service proxy portal 100.

In a second aspect of the invention, the reverse automation gateway 600 may establish a communication directly with a contact center on behalf of a customer and then bypass the secure customer service proxy portal 100 in connecting the actual phone call directly via the appropriate network directly to a terminal (user) device. This scenario denotes a separation between command and control versus the delivery of content. Here, as in the first scenario, all command and control of the reverse automation gateway 600 would nonetheless be dictated by the secure customer service proxy portal 100.

As with the session control, voice gateway, SMS, chat, email gateway 10 as depicted in FIG. 2, this control of media transmissions is not limited to telephone calls. In one embodiment, the automation control, voice gateway, web proxy function 610 will also control the transmission of other communications including, but not limited to chats, SMS and email. A processor is connected to the network signaling interfaces via automation control, voice gateway, web proxy function 610 and the reverse automation gateway controller, storage memory, controller memory, communications interface, I/O 630, also referenced as the reverse automation gateway controller 630. All network signaling interfaces are controlled by the automation control, voice gateway, web proxy function 610.

FIG. 3 also shows the logical placement of customer emulator scripts, media server functions 620. The customer emulator scripts, media server functions 620 is connected to the automation control, voice gateway, web proxy function 610 with access point 615. This access point allows these two elements to work collaboratively. In the context of the reverse automation gateway 600, customer emulator scripts are the instructions that a particular reverse automation gateway 600 will execute upon on a step by step basis. Here the customer emulator scripts are fed to the reverse automation gateway a bit at a time based on instructions coming from both the secure session servers 165 detailed further below in connection with FIG. 6, and the reverse automation server 181 likewise detailed further below in connection with FIG. 8. Customer emulator scripts are possible, as each script is loaded dynamically with secure information on behalf of a plurality of customers.

Such scripts are intended to interact both with machines and human agents on the vendor or social networking provider side, can be created and customized on behalf of individual customers in accordance with their peculiar likes and dislikes. This is completely different from a simple robotic test script used to test the load-bearing capability of a system by simply pulsing the same data at a target test system over and over. These testing scripts are used to repeatedly produce valid traffic into a target test systems to ascertain the target system's ability to handle the traffic load. Media servers are also commonly available hardware apparatus, built primarily with off-the-shelf microprocessors and related gear. Vendors such as Dialogic with their Contata (nee Brooktrout) media server and RadiSys Convedia CMS-3000 media server are commonly available. For speech recognition, and biometric security applications, special media servers can be equipped with Media Resource Control Protocol (MRCP). Technology to control Media as with MRCP is commonly available from vendors such as Aumtech and Voxeo. Biometric technology in the form of speaker verification is commonly available from vendors such as the IBM Conversational Biometrics Group or Valid Voice of Melbourne.

FIG. 3 also shows how both the customer emulator scripts, media server functions 620 and the automation control, voice gateway, web proxy function 610 are not only connected together, but also both connected to the reverse automation gateway controller 630 via access points 621 and 616 respectively. Reverse automation gateway controller 630 operates as an outboard software state controller. The reverse automation gateway controller 630 is comprised of a standard microcomputer apparatus which includes but is not limited to multiple I/O (input output devices), a communications interface, storage memory, a and a CPU. Such standard microcomputer apparatus are commonly available from vendors such as HP or Sun Microsystems.

The reverse automation gateway controller 630 gets status messages from the customer emulator scripts, media server functions 620 and the automation control, voice gateway, web proxy function 610. The messages derive from customer emulator scripts, media server functions 620 and the automation control, voice gateway, web proxy function 610 detection of events and processes on the network signaling interfaces.

For example, the network signaling interfaces will both receive commands to execute on or send messages alerting the status of telephone lines, email transmissions and chat signals. The reverse automation gateway controller 630 will send network routing and/or origination information to the customer emulator scripts, media server functions 620 and the 610 to facilitate the set-up and tear-down of various transactions. The automation gateway controller 630 is afforded the intelligence it needs to make these commands and process these status messages owing to the services of the secure customer service proxy portal 100 which the reverse automation gateway 600 is connected to over access point 148.

In a another embodiment of the invention, multiple reverse automation gateways 600 and associated reverse automation gateway controllers 630 would be clustered in an N+1 resilient arrangement. Multiple access points or a common TCP/IP communications bus would be used to connect an array of these servers together to achieve higher density and a modicum of service resiliency. Such an arrangement would call for the use of commonly available load balancers, such as content switches and load balancers from Big IP or Cisco.

An embodiment of the reverse automation gateway 600 is designed for interfacing with a variety of telecommunications and computing networks under software state control. These are the same networks as described in FIG. 1. A standard method for accessing networks is a network signaling interface. Such devices are commonly available from Cisco, Dialogic, and AudioCodes, for example.

A first type of network signaling interface is represented in FIG. 3 as PBX, ACD, IVR interface 640. This network signaling interface is connected to the appropriate contact center infrastructure via a telecommunications link 132. This represents a logical access point for the vendor/service side of the network where the reverse Automation gateway 600 is typically deployed.

A second type of network signaling interface is represented in FIG. 3 as Web, HTTP, TCP/IP interface 660. This network signaling interface is connected to the appropriate vendor or social networking web site infrastructure via a telecommunications link 133. This represents another logical access point for the vendor/service side of the network where the reverse automation gateway 600 is typically deployed.

A third type of network signaling interface is represented in FIG. 3 as PSTN, IP, MTSO Interface 650. This network signaling interface is connected to the PSTN, IP or MTSO switching network (200) via a telecommunications link 130. This represents a logic access point for the user side of the network as it relates to web browsers, smart phones and telephones.

A fourth type of network signaling interface is represented in FIG. 3 as cable TV, IP TV, satellite, multimedia interface 670. This network signaling interface is connected to the cable TV, IP TV, satellite, multimedia network 220 via a telecommunications link 131. This represents a logic access point for the user side of the network as it relates to multimedia and TV set top boxes.

The reverse automation gateway controller, storage memory, controller memory, communications interface, I/O 630, also referred to as the reverse automation gateway controller 630, receives routing and media type information from its CPU and accesses various databases to ascertain the proper routing per transaction. Reverse automation gateway controller 630 uses retrieval triggers in the database via a secure database access method 175, as further detailed in FIG. 6. Here, the database contains all of the stored reverse automation scripts which include telephone routing and destination information. In addition, there are databases which include signaling scripts for IVR systems, web systems, and the routing and phone number information for various terminal (user) devices.

The reverse automation gateway controller 630 will also control (along with the secure session servers 165 as shown in FIG. 6 access to transactions via the validation of a user session token. Such token will be generated for each session and triggered only by a successful biometric (spoken by the user) challenge.

With reference to FIG. 4, in one aspect of the invention, the reverse automation gateway 600 may be deployed in such a way that it is hosted in a network and therefore contacts and communicates with a plurality of vendor contact centers 700 over a telecommunication link 132. In addition, the reverse automation gateway 600 may be deployed in such a way that it is hosted in a network and therefore contacts and communicates with a plurality of vendor and social networking web sites 800 over a telecommunication link 133. This shared arrangement may be advantageous for vendors who do not contemplate a high volume of transactions, where a dedicated, CPE-based Reverse Automation Gateway may eliminate certain transmission and carriage charges such as toll-free long distance telephone call charges.

The location of the reverse automation gateway 600 in this shared arrangement may be co-located with elements of the secure customer service proxy portal 100 or may be deployed regionally so as to reduce backhauling of telephone calls. Such an arrangement is commonly achieved by well-known practices in telecommunications dealing with remote switching nodes.

Figure 5:
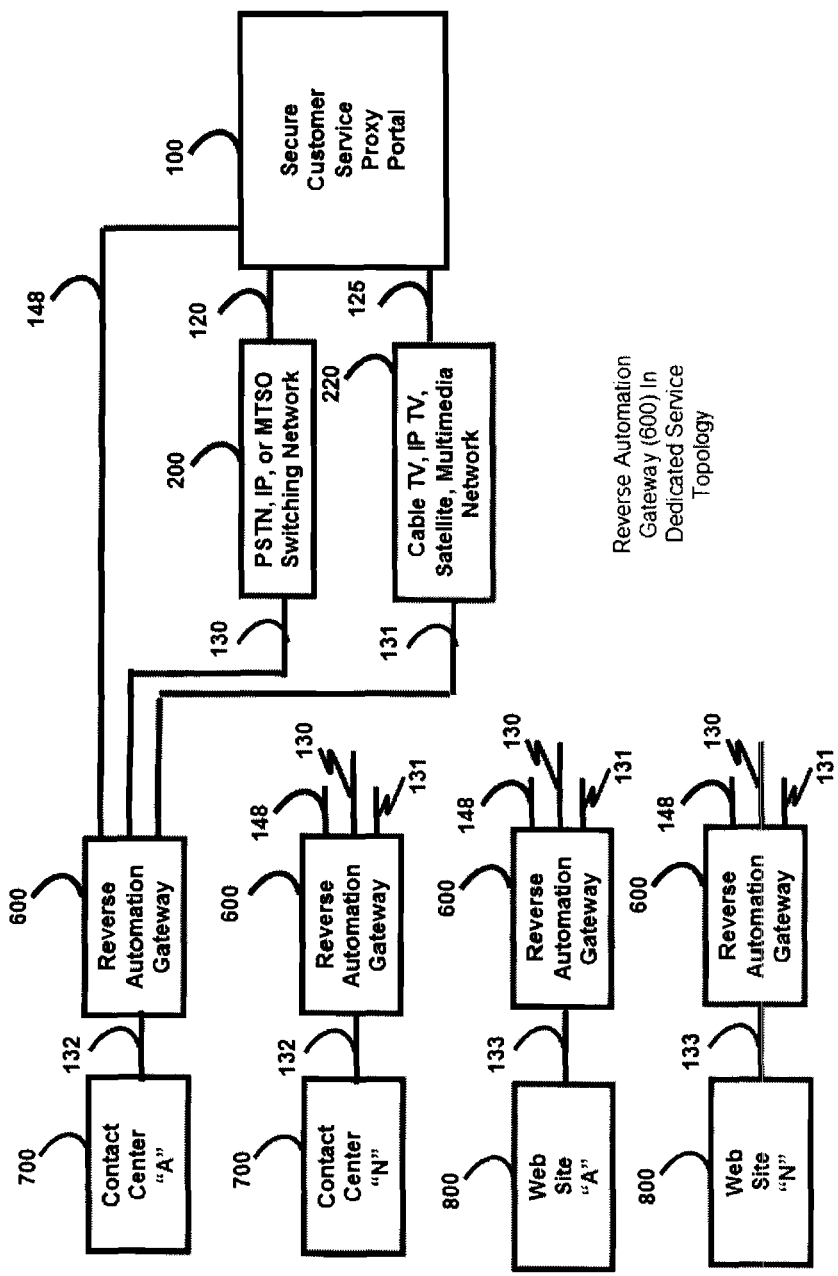
FIG. 5 is a detailed block diagram of the reverse automation gateway in a dedicated service arrangement.

With reference to FIG. 5, the reverse automation gateway 600 may be configured in a dedicated service arrangement. In this additional aspect, the reverse automation gateway 600 may be deployed in such a way that it is installed as CPE on a vendor contact center site therefore contacts and communicates with a single vendor contact center "A" 700 in one instantiation. In yet another aspect of the invention a second reverse automation gateway 600 may be paired with a separate contact center "n" 700 while it is also deployed with the first and so on. This means a plurality of contact centers may be individually served by dedicated reverse automation gateways 600 that are all nonetheless controlled by a centralized secure customer service proxy portal 100.

In this additional aspect of the invention, the reverse automation gateway 600 may be deployed in such a way that it is installed as CPE on a Vendor's site in order to be directly connected to the vendor or social networking web site equipment. In such an arrangement, the reverse automation gateway 600 will contact and communicates with a single vendor web site "A" 800 in one instantiation. In yet another aspect of the invention a second reverse automation gateway 600 may be paired with a separate web site "N" 800 while it is also deployed with the first and so on. This means a plurality of web sites may be individually served by dedicated reverse automation gateways 600, that are all nonetheless controlled by a centralized secure customer service proxy portal 100.

This dedicated arrangement may be advantageous for the owners of certain vendor contact centers who have concerns about the security aspects of switching in the network versus on site as CPE. In addition with dedicated CPE in reverse automation gateways, it is possible to dedicate VoIP or dedicated T-1 PSTN circuits in such a way that toll-free 800 number bypass is achieved. It may also be considered advantageous for such an arrangement on the vendor web site or social networking web site arrangement, where the reverse automation gateway 600 may be co-located behind the vendor's DMZ (secure web zone) to ameliorate security concerns.

In one embodiment of the invention, the practitioner will deploy a distributed, network based architecture with all of the servers, processes and databases arranged around a secure transmission bus. In this aspect, as depicted in FIG. 6, the application services and special resources 150 gateway entity acts as a gateway for special services to the secure customer service proxy portal 100. Here, a practitioner skilled in the art of local networking may deploy a commercially available communications bus, such as The Information Bus (TIB) from TIBCO Software Inc. of Palo Alto, Calif., which is depicted in FIG. 6 as secure transmission bus (160).

FIG. 6 also illustrates how the secure transmission bus 160 is connected to other entities in the architecture via access points. At access point 151, the bus 160 is connected to the application services and special resources gateway entity 150. At access point 152, the bus 160 is connected to the secure session servers 165 environment. At access point 153, the bus 160 is connected to the host resources and control server. At access point 154, the bus 160 is connected to the secure database access method 175, which is in turn connected to the actual database over access point 156. At access point 155, the bus 160 is connected to the application servers 180 environment.

First arranged around the secure transmission bus 160 is the application services and special resources 150 gateway entity. In a one embodiment of the invention, the practitioner will deploy a commonly available store and forward schema on this entity, such as is described in Sun Microsystems' J2EE container and similar web server software arrangements for common mailboxes and communications routines. Such routines are available on Apache, Sun and Microsoft IIS servers, for example.

As depicted in FIG. 6, the application services and special resources 150 gateway entity acts as a consolidation and access point between other special services and the secure customer service proxy portal 100. The communications between these server functions can be achieved via the access point 149 where commonly available protocols such as FTP, HTTPS and HTTP 1.1 for persistent connections may be utilized. A so-called software oriented architecture using SOAP or Text Over HTTP messaging can be used as a means to abstract direct database contact with servers outside of the application services and special resources environment. This is not to limit the means with which secure communications may be encrypted or transferred both inside and outside the application services and special resources environment. Proprietary transmission and encryption schemes can be utilized.

Second arranged around the secure transmission bus 160 is the host resources and control server 170. The purpose of the host resources and control server 170 is to maintain a working list of associated programs and their execution parameters and the location of those programs as they relate to physical resources.

Third arranged around the secure transmission bus 160 is the application servers 180 the purpose of which are explained in detail further below.

Fourth arranged around the secure transmission bus 160 is the secure database access method 175. The purpose of the secure database access method 175 is to ensure the integrity of private, sensitive or financial data and to make sure such data is not accessed by unauthorized programs. The secure database access method 175 will require an encrypted token for each secure data access. Such encrypted token may only be generated and authorized after a secure, biometric-based session verification with users. The actual database 190 server holds a plurality of database tables, each associated with application servers and secure data that must be stored and accessed to allow the secure customer service proxy portal 100 to operate.

Fifth arranged around the secure transmission bus 160 is the secure session servers 165. The purpose of the secure session servers 165 is to ensure the integrity of each communication session with each user. Session integrity deals with the issues of persistence and failover. In a one embodiment of the invention, the practitioner will deploy HTTP 1.1 or other persistent connections that work in tandem with web server clustering and load balancers in order to ensure the integrity of each transmission.

Figure 7:
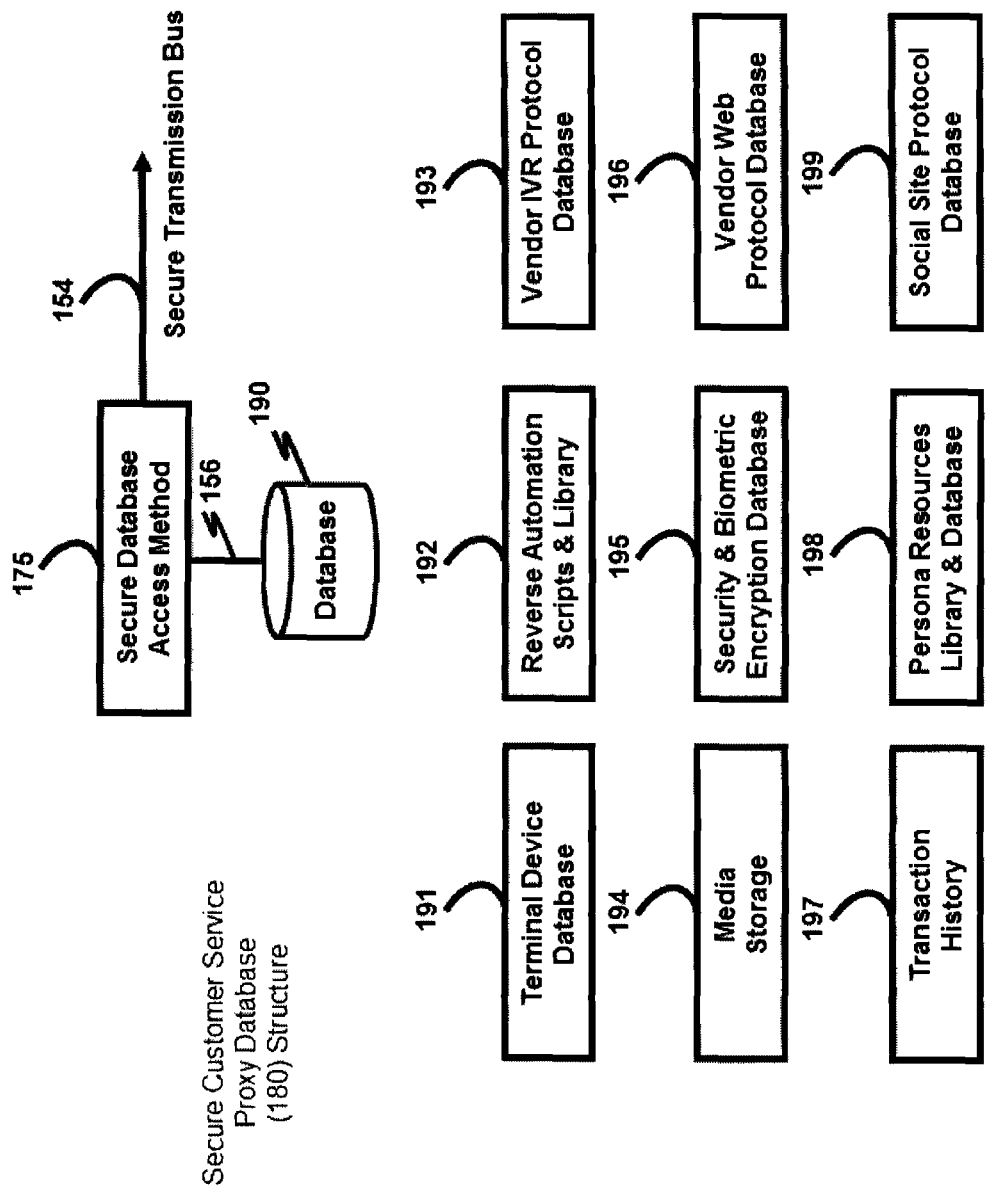
FIG. 7 is a diagram illustrating the structure of a secure customer service proxy database.

The secure customer service proxy portal 100 utilizes not only an array of gateways and application servers, but also a database. Database technology is commonly available in the public domain and commercially from vendors such as Microsoft and Oracle. FIG. 7 shows a plurality of databases that can be used collectively in several embodiments of this invention. There is no limitation on the combination or distribution of these databases. In one aspect of the invention, all data may be available in one or only a few database tables. In another aspect of the invention, all data may be distributed in separate databases and database tables as is depicted in FIG. 7. The practitioner will decide if the concepts associated with each part of the drawing may be optimized by combination or distribution of same.

FIG. 7 further shows the terminal device database 191. This table or collection of tables is used to store crucial information dealing with a plurality of user devices associated with the use of the secure customer service proxy portal 100. As depicted in FIG. 1, these devices may be, but are not limited to: web browser 300, smart phone 320, telephone 340, and multimedia/TV set top box 360. The terminal device protocol server 189 will receive commands from the secure session servers 165 as depicted in FIG. 6. These commands will be acted upon, in part, based upon data the terminal device protocol server 189 relies on and which is stored in the terminal device database 191. The terminal device database 191 will include information on each device and will include, but not be limited to the following: a) a profile for each registered device which identifies a unique telephone number or other address that makes the device addressable by the application; b) a profile for each device which identifies the communication protocol associated with the device. Such protocols may be but are not limited to SIP, 3G, PSTN, or IP; c) a profile for each device that identifies the order of preference for its use by each user of the application; d) a profile for each device that identifies the preference for its use based on the availability of other, alternate devices associated with the user of the application; e) a profile for each device that links its accessibility to a security token and session token for its authorized use; and f) any attributes which distinguish a specific device as to suitability for direct use by users of the application via the secure customer service proxy portal 100.

Figure 8:
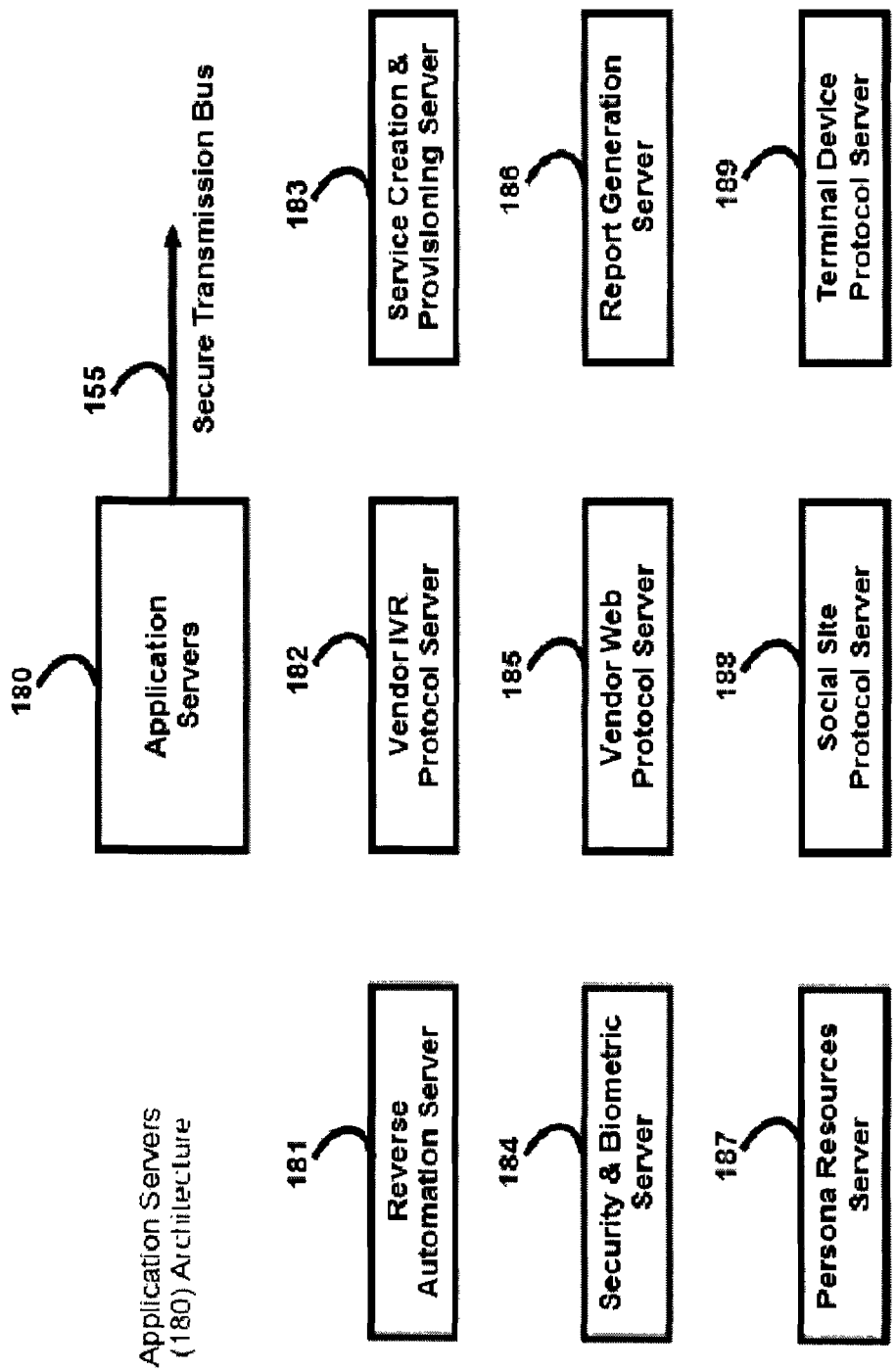
FIG. 8 is a block diagram of the individual application servers and special resources inside of the customer service proxy portal.

The reverse automation scripts and library 192 is table or collection of tables that are used to store crucial information dealing with a plurality of automated, robotic routines that will run as commands associated with the use of the reverse automation gateway 600. As depicted in FIG. 4, the reverse automation gateway 600 may be deployed in a shared service topology, or as depicted in FIG. 5, in a dedicated service topology. Regardless of the shared or dedicated use, the reverse automation gateway 600 will receive commands from the reverse automation server 181 as depicted in FIG. 8, which relies in part on data stored in the reverse automation scripts and library 192. The nature of these commands deal with what scripts must be loaded into memory and executed upon by the reverse automation gateway 600. The reverse automation gateway 600 will also receive commands from the secure session servers 165 as depicted in FIG. 6. The nature of these commands deal with the control and security of the actual sessions in which the scripts will be executed.

The reverse automation scripts and library 192 will include information on each reverse automation script for each vendor and will include, but not be limited to the following: a) A template for each commonly used and/or commercially available Interactive Voice Response (IVR) system which can be used as basis for each reverse automation script; b) a table or collection of tables which stores data on each IVR-based reverse automation script; c) A template for each commonly used and/or commercially available vendor web-based system which can be used as basis for each reverse automation script; d) a table or collection of tables which stores data on each vendor web-based reverse automation script; e) A template for each commonly used and/or commercially available social networking web-based system which can be used as basis for each reverse automation script; f) a table or collection of tables which stores data on each social networking web-based reverse automation script; g) a profile for each reverse automation gateway 600 that identifies what customer persona profiles are associated with the user of the application as it relates to the vendor contact center or IVR system, vendor web system or social networking web system; h) a profile for each Reverse Automation Gateway 600 that links its accessibility to a security token and session token for its authorized use; and i) any attributes which distinguish a specific reverse automation gateway 600 for direct use by users of the application via the secure customer service proxy portal 100.

A vendor IVR protocol database 193 is a table or collection of tables that may be used to store information dealing with a plurality of vendor contact center IVR systems. Such systems will be accessed by the reverse automation gateway 600 as depicted in FIG. 4 and FIG. 5. The reverse automation gateway 600 will receive commands from the reverse automation server 181 as depicted in FIG. 8, which relies in part on data stored in the vendor IVR protocol database 193. The nature of these commands deal with what protocols must be executed upon in order for the reverse automation gateway 600 to successfully communicate with the target Contact Center and IVR system. The vendor IVR protocol database 193 will include information on each vendor contact center IVR system and will include, but not be limited to the following: a) A template for each commonly used and/or commercially available Interactive Voice Response (IVR) system protocol which will be driven by its connection with the Reverse Automation Gateway 600, b) a table or collection of tables which stores data on each IVR-based protocols. Such protocols may be but are not limited to Session Initiation Protocol (SIP), 3G; Public Switched Telephone Network (PSTN), Transmission Control Protocol/Internet Protocol (TCP/IP), and Real-Time Transport Protocol (RTP); c) a profile for protocol that links its accessibility to a security token and session token for its authorized use; and d) any attributes which distinguish a specific protocol as to suitability for direct use by users of the application via the Secure Customer Service Proxy Portal.

As shown in FIG. 7, media storage 194 may be a table or collection of tables that are used to store information dealing with the location and type of media being stored by the secure customer service proxy portal 100. In one embodiment of the invention, the media storage 194 database tables and records will act as a pointer to BLOBs (Binary Large Objects) which are in turn stored in the file system of the host computer in which the database resides. Such BLOBs may be stored in a separate location, in a separate host computer that the database can nonetheless point to so the application servers 180 as shown in FIG. 8 will have access to the media. Access to such media is facilitated by use of common protocols such as, but not limited to Multipurpose Internet Mail Extensions (MIME); Post Office Protocol 3 (POP3); Simple Mail Transfer Protocol (SMTP); Transmission Control Protocol/Internet Protocol (TCP/IP); File Transfer Protocol; and Internet Message Access Protocol (IMAP4).

The services of the media storage 194 will be called upon via the secure database access method 175 by certain secure customer service proxy portal entities. In one aspect of the invention, the reverse automation server 181 may send a command to the media storage entity to download and use media such as speech files for the reverse automation gateway 600 to use in its reverse emulation of IVR scripts with a particular contact center speech or IVR system. In another aspect of the invention, the reverse automation server 181 will send a command to the media storage entity to download and use media such as chat scripts for the reverse automation gateway 600 to use in its reverse emulation of an automated chat dialog with a specific social networking web site. In one embodiment of the invention, a variety of media will be stored in the media storage 194 in order to allow various secure customer service proxy portal entities to take advantage of automation schema using stored and reusable media. In another aspect of the invention, the services of the media storage 194 will be called upon via the secured database access method 175 by the security and biometric server 184 as depicted in FIG. 8. The security and biometric server 184 may use the media storage 194 to store and access encrypted biometric speech samples, prompts, or other media that may require encryption or association with security keys. In another aspect of the invention, the services of the media storage 194 will be called upon via the secured database access method 175 by the persona resources server 187 as depicted in FIG. 8. The persona resources server 187 may use the media storage 194 to store and access media associated with persona icons or avatars. In addition, the persona resources server 187 may use the media storage 194 to store and access media such as logos, identifiers, photos, or other media that may be associated with the common user interface aggregator matrix 900. The media storage 194 can be called upon other servers and shall not be limited to servers contemplated in FIG. 8.

A security and biometric encryption database 195 uses a table or collection of tables to store information dealing with but not limited to security routines, encryption applications, passwords, encryption keys, personal identification numbers, credit card numbers, PIN codes and other relevant data that would reasonably be expected to be part of a secure customer service or transaction processing scenario. Such scenarios being facilitated in part by the use of the secure customer service proxy portal 100.

A vendor web protocol database 196 is a table or collection of tables that is used to store information dealing with a plurality of vendor contact center web systems. Such systems will be accessed by the reverse automation gateway 600 as depicted in FIG. 4 and FIG. 5. the reverse automation gateway 600 will receive commands from the reverse automation server 181 as depicted in FIG. 8, which relies in part on data stored in the vendor web protocol database 196. The nature of these commands deal with what protocols must be executed upon in order for the reverse automation gateway 600 to successfully communicate with the target contact web site system. The vendor web protocol database 196 will include information on each vendor contact center web system and will include, but not be limited to the following: a) A template for each commonly used and/or commercially available web site system protocol which will be driven by its connection with the Reverse Automation Gateway 600, b) a table or collection of tables which stores data on each web-based protocol. Such protocols may be but are not limited to Transmission Control Protocol/Internet Protocol (TCP/IP), Hypertext Transfer Protocol (HTTP), Voice Extensible Markup Language (VXML) and Extensible Messaging and Presence Protocol (XMPP); c) a profile for protocol that links its accessibility to a security token and session token for its authorized use; and d) any attributes which distinguish a specific protocol as to suitability for direct use by users of the application via the secure customer service proxy portal 100.

A transaction history database 197 is a table or collection of tables used to store information dealing with specific events, such as system or interoperability events, and also transaction-oriented events, such as events associated with specific customer-specific phone calls, IP TV media transmissions, SMS transmissions, and chats between users and social web sites. Such transactions shall not be limited to native transactions that begin and end in the secure customer service proxy portal environment, but may extend to other transactions that begin in other systems and end in other systems, but are nonetheless carried in part by the secure customer service proxy portal 100. The transaction history database 197 will store all relevant and useful data dealing with events and transactions. Data to be stored will include but not be limited to: a) an identifier of the originating system of the event; b) identifiers dealing with systems a transaction may be handed off to or conference with; c) a time stamp of the beginning and end of the transaction; d) the type of media employed in the transaction; e) the devices used or accessed with the transaction; f) file pointers to Binary Large Objects or Media (BLOBs) associated with the transaction; g) service level data; h); protocols used; i) security routines and scripts used; and j) transfer data.

A persona resources library and database 198 is a table or collection of tables used to store information dealing with the persona corral as depicted in FIG. 16, FIG. 17, FIG. 18, and FIG. 19. The persona corral is a collection of user-specific profiles associated with each customer. The persona resources library and database 198 will store data dealing with persona creation, maintenance, and use. Data to be stored will include but not be limited to: a) an identifier of the Persona's owner; b) identifier of the particular persona name; c) attributes of the persona dealing with financial or personal data; d) attributes of the persona dealing with social networking information; e) attributes of the persona dealing with preferences such as the time of day for certain communications; e) attributes of the persona dealing with other preferences such as communications channels; f) attributes of the persona dealing with vendor preferences; g) attributes of the persona dealing with preferences on demographic exposure; h) attributes of the persona dealing with opt-in lists or allowing commercial solicitations; i) and attributes of the persona dealing with security issues and related security data such as token data.

A social site protocol database 199 is a table or collection of tables used to store crucial information dealing with a plurality of social networking web systems. Such systems will be accessed by the reverse automation gateway 600 as depicted in FIG. 4 and FIG. 5. The reverse automation gateway 600 will receive commands from the reverse automation server 181 as depicted in FIG. 8, which relies in part on data stored in the social site protocol database 199. The nature of these commands deal with what protocols must be executed upon in order for the reverse automation gateway 600 to successfully communicate with the target social networking web systems. The social site protocol database 199 will include information on each social networking web system and will include, but not be limited to the following: a) a template for each commonly used and/or commercially available social networking web system protocol which will be driven by its connection with the reverse automation gateway 600, b) a table or collection of tables which stores data on each web-based protocol. Such protocols may be but are not limited to Transmission Control Protocol/Internet Protocol (TCP/IP), Hypertext Transfer Protocol (HTTP), Voice Extensible Markup Language (VXML) and Extensible Messaging and Presence Protocol (XMPP); c) a profile for protocol that links its accessibility to a security token and session token for its authorized use; and d) any attributes which distinguish a specific protocol as to suitability for direct use by users of the application via the secure customer service proxy portal 100.

FIG. 8 depicts an access point 155, which connects the secure database access method 175, described in FIG. 6, to the secure transmission bus. The database access method 175, is also connected to the database 190.

The secure customer service proxy portal 100 utilizes not only an array of gateways and a database, but also application servers. As depicted in FIG. 8, the application servers 180 are placeholders for the unique applications. In an embodiment of the invention, a plurality of applications such as the reverse automation server 181 and the vendor IVR protocol server 182 will be able to run inside of one physical server as depicted by application servers 180 or alternately separated out into separate servers in a distributed environment. The practitioner will decide if the concepts associated with each part of the drawing may be optimized by combination or distribution of the same. Microprocessor controlled hardware that may host these application servers is commonly available from vendors such as Dell or Sun Microsystems. The practitioner may choose to equip these physical servers in the same manner explained in FIG. 2 and FIG. 3 as with the service proxy controller, storage memory, controller memory, communications interface, I/O 30 or the reverse automation gateway controller, storage memory, controller memory, communications interface, I/O 630, respectively.

FIG. 8 depicts the reverse automation server 181 as one of the entities associated with the application servers 180. The reverse automation server 181 has access, via the secure transmission bus, to other servers and connected entities in the secure customer service portal environment. In addition, the reverse automation server 181 has access to the secure session servers 165 which are arranged to call upon the array of application servers 180, including the reverse automation server 181, in the regular duties of setting up and tearing down sessions and transactions. In particular, the reverse automation server 181 maintains a working, real-time memory of all of the reverse automation gateways 600 deployed in the system. This real-time working memory is able to provide other servers, such as the secure session servers, with particular information about any reverse automation gateway 600 for the expressed purpose of communicating with and sending and receiving commands to a reverse automation gateway 600. Such information will include, but not be limited to: a) the physical location of the reverse automation gateway 600; b) the logical network location or IP address of the reverse automation gateway 600; c) the logical linkage of the vendor contact center 700 or web site 800 to the reverse automation gateway 600 in a shared, network-based arrangement as described in FIG. 4; and d) the logical linkage of the vendor contact center 700 or web site 800 to the reverse automation gateway 600 in a dedicated arrangement as described above with reference to FIG. 5.

The vendor IVR protocol server 182 is one of the entities associated with the application servers 180. The vendor IVR protocol server 182 has access, via the secure transmission bus, to other servers and connected entities in the secure customer service portal environment. In addition, the vendor IVR protocol server 182 has access to the secure session servers 165 which are arranged to call upon the array of application servers 180, including the reverse automation server 181, in the regular duties of setting up and tearing down sessions and transactions. In particular, the vendor IVR protocol server 182 maintains a working, real-time memory of all of the IVR protocols to be used by the reverse automation gateways 600 deployed in the system.

This real-time working memory is able to provide other servers, such as the secure session servers 165, with particular information about any vendor IVR system for the purpose of communicating with and sending and receiving commands to a speech or IVR system on behalf of a customer. Such information will include, but not be limited to: a) the primary protocol to be used with the vendor IVR system or systems connected to each reverse automation gateway 600; and b) the alternative protocol, if any associated with the vendor IVR system or systems connected to each reverse automation gateway 600.

The service creation and provisioning server 183 as one of the entities associated with the application servers 180. The service creation and provisioning server 183 has access, via the secure transmission bus, to other servers and connected entities in the secure customer service portal environment. In addition, the service creation and provisioning server 183 has access to the secure session servers 165 which are arranged to call upon the array of application servers 180. In particular, the service creation and provisioning server 183 provides a means for a system administrator to make changes to the database 190, as depicted in FIG. 7, and by proxy has access, via the secure database access method 175 to all of the databases contained in the secure customer service proxy portal environment. In one embodiment of the invention, the service creation and provisioning server 183 will use a JDBC connection or some other suitable, commercially available database access connection to make changes in the aforementioned databases. In one aspect of the invention, the service creation and provisioning server 183 can make updates to the databases using a SOA (Services Oriented Architecture) method such as an HTTPS-based web service method. The practitioner may choose between more direct SQL-based database manipulations or a more decoupled, SOA-based approach without negatively impacting the overall efficacy of the invention. In addition to having access to the databases, the service creation and provisioning server 183 will render a forms-based or graphical representation of the database information required to provision the system. Environments for creating such an interface are commonly available commercially with products from companies such as Microsoft and Oracle for example.

A security and biometric server 184 is one of the entities associated with the application servers 180. The security and biometric server 184 has access, via the secure transmission bus, to other servers and connected entities in the secure customer service portal environment. In addition, the security and biometric server 184 has access to the secure session servers 165 which are arranged to call upon the array of application servers 180, including the reverse automation server 181, in the regular duties of setting up and tearing down sessions and transactions. In particular, the security and biometric server 184 maintains a working, real-time memory of all of the security tokens issued for each real-time transaction in use with the system at any one time. This real-time working memory is able to provide other servers, such as the secure session servers, with particular information about any security token for the expressed purpose of communicating with and sending and receiving commands to a reverse automation gateway 600 or a terminal (User) device such as a web browser 300, smart phone 320, telephone 340, or multimedia/TV set top box 360. In addition, the real time algorithms, biometric sample corpus, and executables associated with biometric sessions are controlled by the security and biometric server 184. In one embodiment of the invention, the security and biometric server 184 will control the "listening" mode of the 20 entity as depicted in FIG. 2 and the Customer Emulator Scripts, Media servers, speech and biometric token handling, secure data handling server functions 620 entity as depicted in FIG. 3.

This "listening" mode allows the security and biometric server 184 to process spoken signals and match them with biometric samples in the database to establish and verify users in a secure way. The practitioner will implement the security and biometric server 184 and media servers as per FIG. 2 and FIG. 3 using standard Application Programming Interfaces (APIs) and standard protocols such as Media Resource Control Protocol (MRCP), Voice Extensible Markup Language (VXML), State Control Extensible Markup Language (SCXML), Call Control Extensible Markup Language (CCXML). Tools and server technology to implement these standards are available from companies such as Voxeo of Orlando, Fla.

The vendor web protocol server 185 is another entity associated with the application servers 180. The vendor web protocol server 185 has access, via the secure transmission bus, to other servers and connected entities in the secure customer service portal environment. In addition, the vendor web protocol server 185 has access to the secure session servers 165 which are arranged to call upon the array of application servers 180, including the reverse automation server 181, in the regular duties of setting up and tearing down sessions and transactions. In particular, the vendor web protocol server 185 maintains a working, real-time memory of all of the web-based protocols to be used by the reverse automation gateways 600 deployed in the system. This real-time working memory is able to provide other servers, such as the Secure Session Servers, with particular information about any vendor web system for the expressed purpose of communicating with and sending and receiving commands to a vendor web system connected to the secure customer service proxy portal 100. Such information will include, but not be limited to: a) The primary protocol to be used with the Vendor web system or systems connected to each reverse automation gateway 600; and b) the alternative protocol, if any associated with the Vendor web system or systems connected to each reverse automation gateway 600. The vendor web protocol server 185 will use standards-based protocols that the practitioner will have commercial access to. In an embodiment of the invention, the practitioner will deploy standards-based protocols which are commonly available such as, but not limited to: Transmission Control Protocol/Internet Protocol (TCP/IP), Hypertext Transfer Protocol (HTTP), Voice Extensible Markup Language (VXML) and Extensible Messaging and Presence Protocol (XMPP); and Real-Time Transport Protocol (RTP).

The report generation server 186 is still another entity associated with the application servers 180. The report generation server 186 has access, via the secure transmission bus, to other servers and connected entities in the secure customer service portal environment. In addition, the report generation server 186 has access to the secure session servers 165 which are arranged to call upon the array of application servers 180. In particular, the report generation server 186 provides a means for a system administrator to run diagnostic and management reports based on the real time information stored in volatile memory of the application servers 180 and the historical information stored in the database 190, as depicted in FIG. 7. By proxy the report generation server 186 has access, via the secure database access method 175, to all of the databases contained in the secure customer service proxy portal environment. In an embodiment of the invention, the report generation server 186 will use a JDBC connection or some other suitable, commercially available database access connection to query the aforementioned databases. in one aspect of the invention, the report generation server 186 can get database information for reporting purposes by using a SOA (Services Oriented Architecture) method such as an HTTPS-based web service method.

The practitioner may choose between more direct SQL-based database queries or a more decoupled, SOA-based approach without negatively impacting the overall efficacy of the invention. In addition to having access to the databases, the report generation server 186 will be used to render reports in common formats such as Extensible Markup Language (XML), or Hypertext Markup Language (HTML). Such reports may be rendered using commercially available tools such as the open source tools available from JasperForge.org.

A persona resources server 187 is one of the entities associated with the application servers 180. the persona resources server 187 has access, via the secure transmission bus, to other servers and connected entities in the secure customer service portal environment. In addition, the vendor web protocol server 185 has access to the secure session servers 165 which are arranged to call upon the array of application servers 180, including the reverse automation server 181, in the regular duties of setting up and tearing down sessions and transactions. In particular, the vendor persona resources server 187 maintains a working, real-time memory of all of the customer personas to be used by the reverse automation gateways 600 deployed in the system. This real-time working memory is able to provide other servers, such as the secure session servers, with particular information about any persona for the expressed purpose of communicating with and sending and receiving commands to a vendor web system, IVR system or social networking site connected to the secure customer service proxy portal 100. In particular, the persona resources server 187 contains a working memory of each persona corral, which is a collection of user-specific profiles associated with each customer. The persona resources server 187 has access to the persona resources library and database 198 which stores relevant and useful data dealing with persona creation, maintenance, and use. The persona resources server has access to and sends commands to other servers based on Persona information including, but not be limited to: a) each persona's owner; b) each persona's name; c) financial data associated with a persona; d) social networking information associated with each persona; e) time of day preferences for each persona; e) communication channel preferences for each persona; f) vendor preferences for each persona; g) demographic exposure preferences for each persona; h) opt-in lists or commercial solicitation preferences for each persona; i) and attributes of the persona dealing with security issues and related security data such as token data.

The social site protocol server 188 is an entity associated with the application servers 180. The social site protocol server 188 has access, via the secure transmission bus, to other servers and connected entities in the secure customer service portal environment. In addition, the social site protocol server 185 has access to the secure session servers 165 which are arranged to call upon the array of application servers 180, including the reverse automation server 181, in the regular duties of setting up and tearing down sessions and transactions. In particular, the social site protocol server 188 maintains a working, real-time memory of all of the web-based protocols to be used by the reverse automation gateways 600 deployed in the system. This real-time working memory is able to provide other servers, such as the secure session servers, with particular information about any social networking web system for the expressed purpose of communicating with and sending and receiving commands to a social networking web system connected to the secure customer service proxy portal 100. Such information will include, but not be limited to: a) the primary protocol to be used with the social networking web system or systems connected to each reverse automation gateway 600; and b) the alternative protocol, if any associated with the social networking web system or systems connected to each reverse automation gateway 600.

the social site protocol server 188 will use standards-based protocols that the practitioner will have commercial access to. In an embodiment of the invention, the practitioner will deploy standards-based protocols which are commonly available such as, but not limited to: Transmission Control Protocol/Internet Protocol (TCP/IP), Hypertext Transfer Protocol (HTTP), Voice Extensible Markup Language (VXML) and Extensible Messaging and Presence Protocol (XMPP); and Real-Time Transport Protocol (RTP).

A terminal device protocol server 189 is yet another entity associated with the application servers 180. The terminal device protocol server 189 has access, via the secure transmission bus, to other servers and connected entities in the secure customer service portal environment. In addition, the terminal device protocol server 189 has access to the secure session servers 165 which are arranged to call upon the array of application servers 180, including the reverse automation server 181, in the regular duties of setting up and tearing down sessions and transactions. In particular, the terminal device protocol server 189 maintains a working, real-time memory of all of the terminal devices to be used by customers of the secure customer service proxy portal 100 and the reverse automation gateways 600 deployed in the system. This real-time working memory is able to provide other servers, such as the secure session servers, with particular information about any terminal device for the expressed purpose of communicating with and connecting these devices to end points including, but not limited to: a) vendor call centers and IVR systems; b) vendor web sites; and c) social networking web sites that are all connected to the secure customer service proxy portal 100. The terminal device protocol server 189 will store information that makes it possible to answer calls from or make calls to these devices over a variety of media. In particular, the terminal device protocol server 189 will have access to the terminal device database 191 which enables the server to identify terminal devices by their user and to identify how to reach those devices. The terminal device database 191 also stores protocol information the terminal device protocol server 189 can act upon on behalf of each user. Such information includes, but is not limited to the following: a) the unique telephone number or other address that makes the device addressable by the application; b) the communication protocol associated with the device. Such protocols may be but are not limited to SIP, 3G, PSTN, or IP; c) the order of preference for device use by each user of the application; d) alternate devices associated with the user of the application; e) security token and session token information; and f) any attributes which distinguish a specific device as to suitability for direct use by users of the application via the secure customer service proxy portal 100.

Figure 9:
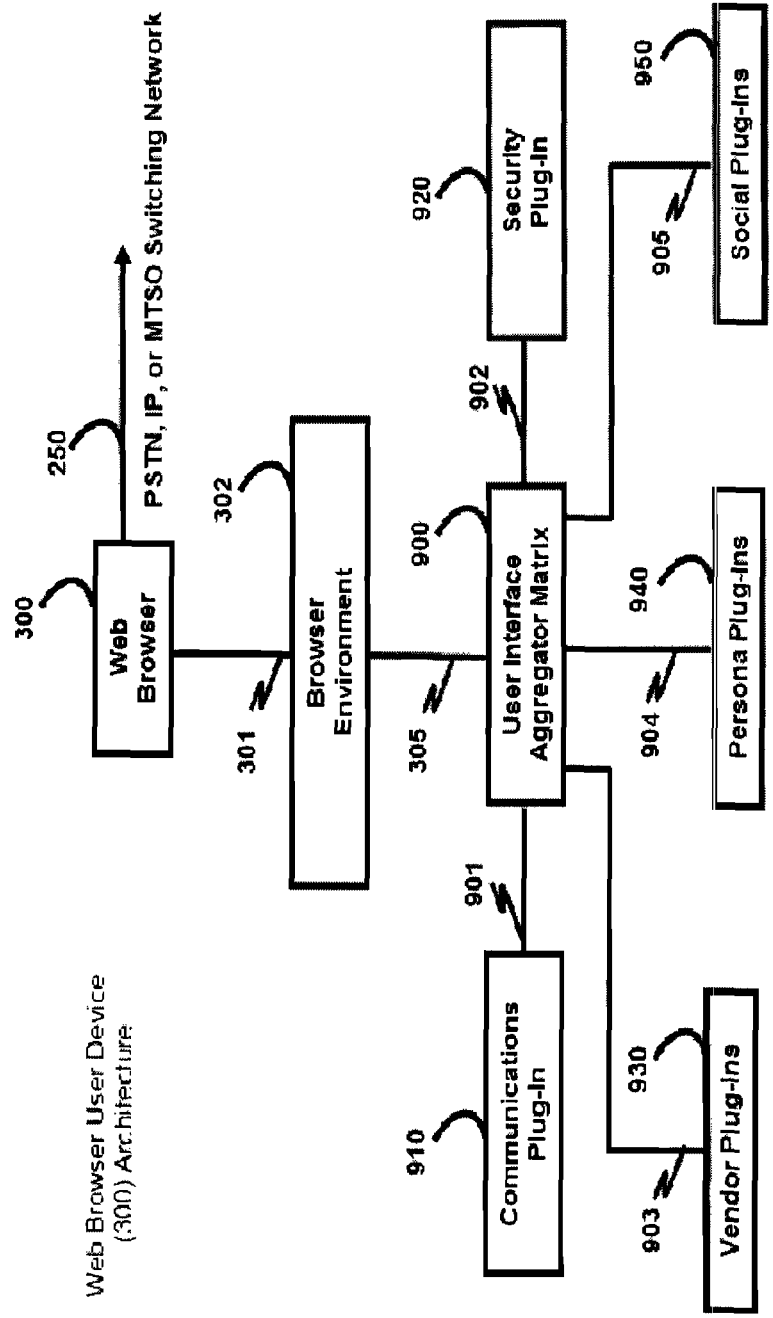
FIG. 9 is a block diagram of the architecture for a web browser user device.

FIG. 9 illustrates the architecture for the web browser 300 user device (terminal device). The web browser 300 is connected to the PSTN, IP or MTSO switching network 240 via access point 250. This is the means for the secure customer service proxy portal 100 to communicate with the terminal device.

Web browser technologies will be well known to the practitioner. There are a variety of Application Programming Interfaces (APIs), development environment (DE) and run time environments (RTE) that will support a suitable environment for various embodiments of the invention. The browser environment 302 connected to the web browser 300 is the receptacle for these APIs, DE and RTE. Programming tools for Sun Microsystems Java, Adobe Flash, Adobe Flex and others are commonly available to the practitioner.

Figure 10:
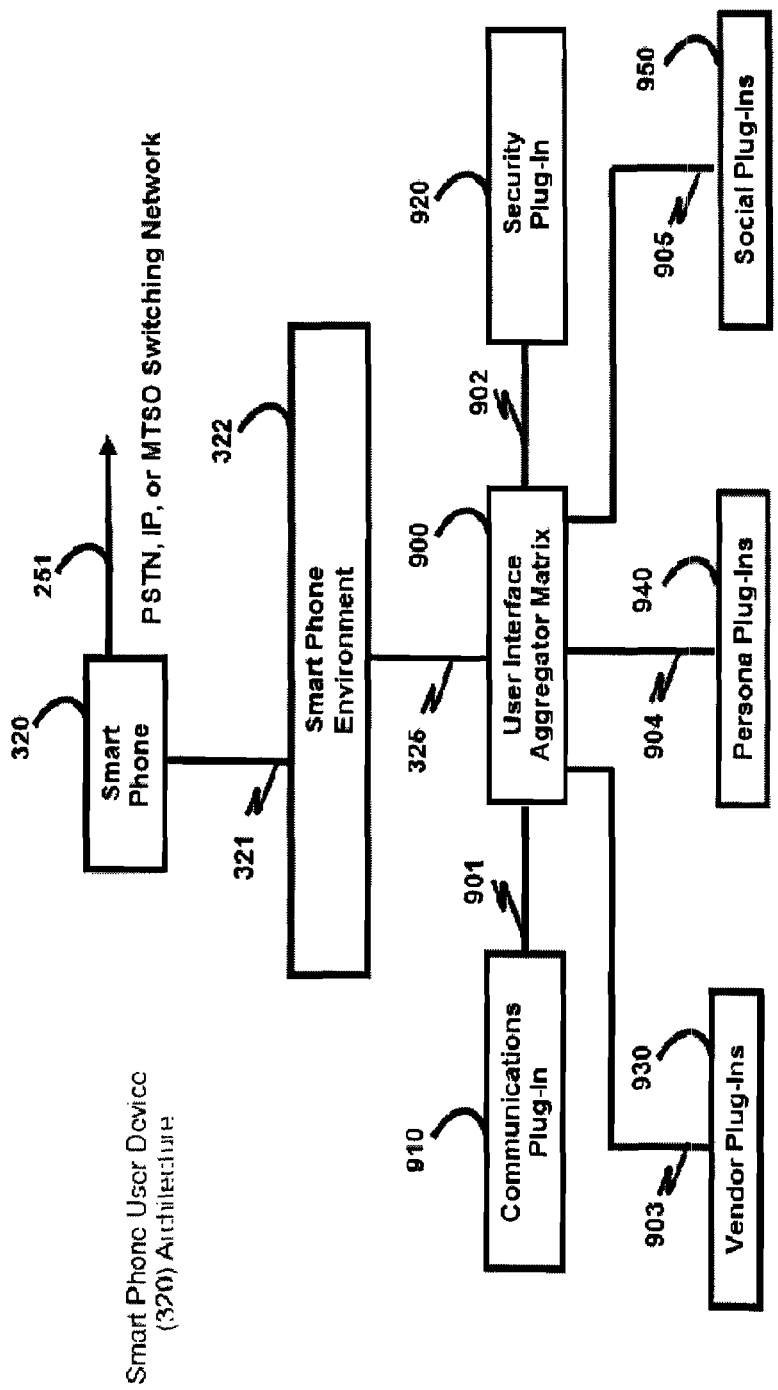
FIG. 10 is a block diagram of the architecture for a smart phone user device.
Figure 11:
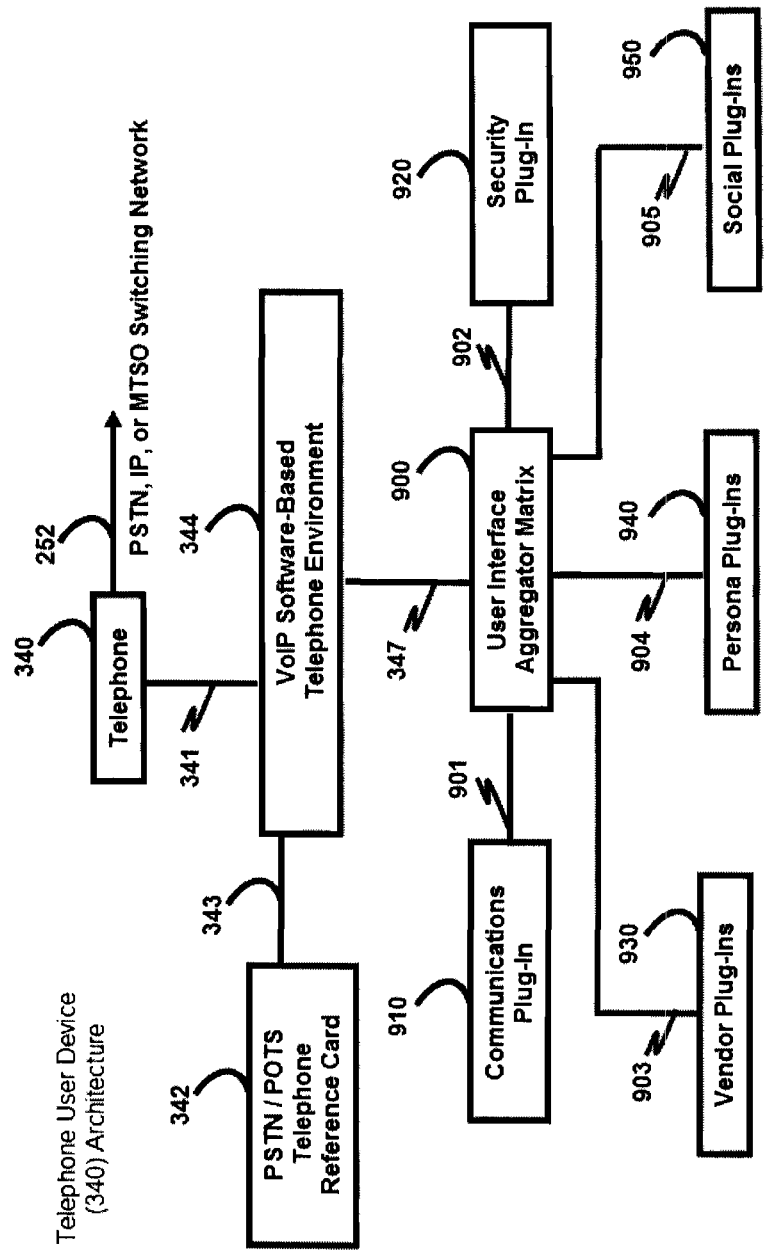
FIG. 11 is a block diagram of the architecture for a telephone user device.
Figure 12:
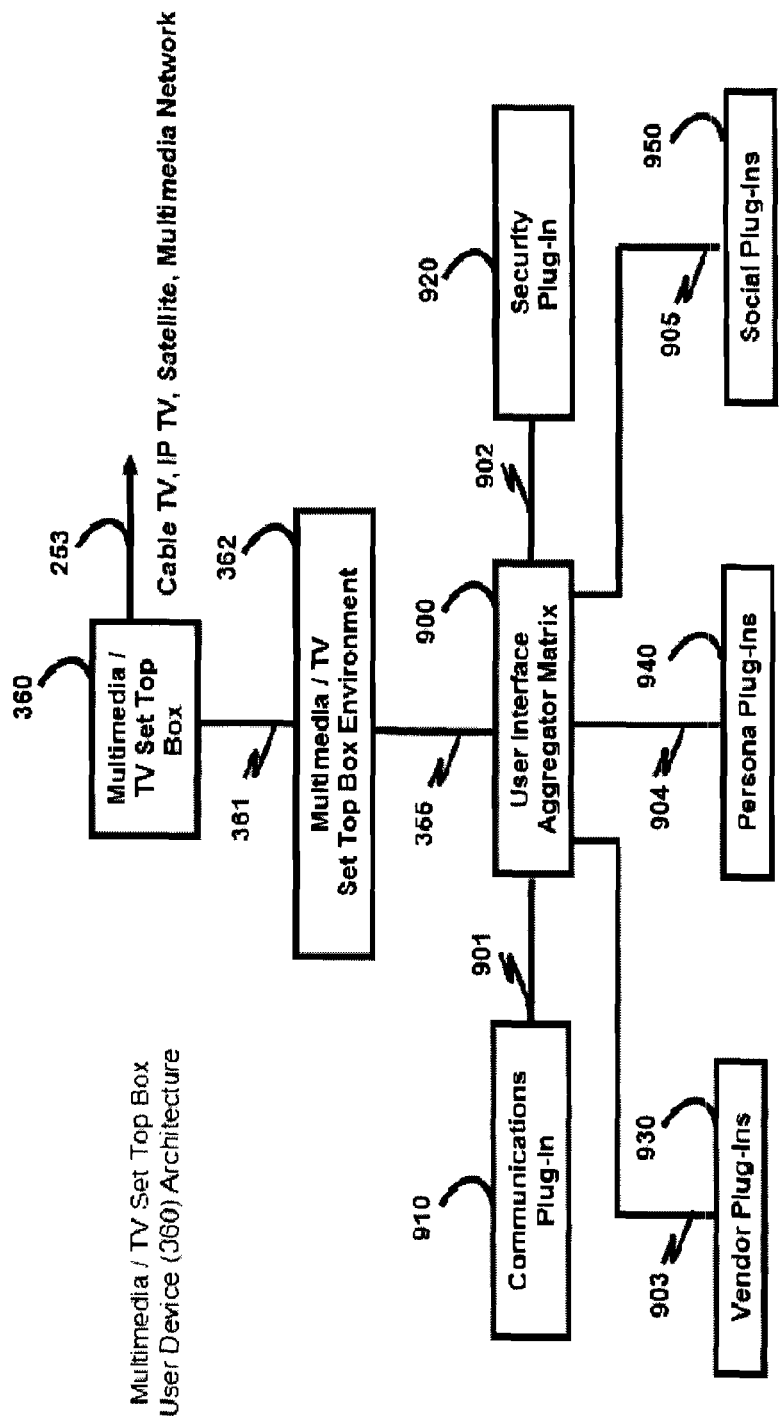
FIG. 12 is a block diagram of the architecture for the multimedia-TV set top box user device.

As depicted in FIG. 9, the browser environment 302 is the common receptacle for the user interface aggregator matrix 900 which is connected to the browser environment at access point 305. The user interface aggregator matrix 900 provides a unified look and feel to the secure customer service proxy portal end user interface. The user interface aggregator matrix 900 uses the same approach and methodology regardless of the terminal device it is deployed on. A particular aspect of the user interface aggregator matrix 900 as per each terminal device, is that its communications plug-in (910) connected as access point 901 will be adapted to the specific user environment of that specific user device. That is to say that communications plug-in 910 will have a parameter-based option to allow the user interface aggregator matrix 900 to run in a browser environment 302, a smart phone environment 322 as depicted in FIG. 10, a VoIP software-based telephone environment 344 as depicted in FIG. 11, or a multimedia/tc set top box environment 362 as depicted in FIG. 12. The communications plug-in 910 will be implemented in such a way as to not preclude its use in a variety of other environments including but not limited to live radio broadcast, two-way video communications or other multimedia communications environments. One purpose of the communications plug-in 910 is to communicate with the terminal device protocol server 189 as described in FIG. 8 and the secure session servers 165 as described in FIG. 6. These communications will occur using the protocols governed by the terminal device protocol server 189 and the secure session servers 165 as they related to the particular terminal device, the profile of which is stored in the terminal device database 191 as described in FIG. 7.

Another aspect of the invention as shown in FIG. 9 is the security plug-in (920) which is connected to the user interface aggregator matrix 900 via access point 902. the security plug-in, as with the communications plug-in 910, is a common element of the user interface aggregator matrix 900 regardless of terminal device. The security plug-in will have a parameter-based option to allow the user interface aggregator matrix 900 to run in a browser environment 302, a smart phone environment 322 as depicted in FIG. 10, a VoIP software-based telephone environment 344 as depicted in FIG. 11, or a multimedia/TC set top box environment 362 as depicted in FIG. 12. The security plug-in 920 will be implemented in such a way as to not preclude its use in a variety of other environments including but not limited to live radio broadcast, two-way video communications or other multimedia communications environments. The chief purpose of the security plug-in 920 is to communicate with the security and biometric server 184 as described in FIG. 8 and the secure session servers 165 as described in FIG. 6. These communications will occur using the rules and protocols governed by the security and biometric server 184 and the secure session servers 165 as they related to the particular terminal device, the profile of which is stored in the terminal device database 191 as described above with reference to FIG. 7. In addition, the security plug-in 920 acts as a secure mechanism to handle other secure data including but not limited to secure session keys and passwords created and used on behalf of the user.

Vendor Plug-Ins 930 are connected to the user interface aggregator matrix 900 at access point 903. Vendor plug-ins are software that allows for the arrangement and selection of vendor-based connections by the user. A more detailed view of the vendor plug-ins 930 is described below with reference to FIG. 13.

Figure 13:
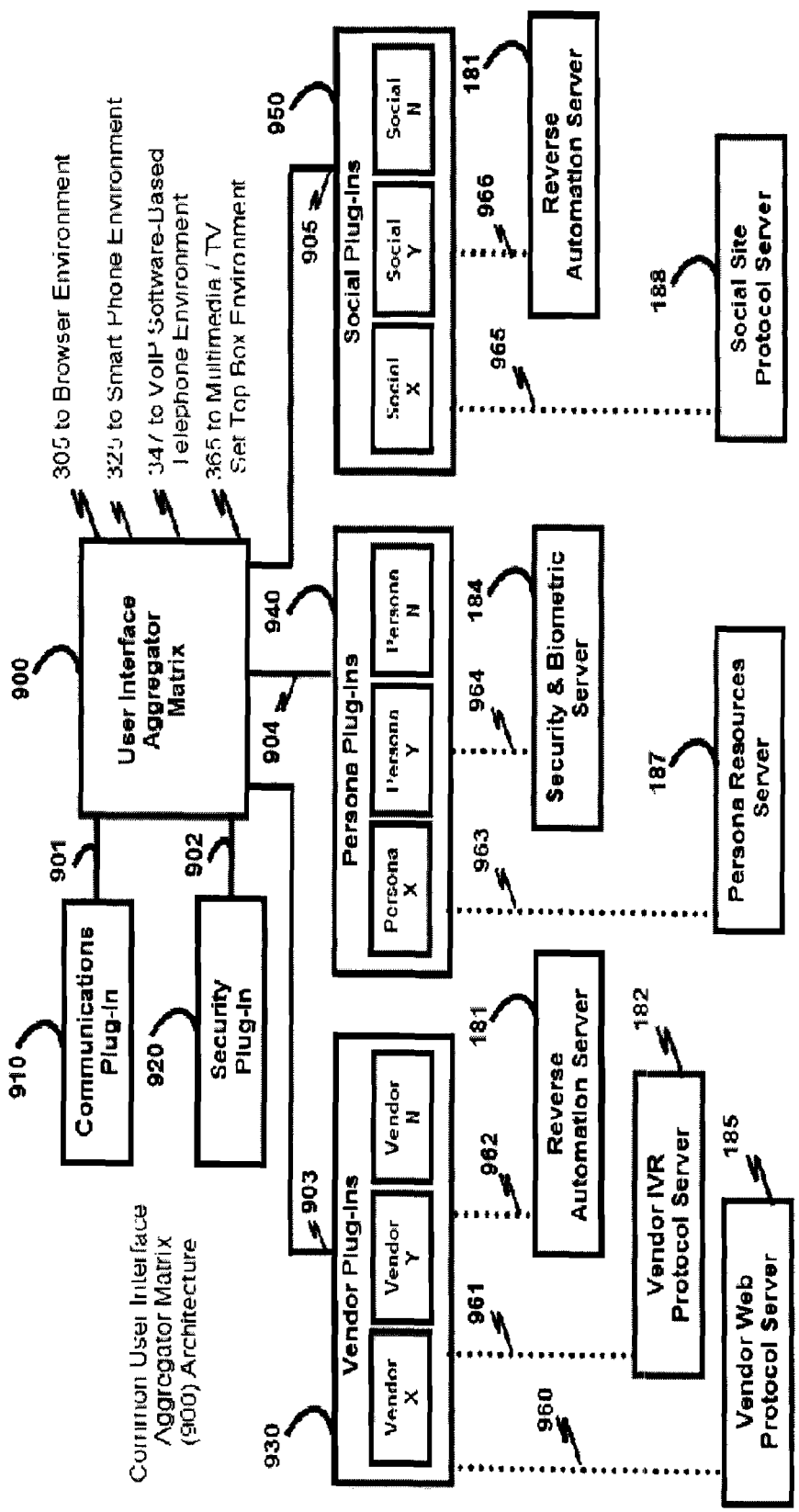
FIG. 13 is a block diagram of the architecture for the common user interface aggregator matrix.

Persona plug-ins 940 are connected to the user interface aggregator matrix 900 at access point 904. Persona plug-ins are software that allows for the configuration, arrangement and selection of personas and a persona corral by the user. A persona is a collection of attributes, created by the user, that represent a plurality of incrementally intimate and secure aspects of the relationship between the user and the vendor, and the user and a social networking site, and the user and other users. A more detailed view of the persona plug-ins 940 is depicted in FIG. 13.

Social plug-ins 950 are connected to the user interface aggregator matrix 900 at access point 905. Social plug-ins are software that allows for the arrangement and selection of social networking site-based connections by the user. A more detailed view of the social plug-ins 950 is depicted in FIG. 13.

FIG. 10 illustrates the architecture for the smart phone 320 user device (terminal device). In further detail, the smart phone 320 is connected to the PSTN, IP or MTSO switching network 240 via access point 251. This is the means for the secure customer service proxy portal 100 to communicate with the terminal device. The smart phone 320 is also connected to the smart phone environment 322 via access point 321.

Smart phone technologies will be well known to the practitioner. There are a variety of Application Programming Interfaces (APIs), development environment (DE) and run time environments (RTE) that will support a suitable environment for the invention. The smart phone environment 322 connected to the smart phone 320 is the receptacle for these APIs, DE and RTE. Programming tools for Sun Microsystems Java, Adobe Flash, Adobe Flex and others are commonly available to the practitioner. Other environments suitable for development on a smart phone may include, but are not limited to environments such as those provided by Apple Computer for its iPhone Apps.

The smart phone environment 322 is the common receptacle for the user interface aggregator matrix 900 which is connected to the smart phone environment 322 at access point 325. As with the web browser user device 300 as depicted in FIG. 9, the user interface aggregator matrix 900 provides a unified look and feel to the secure customer service proxy portal end user interface. the user interface aggregator matrix 900 uses the same approach and methodology regardless of the terminal device it is deployed on. A particular aspect of the user interface aggregator matrix 900 as per each terminal device, is that its communications plug-in 910 connected as access point 901 will be adapted to the specific user environment of that specific user device as described in FIG. 9.

Another aspect illustrated in FIG. 10 is the security plug-in 920 which is connected to the user interface aggregator matrix 900 via access point 902 as described in FIG. 9. The security plug-in, as with the communications plug-in 910, is a common element of the user interface aggregator matrix 900 regardless of terminal device.

The vendor plug-ins 930 are connected to the user interface aggregator matrix 900 at access point 903. The utility of the vendor plug-ins 930 as they relate to the smart phone environment 322 are inclusive of, but not limited to the capabilities described in FIG. 9 and the detailed view in FIG. 13.

The persona plug-ins 940 are connected to the user interface aggregator matrix 900 at access point 904. The utility of the persona plug-ins 940 as they relate to the smart phone environment 322 are inclusive of, but not limited to the capabilities described in FIG. 9 and the detailed view in FIG. 13.

The social plug-ins 950 are connected to the user interface aggregator matrix 900 at access point 905. The utility of the social plug-ins 950 as they relate to the smart phone environment 322 are inclusive of, but not limited to the capabilities described in FIG. 9 and the detailed view in FIG. 13.

FIG. 11 illustrates the architecture for a telephone user device 340. The telephone 340 is connected to the PSTN, IP or MTSO switching network 240 via access point 252. This is the means for the secure customer service proxy portal to communicate with the terminal device 100.

Both regular telephone and Voice Over Internet Protocol Telephone (VoIP Telephone) technologies will be well known to the practitioner. There are a variety of Application Programming Interfaces (APIs), development environment (DE) and run time environments (RTE) that will support a suitable environment for VoIP Telephones contemplated as suitable for the invention. In addition, commonly available Interactive Voice Response (IVR) technologies will be used to link regular telephone users to the secure customer service proxy portal 100. The owners of such regular telephone terminal devices may not have ready access to software-based user devices; however, a commonly available user interface and methodology for transcribing speech and touch tone input into computer commands via IVR is well known and commercially available. For example, both Dialogic, Nuance and Voxeo are companies amongst dozens of others that make this technology available to the practitioner.

In this context, the access point 341, which connects the telephone 340 to the VoIP software-based telephone environment 344 may embody a customer premises equipment or network-based connection to the IVR system mentioned here. The purpose of such an IVR system is to take speech or touch-tone based input from the user and map it to the VoIP software-based telephone environment 344. Here, the PSTN/POTS telephone reference card 342 is a placeholder for the mapped speech or touch tone commands a user would employ to achieve the necessary software access to the same commands available in the VoIP software-based telephone environment (344). The PSTN/POTS telephone reference card 342 is a reference document that users of the telephone interface can use as a guide.

In an alternate embodiment of this aspect of the invention, the VoIP software-based telephone environment 344 may incorporate an IVR capability and be deployed as part of the media server, speech and biometric token handling, secure data handling device 20 as depicted in FIG. 2, or it may incorporate an IVR capability and be deployed as part of the reverse automation gateway 600 as depicted in FIG. 3.

In an embodiment of the telephone user device 340, the VoIP software-based telephone environment 344 will natively connect to commonly available physical VoIP phones, such as those available from Cisco or Polycom. Alternately, the VoIP software-based telephone environment will natively connect to software-based VoIP phones such as those available from Skype or Microsoft. A common attribute of VoIP phones is their ability to accept and process commands based on visual, screen-based or LED-based prompts associated with the device. The practitioner will use commercially and commonly available Applications Programming Interfaces (APIs), supplied by the VoIP vendors, or proprietary drivers, supplied by the VoIP vendors to allow the voip software-based telephone environment 344 to interoperate with these terminal devices.

As depicted in FIG. 11, the voip software-based telephone environment 344 is the common receptacle for the user interface aggregator matrix 900, which is connected to the VoIP software-based telephone environment 344 at access point 347. As with the web browser user device 300 as depicted in FIG. 9, the user interface aggregator matrix 900 provides a unified look and feel to the secure customer service proxy portal end user interface. The user interface aggregator matrix 900 uses the same approach and methodology regardless of the terminal device it is deployed on. A particular aspect of the user interface aggregator matrix 900 as per each terminal device, is that its communications plug-in 910 connected as access point 901 will be adapted to the specific user environment of that specific user device as described in FIG. 9.

Another aspect of the invention shown in FIG. 11 is the security plug-in 920 which is connected to the user interface aggregator matrix 900 via access point 902 as described in FIG. 9. The security plug-in, as with the communications plug-in 910, is a common element of the user interface aggregator matrix 900 regardless of terminal device.

FIG. 11 also depicts another aspect of the invention called the vendor plug-ins 930 which are connected to the user interface aggregator matrix 900 at access point 903. The utility of the vendor plug-ins 930 as they relate to the VoIP software-based telephone environment 344 are inclusive of, but not limited to the capabilities described in FIG. 9 and the detailed view in FIG. 13.

FIG. 11 also depicts another aspect of the invention called the persona plug-ins (940) which are connected to the user interface aggregator matrix 900 at access point 904. The utility of the persona plug-Ins 940 as they relate to the VoIP software-based telephone environment 344 are inclusive of, but not limited to the capabilities described in FIG. 9 and the detailed view in FIG. 13.

FIG. 11 also depicts another aspect of the invention called the social plug-ins 950 which are connected to the user interface aggregator matrix 900 at access point 905. The utility of the social plug-ins 950 as they relate to the VoIP software-based telephone environment 344 are inclusive of, but not limited to the capabilities described in FIG. 9 and the detailed view in FIG. 13.

FIG. 12 describes the architecture for the multimedia/TV set top box 360 user device (terminal device). In particular, the multimedia/TV set top box 360 is connected to the cable TV, IP TV, satellite, multimedia network 260 via access point 253. This is the means for the secure customer service proxy portal 100 to communicate with the terminal device. Multimedia/TV set top box 360 is also connected to the multimedia/TV set top box environment 362 via the access point 361.

Technologies typifying the multimedia/TV set top box 360 will be well known to the practitioner, as they are based on common microprocessor-based computer devices. As with a browser-based environment, there are a variety of Application Programming Interfaces (APIs), development environment (DE) and run time environments (RTE) that will support a suitable environment for the invention. The multimedia/TV set top box environment 362 connected to the multimedia/TV set top box 360 is the receptacle for these APIs, DE and RTE. Programming tools for Sun Microsystems Java, Adobe Flash, Adobe Flex and others are commonly available to the practitioner.

As depicted in FIG. 12, the multimedia/TV set top box environment 362 is the common receptacle for the user interface aggregator matrix 900 which is connected to the multimedia/TV set top box environment 362 at the access point 355. As with the web browser user device 300 shown in FIG. 9, the user interface aggregator matrix 900 provides a unified look and feel to the secure customer service proxy portal 100 end user interface. The user interface aggregator matrix 900 uses the same approach and methodology regardless of the terminal device it is deployed on. A particular aspect of the user interface aggregator matrix 900 as per each terminal device, is that its communications plug-in 910 connected as access point 901 will be adapted to the specific user environment of that specific user device as described in FIG. 9.

Another aspect of the multimedia/TV set top box environment 362 as it relates to multimedia/TV set top box 360 user devices is the interoperability and communication with associated user devices such as remote controls. In this aspect of the invention, the remote control acts as a "keyboard," allowing the user to provide input into the multimedia/TV set top box environment 362. Another aspect of the invention as it relates to the multimedia/TV set top box environment 362 is the option to derive input from users via embedded speech devices which may be available in certain multimedia/TV set top box 360 user devices. In an embodiment of the invention, the multimedia/TV set top box 360 user device will employ its own embedded speech capability as an alternative input device versus the remote control. In another aspect of the invention, the TV set top box 360 user device will act as a gateway to more traditional speech or touch-tone input mechanisms such as a network-based Interactive Voice Response (IVR) system.

Another aspect of the invention as shown in FIG. 12 is the security plug-in 920 which is connected to the user interface aggregator matrix 900 via access point 902 as described in FIG. 9. The security plug-in 920, as with the communications plug-in 910, is a common element of the user interface aggregator matrix 900 regardless of terminal device.

FIG. 12 also depicts another aspect of the invention called the vendor plug-ins 930 which are connected to the user interface aggregator matrix 900 at access point 903. The utility of the vendor plug-ins 930 as they relate to the smart multimedia/TV set top box environment 362 are inclusive of, but not limited to the capabilities described in FIG. 9 and the detailed view in FIG. 13.

FIG. 12 also depicts another aspect of the invention called the persona plug-ins 940 which are connected to the user interface aggregator matrix 900 at access point 904. The utility of the persona plug-ins 940 as they relate to the multimedia/TV set top box environment 362 are inclusive of, but not limited to the capabilities described in FIG. 9 and the detailed view in FIG. 13.

FIG. 12 also depicts another aspect of the invention called the social plug-ins 950 which are connected to the user interface aggregator matrix 900 at access point 905. The utility of the social plug-ins 950 as they relate to the multimedia/TV set top box environment 362 are inclusive of, but not limited to the capabilities described in FIG. 9 and the detailed view in FIG. 13.

FIG. 13 illustrates the architecture for the common user interface aggregator matrix 900. In particular, this view of the common user interface aggregator matrix 900 concentrates on the vendor plug-ins 930, persona plug-ins 940 and social plug-ins 950. The aspects of the invention dealing with the communications plug-In 910 and the security plug-in 920 are explained in FIG. 9.

FIG. 13 depicts an aspect of the invention called the vendor plug-ins 930 which are connected to the user interface aggregator matrix 900 at access point 903. Vendor plug-ins 930 are software that allows for the arrangement and selection of vendor-based connections by the user. Each individual vendor plug-in 930 is depicted in FIG. 13 as Vendor X, Vendor Y and Vendor N. This establishes that vendor plug-ins 930 are manifest in a plurality of vendor representations. Vendor X, for example may represent a commercial banking operation. Such an operation may have a contact center and an Interactive Voice Response System (IVR System) and it may also have a vendor web site presence in which on-line banking may be offered. Such a system normally requires an individual customer to log in with certain credentials and to establish a secure session—separate from other secure sessions which may have their own user interfaces. Vendor Y, for example may represent a catalog household goods operation. Such an operation may have a contact center and an Interactive Voice Response System (IVR System), but lack a web presence. Such an IVR system normally requires an individual customer to log in with certain credentials and to establish a secure session—separate from other secure sessions which may have their own user interfaces. Vendor N, for example may represent an automobile service center operation. Such an operation may lack a contact center and an IVR system, but may instead have a scheduling capability on its customer-facing web site. Such a web site may normally require an individual customer to log in with certain credentials and to establish a secure session—separate from other secure sessions which may have their own user interfaces. There are many other combinations that can be contemplated in another aspect of the invention and therefore vendor plug-ins 930 are not limited to these examples. In this context, the user interface aggregator matrix 900 seeks to normalize, unify and make a single interface available for the user, eliminating separate user interfaces and labor required to affect separate secure log on sequences. Through the linkages described earlier to the reverse automation gateway 600 and the automated scripts stored in the reverse automation scripts and library 192, and the general session control afforded by the secure session servers 165, the secure customer service proxy portal acts as a general aggregator of secure sessions in one aspect of the invention, whilst providing a unified, singular interface to the user in another aspect of the invention.

In an embodiment of the invention, the make up and stored attributes for the vendor plug-ins 930 will be created and provisioned with the user interface as described as part of the service creation and provisioning server 183 depicted in FIG. 8. The specific protocols and parameters used to communicate with the vendor systems represented by the Vendor Plug-Ins 930, that were entered using the service creation and provisioning server 183, will be stored in the vendor IVR protocol database 193, and the vendor web protocol database 196 as depicted in FIG. 7. The servers that will call-up the relevant profile information for use in a live session carried out on behalf of a customer will be the vendor web protocol server 185 (connected by access point 960 to the vendor plug-ins 930), the vendor IVR protocol server 182 (connected by access point 961 to the vendor plug-ins 930), and the reverse automation server 181 (connected by access point 962 to the vendor plug-ins 930). The reverse automation server 181 will receive commands from both the vendor web protocol server 185 and the vendor IVR protocol server 182 so it will know how to communicate with the target vendor device (that is the web site, contact center or IVR system).

The secure session servers 165, as depicted in FIG. 6 will be used to govern each particular session in which a vendor plug-in 930 is evoked, so the appropriate application servers 180 will come in to play for specific functions. For example, in addition to the interplay of the vendor web protocol server 185 and the vendor IVR protocol server 182, The secure session servers 165 will work in tandem with the security and biometric server 184 to verify the identity of users for secure interactions. The multi-phased biometric security schema 500 which is governed in part by the security and biometric server 184 is explained in further detail in FIG. 15.

As depicted in FIG. 13, each vendor plug-in 930 will have a distinct and separate manifestation based on its rendering in the user device which is under the control of the user interface aggregator matrix 900. For example, the selection of Vendor X, versus Vendor Y, versus Vendor N by the customer may be different in a browser environment 302 than that of a VoIP software-based telephone environment 344. Specifically, the choice of Vendor Y in a browser environment 302 may require a right mouse click on a visual icon in the form of the vendor's commercial logo which is arranged on a web site along with other logos representing other vendor plug-ins 930. Likewise, in another aspect of the invention, the choice of Vendor X in a VoIP software-based telephone environment 344 may manifest in a verbal IVR menu choice, with no visual icon. Alternately, the choice of Vendor X in a VoIP Software-based telephony environment 344 may manifest in a soft button associated with a physical VoIP telephone instrument. In the context of its use under the overall user interface aggregator matrix 900, vendor plug-ins 930 are the "destination" or one of plurality of receptacles for a dialog the user wishes to originate with a specific persona plug-in 940. In another aspect of the invention the social plug-ins 950 are the "destination" or one of a plurality of receptacle for a dialog the user wishes to originate with a specific persona plug-in 940. It is important to note that the secure customer service proxy portal 100 does not preclude the practitioner's ability to implement the invention in such a way that the user interface aggregator matrix 900 will be used to facilitate incoming interactions as well as outgoing ones using a similar model.

FIG. 13 shows a detailed view of also depicts another aspect of the invention called the persona plug-ins 940 which are connected to the user interface aggregator matrix 900 at access point 904. persona plug-ins 940 are software that allows for the configuration, arrangement and selection of personas and a persona corral by the user. A persona is a collection of attributes, created by the user, that represent a plurality of incrementally intimate and secure aspects of the relationship between the user and the vendor, and the user and a social networking site, and the user and other users. Each individual persona plug-in 940 is depicted in FIG. 13 as Persona X, Persona Y and Persona N. This establishes that persona plug-ins 940 are manifest in a plurality of personalized representations. Persona X, for example may represent a persona who is configured to provide private commercial banking account numbers that can be used by a vendor plug-in 930. Persona Y, for example may represent a persona that has no secure, financial elements, but nonetheless has an attribute for allowing a communication "opt-in" on a vendor web site. Persona N, for example may represent a persona that was created specifically for establishing a dialog with a plurality of social networking sites (as represented by social plug-ins 950). Further, Persona N may be configured as a "Chatty" persona who wants to post a chat message or microblog message in the user interface aggregator matrix 900. Such a chat message or microblog will then be used in conjunction with a reverse automation server 181 to automatically log on to one or more social networking sites to post and process responses to such a message from a singular interface—that singular interface being the user interface aggregator matrix 900. There are many other combinations that can be contemplated in another aspect of the invention and therefore persona plug-ins 940 are not limited to these examples.

The make up and stored attributes for the persona plug-ins 940 may be created and provisioned with the user interface. The specific protocols and parameters used to communicate with vendor-based contact center, IVR, and web systems will be stored in the vendor IVR protocol database 193, and the vendor web protocol database 196 as depicted in FIG. 7. The servers that will call-up the relevant profile information for use in a live session carried out on behalf of a customer will be the vendor web protocol server 185, the vendor IVR protocol server 182, and the Reverse automation server 181. The reverse automation server 181 will receive commands from both the vendor web protocol server 185 and the vendor IVR protocol server 182 so it will know how to communicate with the target vendor device (that is the web site, contact center or IVR system). The secure session servers 165, as depicted in FIG. 6 will be used to govern each particular session in which a persona plug-in 940 is evoked, so the appropriate application servers 180 will come in to play for specific functions. For example, in addition to the interplay of the vendor web protocol server 185 and the vendor IVR protocol server 182, the secure session servers 165 will work in tandem with the security and biometric server 184 to verify the identity of users for secure interactions. The multi-phased biometric security schema 500 which is governed in part by the security and biometric server 184 is explained in further detail in FIG. 15. In addition, persona plug-ins 940 will access the persona resources server 187 which has access to stored persona data in the persona resources library and database 198 as depicted in FIG. 7.

As depicted in FIG. 13, each persona plug-in 940 will have a distinct and separate manifestation based on its rendering in the user device which is under the control of the user interface aggregator matrix 900. For example, the selection of Persona X, versus Persona Y, versus Persona N by the customer may be different in a browser environment 302 than that of a VoIP software-based telephone environment 344. Specifically, the choice of Persona Y in a browser environment 302 my require a right mouse click on a visual icon in the form of the persona's icon or avatar which is arranged on a web site along with other icons representing other persona plug-ins 930. Likewise, in another aspect of the invention, the choice of Persona X in a VoIP software-based telephone environment 344 may manifest in a verbal IVR menu choice, with no visual icon. Alternately, the choice of Persona N in a VoIP Software-based telephony environment 344 may manifest in a soft button associated with a physical VoIP telephone instrument. In the context of its use under the overall user interface aggregator matrix 900, persona plug-ins 940 are the items that get dragged on to, or are associated with a specific or group of vendor plug-ins 930 or with social plug-ins 950. A communication is started based on the user associating any persona with either a vendor plug-ins 930 or a social plug-ins 950. It is important to note that the secure customer service proxy portal 100 does not preclude the practitioner's ability to implement the invention in such a way that the user interface aggregator matrix 900 will be used to facilitate incoming interactions as well as outgoing ones using a similar model.

FIG. 13 also depicts another aspect of the invention called the social plug-ins 950 which are connected to the user interface aggregator matrix 900 at access point 905. Social plug-ins 950 are software that allows for the arrangement and selection of social networking site-based connections by the user. Each individual social plug-in 950 is depicted in FIG. 13 as Social X, Social Y and Social N. This establishes that Social plug-ins 950 are manifest in a plurality of social networking site representations. Social X, for example may represent a micro-blogging site such as Twitter, for example.

Such an operation may have a web site presence in which on-line chats, microblogs or other communications may be enabled. Such a site normally requires an individual customer to log in with certain credentials and to establish a secure session—separate from other secure sessions which may have their own user interfaces. Social Y, for example may represent a career-oriented social networking site such as Linked-In, for example. As with the example for Social X, such a site normally requires an individual customer to log in with certain credentials and to establish a secure session— separate from other secure sessions which may have their own user interfaces. Social Y, for example may represent a high school reunion Social Networking Site. Such an operation may have a live chat capability which allows users to post real time or close to real time messages. As with Social X, such a site normally requires an individual customer to log in with certain credentials and to establish a secure session—separate from other secure sessions which may have their own user interfaces. There are many other combinations that can be contemplated in another aspect of the invention and therefore social plug-ins 950 are not limited to these examples. In this context, the user interface aggregator matrix 900 seeks to normalize, unify and make a single interface available for the user, eliminating separate user interfaces and labor required to affect separate secure log on sequences. Through the linkages described earlier to the Reverse automation gateway 600 and the automated scripts stored in the reverse automation scripts and library 192, and the general session control afforded by the secure session servers 165, the secure customer service proxy portal 100 acts as a general aggregator of secure sessions in one aspect of the invention, whilst providing a unified, singular interface to the user in another aspect of the invention.

In an embodiment of the invention, the make up and stored attributes for the social plug-ins 950 will be created and provisioned with the user interface as described as part of the service creation and provisioning server 183 depicted in FIG. 8. The specific protocols and parameters used to communicate with the social networking sites represented by the social plug-Ins 950, that were entered using the service creation and provisioning server 183, will be stored in the social site protocol database 199 as depicted in FIG. 7. The servers that will call-up the relevant profile information for use in a live session carried out on behalf of a customer will be the social site protocol server 188 (connected by access point 965 to the social plug-ins 950), and the reverse automation server 181 (connected by access point 966 to the social plug-ins 950). The reverse automation server 181 will receive commands from the social site protocol server 188 so it will know how to communicate with the target social networking web site. The secure session servers 165, as depicted in FIG. 6 will be used to govern each particular session in which a social plug-in 950 is evoked, so the appropriate application servers 180 will come in to play for specific functions. For example, in addition to the interplay of the social site protocol server 188, the secure session servers 165 will work in tandem with the security and biometric server 184 to verify the identity of users for secure interactions. the multi-phased biometric security schema 500 which is governed in part by the security and biometric server 184 is explained in further detail in FIG. 15.

As depicted in FIG. 13, each social plug-in 950 will have a distinct and separate manifestation based on its rendering in the user device which is under the control of the user interface aggregator matrix 900. For example, the selection of Social X, versus Social Y, versus Social N by the customer may be different in a browser environment 302 than that of a VoIP software-based telephone environment 344. Specifically, the choice of Social Y in a browser environment 302 my require a right mouse click on a visual icon in the form of the social networking site's commercial logo which is arranged on a web site along with other logos representing other social plug-ins 950.

Likewise, in another aspect of the invention, the choice of Social X in a VoIP software-based telephone environment 344 may manifest in a verbal IVR menu choice, with no visual icon. Alternately, the choice of Social Y in a VoIP software-based telephony environment 344 may manifest in a soft button associated with a physical VoIP telephone instrument. In the context of its use under the overall user interface aggregator matrix 900, social plug-ins 950 are the "destination" or one of plurality of receptacles for a dialog the user wishes to originate with a specific persona plug-in 940. In another aspect of the invention the vendor plug-ins 930 are the "destination" or one of a plurality of receptacles for a dialog the user wishes to originate with a specific persona plug-in 940. It is important to note that the secure customer service proxy portal 100 does not preclude the practitioner's ability to implement the invention in such a way that the user interface aggregator matrix 900 will be used to facilitate incoming interactions as well as outgoing ones using a similar model.

Figure 14:
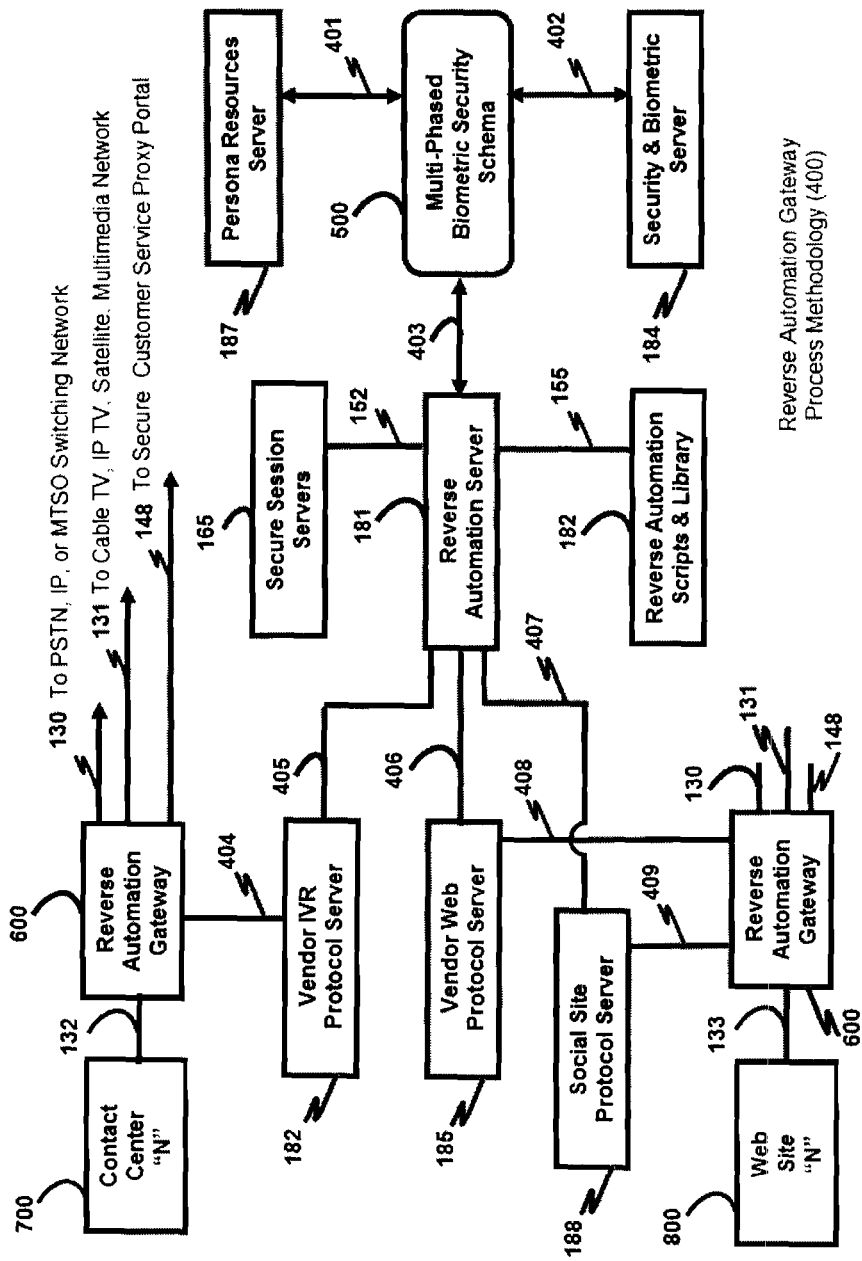
FIG. 14 is a block diagram of the process methodology for the reverse automation gateway.

FIG. 14 illustrates the reverse automation gateway process methodology 400. Central to this process is the reverse automation server (181), which provides the basic logic and instructions for the reverse automation gateway 600. The reverse automation server 181 has access to the reverse automation scripts and library 182 via its connection at access point 155 representing the secure transmission bus 160 as depicted in FIG. 6. Similarly, access points 401, 402, 403, 404, 405, 406, 407, 408, and 409 all provide a logical link between related servers in the process and the secure transmission bus 160. Access point 152 also links the reverse automation server 181 with the secure session servers 165 via the secure transmission bus 160 as depicted in FIG. 6. In an embodiment of the invention, all servers depicted in FIG. 14 will be logically separated and distributed so as to create a resilient architecture. Such an arrangement will be commonly known to the practitioner and is considered a general best practice in computing and networking.

The reverse automation scripts and library 182 is the database receptacle for the individual scripts and logic required to provide a robotic and automated traversal of both web sites and contact centers and Interactive Voice Response (IVR) systems. It is well known that the majority of IVR systems and Web sites are designed in a peculiar way, so as to defy a common methodology or user interface. The reverse automation scripts and library 182 holds data that is used by the reverse automation server 181 to reconcile the disparate nature of these IVR and Web site approaches. In this context, the reverse automation server 181 acts as a point of consolidation for a plurality of automated scripts representing a plurality of vendor automation systems. In one aspect of the invention, the secure customer service proxy portal 100 acts as a single proxy for a plurality of vendor-facing interfaces. In another aspect of the invention, the user interface aggregator matrix 900, which is also connected to the secure customer service proxy portal 100, acts as a proxy for a plurality of customer-facing interfaces called Personas. Together, these aspects of the system eliminate redundant automation steps, provide a robotic concierge aspect for the user, and unify multiple vendor and social site experiences into one user interface for the user. At the heart of this process is the reverse automation gateway process methodology 400.

As FIG. 14 depicts, the reverse automation server 181 is connected to the secure session servers 165. The secure session servers 165 maintain context of individual sessions, session keys and protocols on behalf of each customer interaction. The secure session servers 165 are also central to the multi-phased biometric security schema 500, with its related connections to the persona resources server 187 and security and biometric sever (184). Details on the multi-phased biometric security schema (500) are further shown in FIG. 15.

The reverse automation server 181 is able to connect to multiple reverse automation gateways 600, each of which may serve a discrete function relative to the vendor contact center, IVR system or web site it is connected to. In an embodiment of the invention, a reverse automation gateway 600 that is connected to a vendor contact center "N" 700, will call upon its native media server and network interfaces, as shown in FIG. 3, to communicate with the vendor IVR system with its PBX, ACD, IVR interface 640. In another aspect of one embodiment of the invention, and in order to connect to a vendor-specific web site on behalf of a customer, a reverse automation gateway 600 that is connected to a vendor web site "N" (800), will call upon its native media server and network interfaces, as shown in FIG. 3, to communicate with the vendor web system with its Web, HTTP, TCP/IP Interface 660.

In another aspect of the invention, and in order to connect to a social networking-specific web site on behalf of a customer, a reverse automation gateway 600 that is connected to a vendor web site "N" 800, will call upon its native media server and network interfaces, as shown in FIG. 3, to communicate with the social site with its Web, HTTP, TCP/IP Interface 660. What distinguishes the connection to a vendor web site versus a social networking site, is the use of the vendor web protocol converter 185 versus the social site protocol server 168, respectively. The make-up and physical configuration of the reverse automation gateway 600 may be constant. The practitioner may use one set of reverse automation gateways 600 to be optimally configured for web site interfacing and yet another set of reverse automation gateways to be optimally configured for IVR interfacing. Such distinctions shall have no adverse affect on the applicability of the invention.

Figure 15:
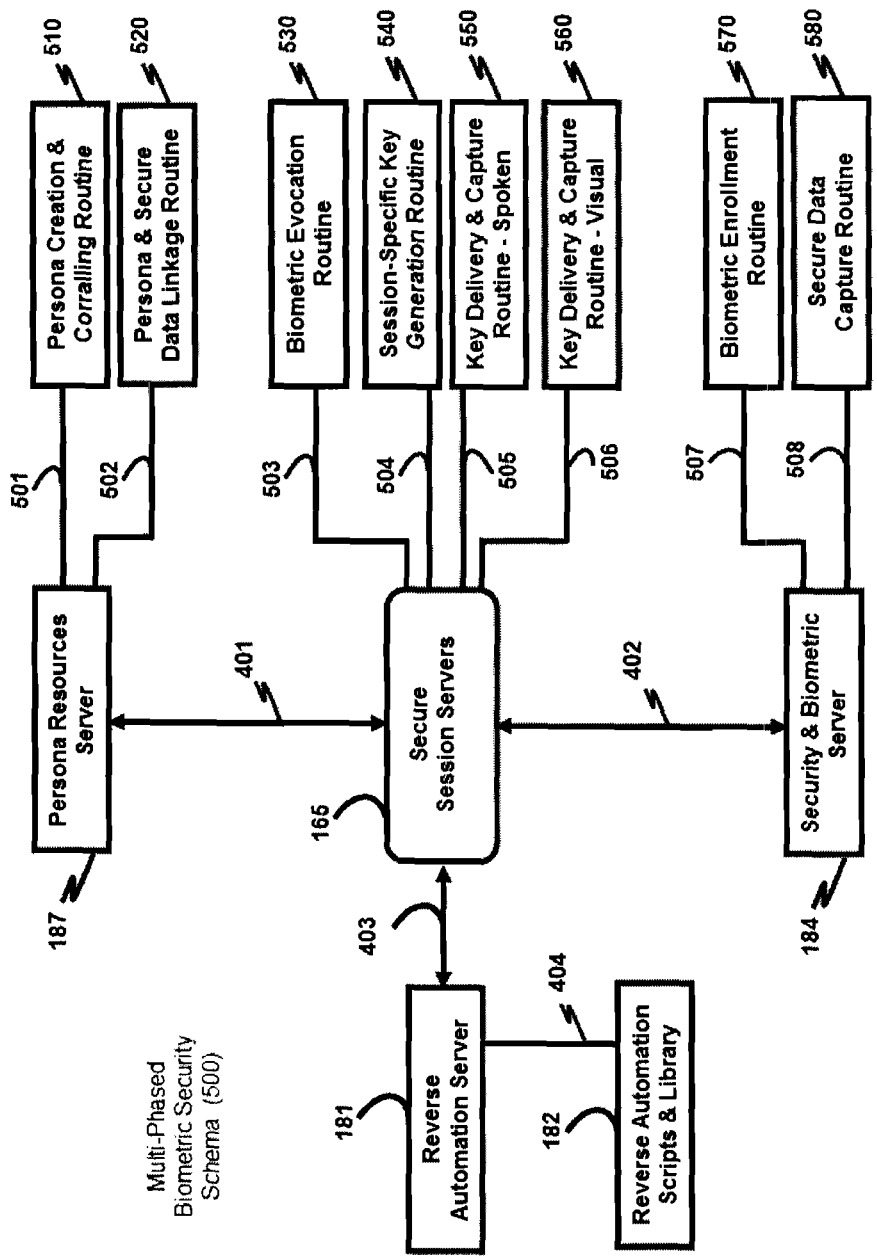
FIG. 15 is diagram illustrating the schema for multi-phased biometric security.

FIG. 15 describes the multi-phased biometric security schema 500. Central to the security schema is the secure session servers 165. the secure session servers 165 are able to connect to all other application services and special resources 15 over the secure transmission bus 160 and its related access points. In FIG. 15, the access points representing the secure transmission bus are 401, 402, and 403 which connect the secure session servers to the persona resources server 187, security and biometric server 184, and the reverse automation server 181, respectively.

One aspect of the multi-phased biometric security schema 500 is the routine for creating a persona and adding it to the personal corral. This is depicted in FIG. 15 as Persona Creation and corralling routine 510 connected logically to the persona resources server 187 over access point 501. In this routine, certain private financial and personal data may be collected by the system. Such information being sensitive, it is therefore necessary to ensure that the user of the system who is creating the persona is verified. It is also therefore necessary after user verification to challenge the user for a password. These two steps, which may be preceded by a biometric enrollment, are prerequisites to creating, editing and corralling personas. The logic flow for these steps is described in FIG. 16. Also associated with the persona resources server 187 over access point 502 is the persona and secure data linkage routine 520. The persona and secure data linkage routine takes the output from the data entered by the user with their terminal device (user device), and encrypts this data. This encrypted data is then associated with a session encryption key, which is generated by the security and biometric server 184 and passed on to the secure session servers 165 each time a session is started. A session may include an interaction to create, edit or corral a persona using a persona plug-in 940; or to associate a persona with a vendor plug-in 930, or to associate a persona plug-in 940 with a social plug-in 950.

The association between a persona using the persona plug-in 940 with either a vendor plug-in 930 or a social plug-in 950 is not necessarily limited to a one-to-one relationship between these elements. In another aspect of the invention, multiple, simultaneous associations may be achieved. Each time the user makes an association with these elements, a session is created by the secure session server. That is unless a secure session and related secure session token has already been created and the action of association is a continuation of an existing session. The persona and secure data linkage routine 520, then is a standard security procedure that governs the use of encrypted session keys created by the security and biometric server 184, the association of those keys with a specific session created and maintained by the secure session servers 165, and linked logically to the persona in use by the persona resources server 187. In an embodiment of the invention, all transmissions dealing with the persona creation and corralling routine 510 and the persona and secure data linkage routine 520 are encrypted during transmission and encrypted when stored. The practitioner will be familiar with the industry best practices associated with this encryption as described in detail by the Payment Card Industry Data Security Standard (PCI DSS) as defined by the PCI Security Standards Council.

Another aspect of the multi-phased biometric security schema 500 as depicted in FIG. 15 is the biometric evocation routine 530. The biometric evocation routine 530 is connected logically to the secure session servers 165 at access point 503. In this routine, a match-up of a user's voice is compared to a previously captured sample of the user's voice in order to verify identity. The practitioner will find industry standard examples of such an implementation of biometric evocation as per software supplied by Nuance and IBM for example.

Such evocation will occur in two circumstances as it relates to the secure customer server proxy portal 100. First, a biometric evocation will happen during the biometric enrollment routine 570 as explained later here in association with FIG. 15. The biometric enrollment routine 570 is further explained in FIG. 20 and FIG. 21. Second, biometric evocation will be used as part of the secure data capture routine 580 as explained later here in association with FIG. 15. the secure data capture routine 580 is further explained in FIG. 22 and FIG. 23.

Another aspect of the multi-phased biometric security schema 500 as depicted in FIG. 15 is the session-specific key generation routine 540. The session-specific key generation routine 540 is connected logically to the secure session servers 165 at access point 504. In this routine, an encrypted session number is generated by the security and biometric server 184 at the establishment of a session created by the secure session server 165. Once the key is generated by the security and biometric server 184 it is then encrypted and passed on to the secure session server 165 and then used for the remainder of the session. The key token is then "thrown away" at the termination of the session. The knowledge of how to implement this key token model is commonly available. The practitioner will find instructions on how to generate, encrypt, and use keys and tokens as per examples provided by the well-known Diffie-Hellman key exchange cryptographic protocol or RSA Security models.

Another aspect of the multi-phased biometric security schema 500 as depicted in FIG. 15 is the key delivery and capture routine—spoken 550. the key delivery and capture routine—spoken 550 is connected logically to the secure session servers 165 at access point 505. In this routine, an encrypted, user-facing token is generated by the security and biometric server 184 at the establishment of a session created by the secure session server 165. Once the encrypted, user-facing token is generated by the security and biometric server 184 it is then passed on to the secure session server 165 and then used to establish the validity of the session by challenging the user for a "read-back" of the encrypted, user-facing token once it is rendered at the user terminal device. Such a user-facing token may be spoken by an imbedded speech mechanism at the point of the terminal device, or it may be spoken in a more traditional manner by way of a standard Interactive Voice Response (IVR) delivery. If by embedded speech mechanism at the user device, a command will be sent to the device via the session control, voice gateway, sms, chat, email gateway 10 as described in FIG. 2. If by IVR, the user-facing token will be spoken out by the session control, voice gateway, SMS, chat, email gateway 10 as described in FIG. 2. The user will then respond the challenge of this spoken user-facing token by repeating it back to the system. The media server, speech and biometric token handling, secure data handling 20 element of the secure customer service proxy portal 100 will then analyze the response to confirm its validity in order to allow the session to continue. This key delivery and capture routine—spoken 550 is incorporated by reference in logical steps shown in FIG. 22 and FIG. 23.

Another aspect of the multi-phased biometric security schema 500 as depicted in FIG. 15 is the key delivery and capture routine—visual 560. The key delivery and capture routine—visual 560 is connected logically to the secure session servers 165 at access point 506. In this routine, an encrypted, user-facing token is generated by the security and biometric server 184 at the establishment of a session created by the secure session server 165.

Once the encrypted, user-facing token is generated by the security and biometric server 184 it is then passed on to the secure session server 165 and then used to establish the validity of the session by challenging the user for a "read-back" of the an encrypted, user-facing token once it is rendered at the user terminal device. Such a user-facing token may be transmitted to directly to the user's terminal device, or it may sent to an alternate device via SMS or email message, by example. This visual challenge will be sent to the device via the Session control, voice gateway, SMS, chat, email gateway 10 as described in FIG. 2. Likewise, the visual challenge may be sent to the alternate device mentioned above by the session control, voice gateway, SMS, Chat, email gateway 10 as described in FIG. 2. The user will then respond the challenge of this visual user-facing token by repeating it back to the system, typically by typing a keyboard-type response or using buttons on a remote control, depending upon the particular user device being handled by the user. The media server, speech and biometric token handling, secure data handling 20 element of the secure customer service proxy portal 100 will then analyze the response to confirm its validity in order to allow the session to continue. This key delivery and capture routine—visual 560 is incorporated by reference in logical steps shown in FIG. 22 and FIG. 23.

Another aspect of the multi-phased biometric security schema 500 as depicted in FIG. 15 is the biometric enrollment routine 570. The biometric enrollment routine 570 is connected logically to the security and biometric server 184 at access point 507. In this routine, a pre-supplied enrollment number or Personal Identification Number (PIN) is employed by the user to start the session. At this point, a temporary secure session key is generated by the security and biometric server 184 at the establishment of a session created by the secure session server 165. The user is then prompted to speak a unique word that is then associated with the user's voice and then stored as an encrypted biometric token security and biometric encryption database 195. In subsequent sessions, this encrypted biometric token will be used to compare with subsequent utterances as part of the aforementioned biometric evocation routine 530. The dialog in which the user is solicited for a spoken biometric sample, which is captured by the system and stored as a token, is via the session control, voice gateway, SMS, Chat, email gateway 10 as described in FIG. 2. This biometric enrollment routine 570 is described also with reference to FIG. 20.

Another aspect of the multi-phased biometric security schema 500 as depicted in FIG. 15 is the secure data capture routine 580. the secure data capture routine 580 is connected logically to the security and biometric server 184 at access point 508. In this routine, all regular input supplied by the user is encrypted for transmission and also stored as encrypted data in the transaction history 197 or the security and biometric encryption database 195. Depending on the data to be encrypted and the user device employed, this secure data capture routine 580 is dependent upon the secure session servers 165 and the security and biometric server 184 to use certain data and instructions stored in the database. For example, the vendor IVR protocol database 193 will supply the secure session servers 165 and the security and biometric server 184 with the appropriate instructions for encrypting data from sessions established via the reverse automation server 181 dealing with IVR dialogs. For example, the vendor web protocol database 196 will supply the secure session servers 165 and the security and biometric server 184 with the appropriate instructions for encrypting data from sessions established via the reverse automation server 181 dealing with vendor web site dialogs.

For example, the social site protocol database 199 will supply the secure session servers 165 and the security and biometric server 184 with the appropriate instructions for encrypting data from sessions established via the reverse automation server 181 dealing with social networking web site dialogs. For example, the terminal device database 191 will supply the secure session servers 165 and the security and biometric server 184 with the appropriate instructions for encrypting data from sessions established via the session control, voice gateway, SMS, chat, email gateway 10 or the automation control voice gateway, web proxy function 610 dealing with user devices. For example, the terminal device database 191 will have data on protocols being used with user devices such as the web browser 300, smart phone 320, telephone 340 or multimedia/TV Set top box 360.

As shown in FIG. 15, the secure session servers 165 are also logically connected via access point 403 to the reverse automation sever 181. The secure session servers 165 will pass on tokens, keys, and encrypted data to the reverse automation server 181 based on the specific security routines explained here. For example, instructions to use a specific script that may be stored in the reverse automation scripts and library 182, which is logically connected to the reverse automation server 181 via access point 404, can be done in such a way that the secure data capture routine is employed to encrypt the data sent to the reverse automation gateway 600 in its execution of the script.

Figure 16:
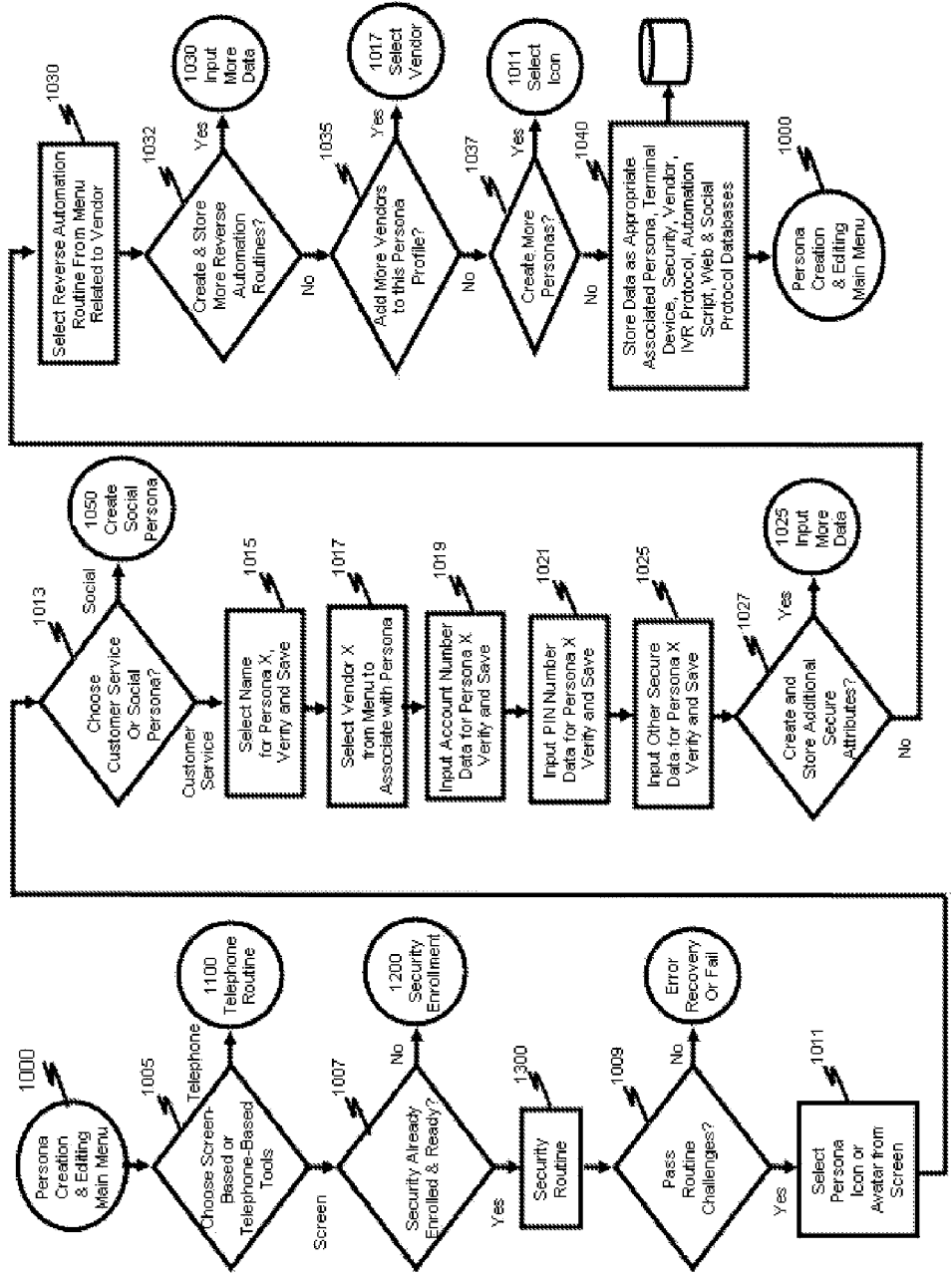
FIG. 16 is a flowchart showing the logic flow for the creation of the persona corral for customer service oriented transactions, primarily using the common user interface.

FIG. 16 is a flowchart setting forth the logic flow for the creation of the persona corral for customer service oriented transactions, primarily using the common user interface. At step 1000, the user is presented with the persona creation and editing menu. Such menu may be presented verbally as per an Interactive Voice Response (IVR) dialog, or it may be presented in a Graphical User Interface (GUI) means as appropriate for the particular user device employed. As indicated above with reference to FIG. 13, the user interface aggregator matrix 900 architecture may be used to establish a common means to present data to users. Such is the case with the presentation of menu selections and session establishment described herein. At decision branch 1005, the user is asked to choose between a screen-based versus a telephone-based approach to the creation of the persona corral. If telephone-based approach is selected, the user is further directed to step 1100 as per the logic flow described below with reference to FIG. 18. Otherwise, the logic continues to decision branch 1007.

At decision branch 1007, the system establishes whether or not the user has already been enrolled by using the biometric enrollment routine 570 as explained above with in relation to FIG. 15. If not enrolled, the user is directed to enroll in accordance with step 1200 as per the logic flow further detailed below with reference to FIG. 20. If the user has already enrolled the logic flow continues to step 1300, where the two-phased security routine 1300 begins as described below with reference to FIG. 22.

At decision branch 1009, the determination of pass or fail of the security two-phased security routine 1300 is made. If the user fails to pass the routine, various standard error recovery methods are offered. If standard error recovery methods fail, the user is refused further access to the application. If the user passes the two-phased security routine 1300, the logic flow continues to step 1011.

At step 1011, the user is asked to select a persona icon or persona avatar from the screen. The visual attributes of the persona are not contemplated in the scope of the invention. Instead, the varied financial, personal, and social attributes of the persona are in the scope of the invention. A plurality of personas' each with different attributes may be created.

At decision branch 1013, the user is asked to select a customer service-based persona or a social networking-based persona. A customer service-based persona will be associated with vendor plug-ins 930, and a social networking-based persona will be associated with social plug-ins 950. If the user chooses to create a social networking-based persona, the logic flow continues to step 1050, which is discussed in greater detail below with reference to FIG. 17.

Otherwise, the logic continues as shown. At step 1015, the user selects a name for the persona. This name is verified and then saved in the persona resources library ands database 198. At step 1017, the user selects a vendor from a list to be associated with this persona. This vendor attribute is verified and then saved in the persona resources library and database 198. At step 1019, the user inputs an account number associated with the selected vendor and so it is associated with this persona. This account number attribute is verified and then saved in the persona resources library and database 198. At step 1021, the user inputs a PIN number associated with the selected vendor and so it is associated with this persona. This PIN number attribute is verified and then saved in the persona resources library and database 198. At step 1025, the user inputs an additional attribute associated with the selected vendor and so it is associated with this persona. This additional attribute is verified and then saved in the persona resources library and database 198.

A variety of attributes may be solicited from the user as it relates to each vendor. This is in keeping with the type of data that may need to be used in the reverse automation of a scripted dialog with a vendor web site or vendor IVR system. This is determined when the service creation and provisioning server 183 is used to create vendor-specific reverse automation scripts which are then stored in the reverse automation scripts and library 192 database. Part of the creation of a reverse automation script is the identification of key value pairs and variables that will be stored on behalf of each customer as they are associated with that vendor. For example, a reverse automation script may have a placeholder for an account number input. Once captured here, the persona resources library and database 198 will provide the secure session servers 165 with the account number which will then be offered to the reverse automation server 181 so it can "plug in" the account number into the script for that vendor web site or IVR system on behalf of the user. These additional attributes requested at step 1025 may be the user's personal preferences for the favored path for the IVR system to take. Alternately, these additional attributes may be the user's personal preferences for an alternate favored path the vendor web site is to take. In one embodiment of the invention, these attributes will be incorporated into the system so as to allow any variable data that can be associated with any reverse automation script. It is contemplated that the secure customer service proxy portal has the ability to associate variable attributes.

At decision branch 1027, the user is asked if additional attributes are to be inputted. If so, the logic flow returns to step 1025, and otherwise, the logic flow continues to step 1030. At step 1030, the user is prompted to choose a common reverse automation routine from a menu. such reverse automation routines will have been created and described in the service creation and provisioning server 183 on behalf of the vendor in question. At decision branch 1032, the user is asked if more reverse automation routines are to be added. If so, the logic flow returns to step 1030, but if not, the logic continues to decision branch 1035. At decision branch 1035, the user is asked if more vendor data is to be entered. If so, the logic returns to step 1017, and otherwise, the logic continues to decision branch 1037. At decision branch 1037, the user is asked if data for more personas is to be entered. If so, the logic returns to step 1011, and if not, the logic continues to step 1040.

At step 1040, the system synchronizes all of the data collected from the user. This data is stored in the appropriate databases and also distributed in real time to the affected servers so the most recent user selects may be put to use immediately. The common user interface creation of persona corral terminates at this point as the user is returned to step 1000, which is the persona creation and editing main menu.

Figure 17:
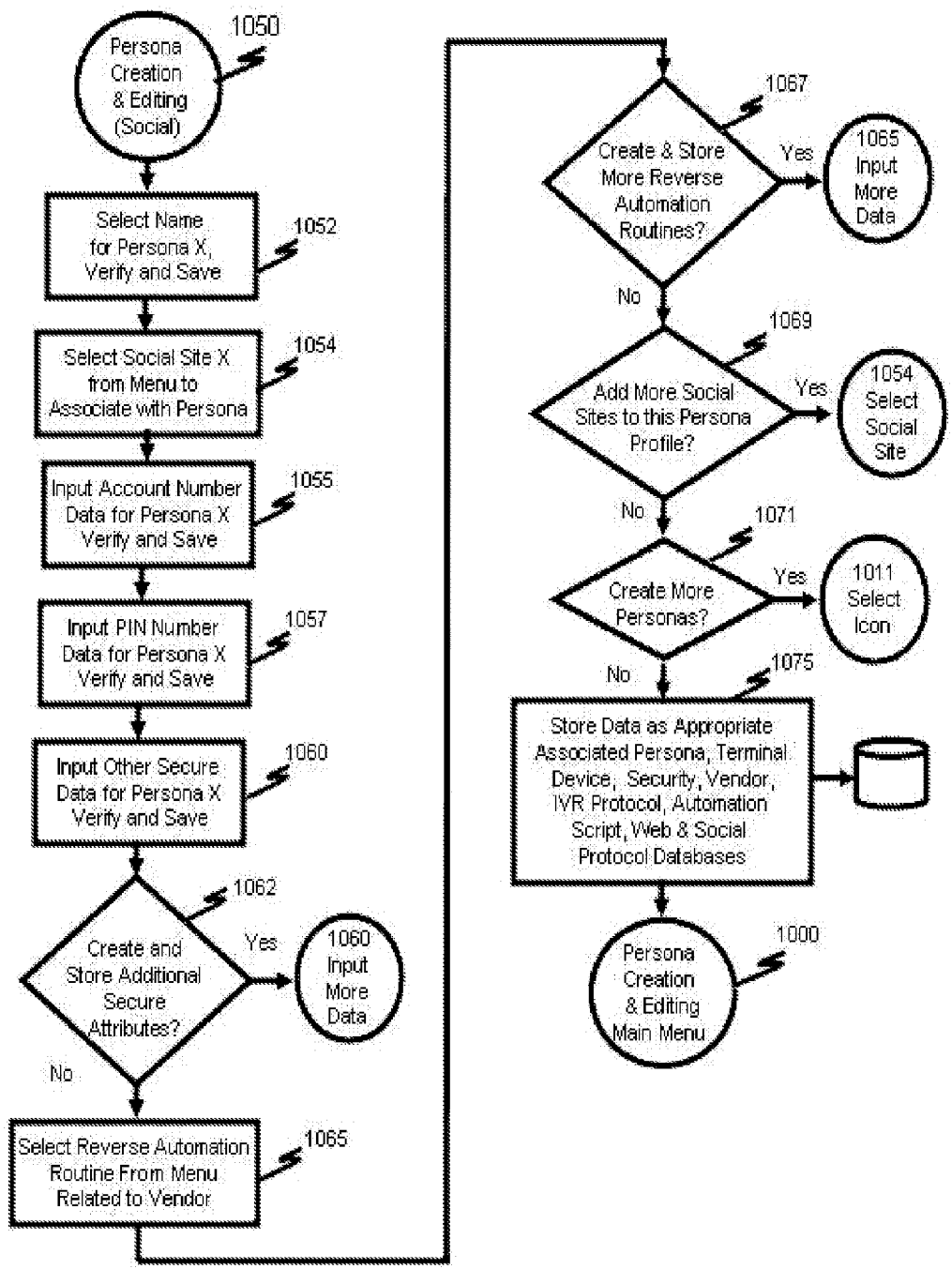
FIG. 17 is a flowchart showing the logic flow for the creation of the persona corral for social networking oriented transactions, primarily using the common user interface.

FIG. 17 describes the logic flow for the creation of the persona corral for social networking oriented transactions, primarily using the common user interface. At step 1050, the user is presented with the a social networking persona creation and editing menu. Such menu may be presented verbally as per an Interactive Voice Response (IVR) dialog, or it may be presented in a Graphical User Interface (GUI) means as appropriate for the particular user device employed. As indicated above with reference to FIG. 13, the user interface aggregator matrix 900 architecture may be used to establish a common means to present data to users. Such is the case with the presentation of menu selections and session establishment described herein.

At step 1052, the user selects a name for the persona. This name is verified and then saved in the persona resources library and database 198. At step 1054, the user selects a social networking site from a list to be associated with this persona. This vendor attribute is verified and then saved in the persona resources library and database 198. At step 1055, the user inputs an account number associated with the selected social networking site and so it is associated also with this persona. This account number attribute is verified and then saved in the persona resources library and database 198.

At step 1057, the user inputs a PIN number associated with the selected Social Networking Site and so it is associated also with this persona. This PIN number attribute is verified and then saved in the persona resources library and database 198. At step 1060, the user inputs an additional attribute associated with the selected social networking site and so it is associated also with this persona. This additional attribute is verified and then saved in the persona resources library and database 198.

A variety of attributes may be solicited from the user as it relates to each social networking site. This is in keeping with the type of data that may need to be used in the reverse automation of a scripted dialog with a social networking site. This is determined when the service creation and provisioning server 183 is used to create social networking site-specific reverse automation scripts which are then stored in the reverse automation scripts and library 192 database. Part of the creation of a reverse automation script is the identification of key value pairs and variables that will be stored on behalf of each customer as they are associated with that social networking site. For example, a reverse automation script may have a placeholder for an account number input. Once captured here, the persona resources library and database 198 will provide the secure session servers 165 with the account number which will then be offered to the reverse automation server 181 so it can "plug in" the account number into the script for that social networking site on behalf of the user. These additional attributes received at step 1060 may be the user's personal preferences for the favored path of communication desired to be taken by the social networking site. For example, a favored path may be to log on and post a micro-blog entry. Alternately, these additional attributes at step 1060 may be an alternate favored path desired for the social networking site to take. In an embodiment of the invention, these attributes will be incorporated into the system so as to allow any variable data that can be associated with any reverse automation script.

At step 1062, the user is asked if he wishes to input additional attributes. If he wishes to add additional attributes, he is directed back to 1060. If he is done with attribute input, the logic flow continues to step 1065. At step 1065, the user is asked to choose a common reverse automation routine from a menu. Such reverse automation routines will have been created and described in the service creation and provisioning server 183 on behalf of the vendor in question.

At decision branch 1067, the user is asked if he wishes to input more reverse automation routines. If he wishes to add an additional reverse automation routine, he is directed back to step 1065. If he is done with attribute input, the logic flow continues to step 1069. At step 1069, the user is asked if he wishes to input data for more social networking sites. If he wishes to add additional social networking sites, he is directed back to step 1054. If he is done with social networking site input, the logic flow continues to step 1071. At step 1071, the user is asked if he wishes to input data for more personas. If he wishes to add additional personas, he is directed back to step 1011. If he is done with persona input, the logic flow continues to step 1075.

At step 1075, the system synchronizes all of the data collected from the user. This data is stored in the appropriate databases and also distributed in real time to the affected servers so the most recent user selects may be put to use immediately. Then the user is returned to step 1000, which is the persona creation and editing main menu.

Figure 18:
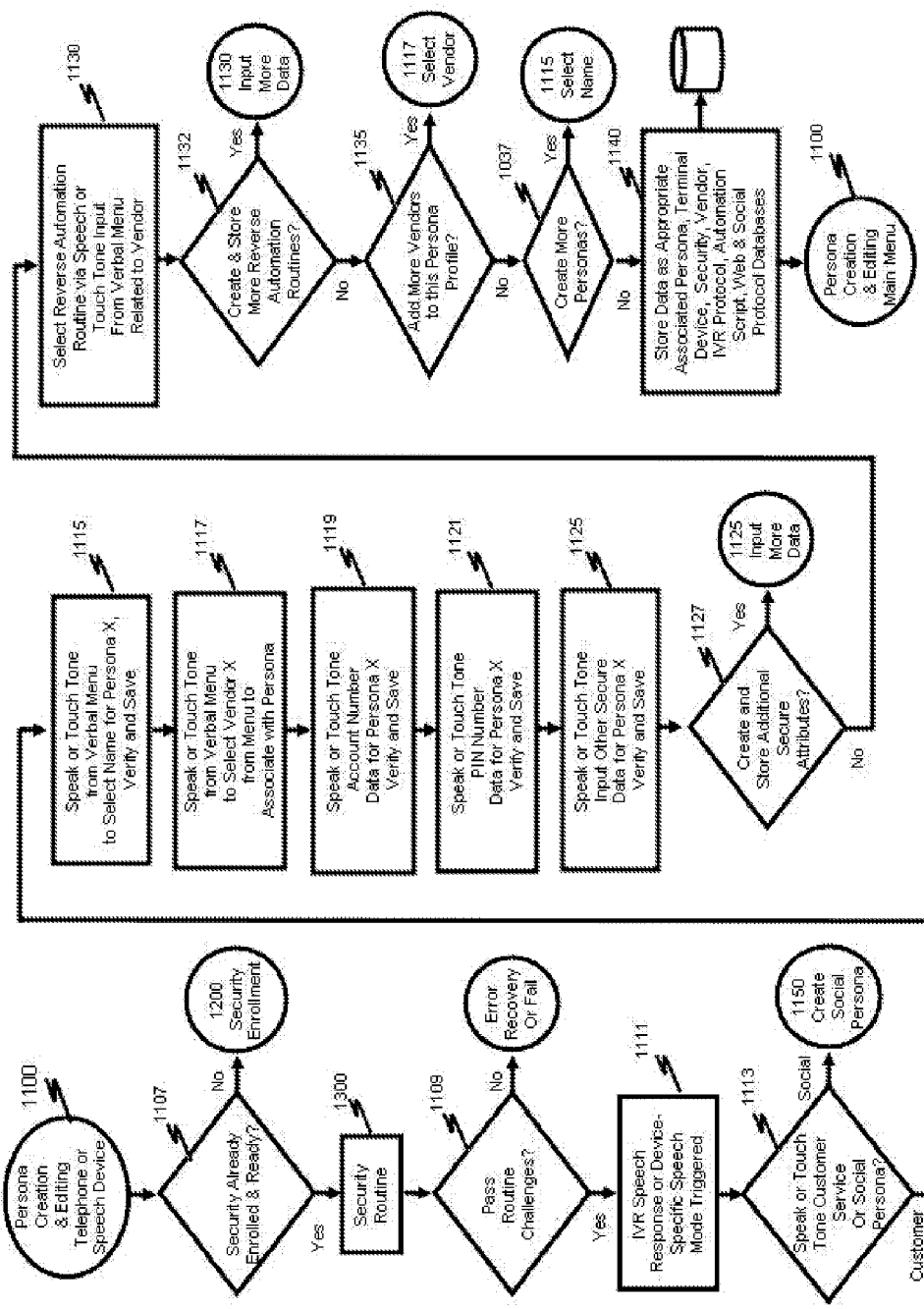
FIG. 18 is a flowchart for the creation of the persona corral for customer service oriented transactions, primarily using the telephone or speech device.

FIG. 18 is a flowchart illustrating the logic flow for the creation of the persona corral for customer service oriented transactions, primarily using the telephone or speech device. At step 1100, the user is presented with the persona creation and editing menu for telephone or speech device. This menu designed primarily to be presented verbally as per an Interactive Voice Response (IVR) dialog. Alternately, it can be used to present abbreviated SMS-type menu prompts or abbreviated soft-key prompts for VoIP Soft Phones or VoIP physical phones. FIG. 13 describes how the user interface aggregator matrix 900 architecture may be used to establish a common means to present data to users. In particular, this persona creation and editing menu for telephone or speech device can be made to work with a smart phone environment 322 as described in FIG. 10, or it can be made to work in a VoIP software-based telephone environment 344, as set forth above in relation to FIG. 11. In this aspect of the invention, the presentation of menu selections and session establishment described here is achieved primarily over the phone in an IVR-type dialog.

At decision branch 1107, the system establishes whether or not the user has already enrolled in the system by using the biometric enrollment routine 570 as explained in FIG. 15. If the user has not enrolled they are directed to enroll as per the logic flow presented in FIG. 20. If the user has already enrolled the logic flow continues to step 1300. The two-phased security routine 1300 begins as is described in FIG. 22. At decision branch 1109, the determination of pass or fail of the security two-phased security routine 1300 is made. If the user fails to pass the routine, he is offered standard error recovery methods. If standard error recovery methods fail, the user is refused further access to the application. If the user passes the Two-Phased Security Routine 1300, the logic flow in continues to step 1111. At 1111, the user is asked to select an IVR Speech response or an embedded device-oriented speech response. At decision branch 1113, the user is asked to select a customer service-based persona or a social networking-based persona. This selection is provided either with the user's spoken input or with touch-tones. A customer service-based persona will be associated with vendor plug-ins 930, and a social networking-based persona will be associated with social plug-ins 950. If the user chooses to create a social networking-based persona, he is directed as per the logic flow to step 1150. If the user chooses a customer service-based persona, the logic flow continues to step 1115.

At step 1115, the user selects a name for the persona. This selection is provided either with the user' spoken input or with touch-tones. This name is verified and then saved in the persona resources library and database 198. At step 1117, the user selects a vendor from a list to be associated with this persona. This selection is provided either with the user's spoken input or with touch-tones. This vendor attribute is verified and then saved in the persona resources library and database 198. At step 1119, the user inputs an account number associated with the selected vendor and so it is associated also with this persona. This selection is provided either with the user's spoken input or with touch-tones. This account number attribute is verified and then saved in the persona resources library and database 198. At step 1121, the user inputs a PIN number associated with the selected vendor and so it is associated also with this persona. This selection is provided either with the user's spoken input or with touch-tones. This PIN number attribute is verified and then saved in the persona resources library and database 198. At step 1125 the user inputs an additional attribute associated with the selected vendor and so it is associated also with this persona. This selection is provided either with the user's spoken input or with touch-tones. This additional attribute is verified and then saved in the persona resources library and database 198.

A variety of attributes may be solicited from the user as it relates to each vendor. This is in keeping with the type of data that may need to be used in the reverse automation of a scripted dialog with a vendor web site or vendor IVR system. This is determined when the service creation and provisioning server 183 is used to create vendor-specific reverse automation scripts which are then stored in the reverse automation scripts and library 192 database. Part of the creation of a reverse automation script is the identification of key value pairs and variables that will be stored on behalf of each customer as they are associated with that vendor. For example, a reverse automation script may have a placeholder for an account number input. Once captured here, the persona resources library and database 198 will provide the secure session servers 165 with the account number which will then be offered to the reverse automation server 181 so it can "plug in" the account number into the script for that vendor web site or IVR system on behalf of the user. These additional attributes at 1125 may be the user's personal preferences for the favored path they want the IVR system to take. Alternately, these additional attributes at 1125 may be the user's personal preferences for an alternate favored path they want the vendor web site to take. In a one embodiment of the invention, these attributes will be incorporated into the system so as to allow any variable data that can be associated with any reverse automation script.

At decision branch 1127, the user is asked if he wishes to input additional attributes. If he wishes to add additional attributes, he is directed back to step 1125. If he is done with attribute input, the logic flow continues to step 1130. At step 1130, the user is asked to choose a common reverse automation routine from a menu. This selection is provided either with the user's spoken input or with touch-tones. Such reverse automation routines will have been created and described in the service creation and provisioning server 183 on behalf of the vendor in question.

At decision branch 1132, the user is asked if he wishes to input more reverse automation routines. This selection is provided either with the user's spoken input or with touch-tones. If he wishes to add additional reverse automation routine, he is directed back to step 1130. If he is done with attribute input, the logic flow continues to decision branch 1135. At decision branch 1135, the user is asked if he wishes to input data for more vendors. This selection is provided either with the user's spoken input or with touch-tones. If he wishes to add additional vendors, he is directed back to step 1117. If he is done with vendor input, the logic flow continues to decision branch 1037. At decision branch 1137, the user is asked if he wishes to input data for more personas. This selection is provided either with the user's spoken input or with touch-tones. If he wishes to add additional personas, he is directed back to step 1115. If he is done with persona input, the logic flow continues to step 1140.

At 1140, the System synchronizes all of the data collected from the user. This data is stored in the appropriate databases and also distributed in real time to the affected servers so the most recent user selects may be put to use immediately. The user is then returned to step 1100, which is the persona creation and editing main menu for telephone or speech device.

Figure 19:
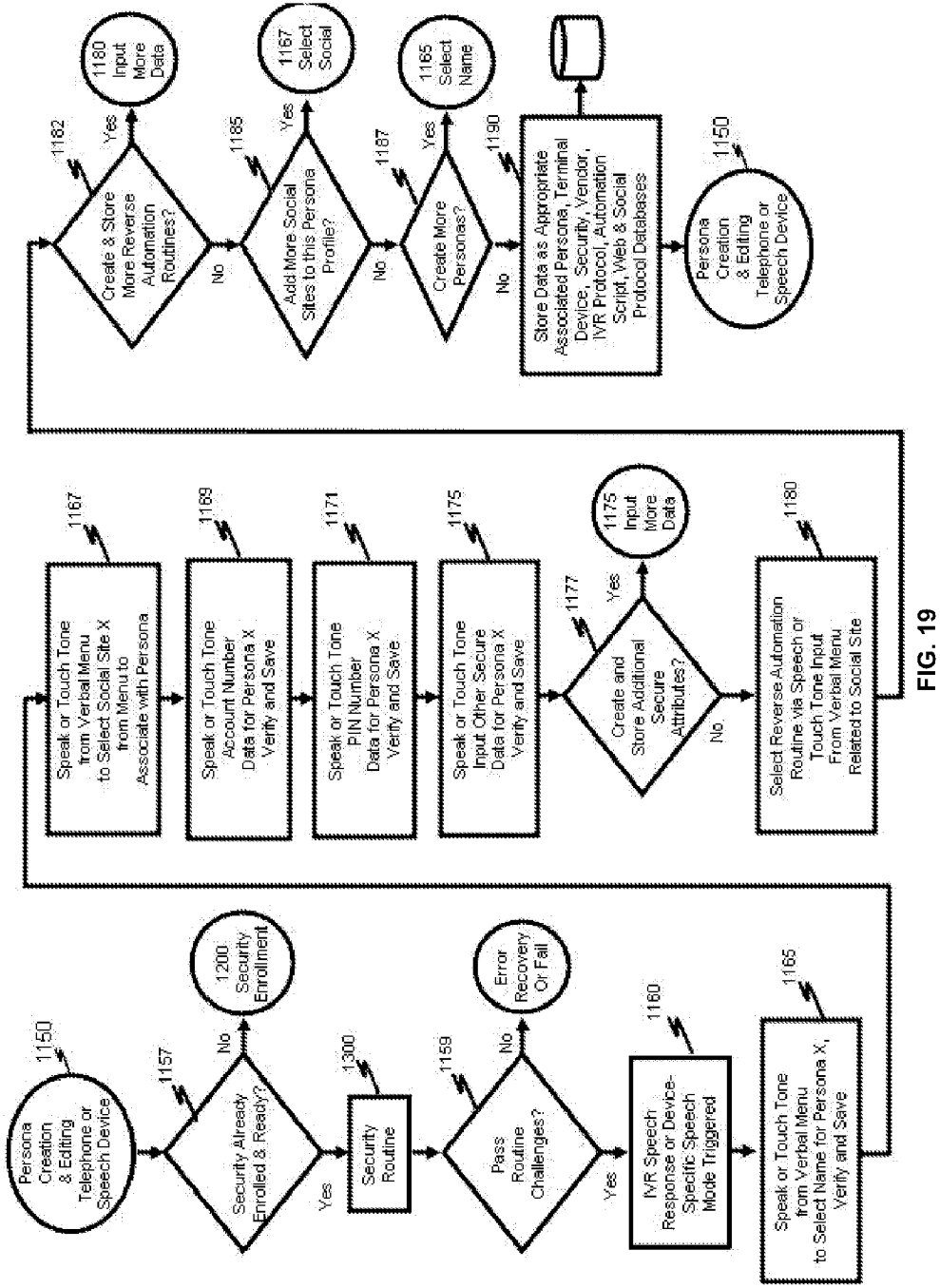
FIG. 19 is a flowchart for the creation of the persona corral for social networking oriented transactions, primarily using the telephone or speech device.

FIG. 19 sets forth the logic flow for the creation of the persona corral for social networking oriented transactions, primarily using the telephone or speech device. At step 1150, the user is presented with the persona creation and editing menu for telephone or speech device. This menu is designed primarily to be presented verbally as per an Interactive Voice Response (IVR) dialog. Alternately, it can be used to present abbreviated SMS-type menu prompts or abbreviated soft-key prompts for VoIP Soft Phones or VoIP physical phones. FIG. 13 illustrates how the user interface aggregator matrix 900 architecture may be used to establish a common means to present data to users. In particular this persona creation and editing menu for telephone or speech device can be made to work with a smart phone environment 322 as described in FIG. 10, or it can be made to work in a VoIP software-based telephone environment 344, as described in FIG. 11. In this aspect of the invention, the presentation of menu selections and session establishment described here is achieved primarily over the phone in an IVR-type dialog.

At decision branch 1157, the system establishes whether or not the user has already enrolled in the system by using the biometric enrollment routine 570 as explained above in relation to FIG. 15. If the user has not enrolled, they are directed to enroll as per the logic flow presented in FIG. 20. If the user has already enrolled the logic flow continues to step 1300. At step 1300, the two-phased security routine 1300 begins as is further detailed below with reference to FIG. 22. At decision branch 1159, the determination of pass or fail of the security two-phased security routine 1300 is made. If the user fails to pass the routine, they are offered standard error recovery methods. If standard error recovery methods fail, the user is refused further access to the application.

If the user passes the two-phased security routine 1300, the logic flow continues to step 1160. At 1160, the user is asked to select an IVR speech response or an embedded device-oriented speech response. At step 1165, the user selects a name for the persona. This selection is provided either with the user's spoken input or with touch-tones. This name is verified and then saved in the persona resources library and database 198. At step 1167, the user selects a social networking site from a list to be associated with this persona. This selection is provided either with the user's spoken input or with touch-tones. This vendor attribute is verified and then saved in the persona resources library and database 198. At step 1169, the user inputs an account number associated with the selected social networking site and so it is associated also with this persona. This selection is provided either with the user's spoken input or with touch-tones. This account number attribute is verified and then saved in the persona resources library and database 198. At step 1171, the user inputs a PIN number associated with the selected social networking site and so it is associated also with this persona. This selection is provided either with the user's spoken input or with touch-tones. This PIN number attribute is verified and then saved in the persona resources library and database 198. At step 1175, the user inputs an additional attribute associated with the selected social networking site and so it is associated also with this persona. This selection is provided either with the user's spoken input or with touch-tones. This additional attribute is verified and then saved in the persona resources library and database 198.

A variety of attributes may be solicited from the user as it relates to each social networking site. This is in keeping with the type of data that may need to be used in the reverse automation of a scripted dialog with a social networking site. This is determined when the service creation and provisioning server 183 is used to create social networking site-specific reverse automation scripts which are then stored in the reverse automation scripts and library 192 database. Part of the creation of a reverse automation script is the identification of key value pairs and variables that will be stored on behalf of each customer as they are associated with that Social Networking Site. For example, a reverse automation script may have a placeholder for an account number input. Once captured here, the persona resources library and database 198 will provide the secure session servers 165 with the account number which will then be offered to the reverse automation server 181 so it can "plug in" the account number into the script for that social networking site on behalf of the user. These additional attributes at step 1060 may be the user's personal preferences for the favored path of communication they want that social networking site to take. For example, a favored path may be to log on and post a microblog entry. Alternately, these additional attributes at step 1175 may be an alternate favored path they want the social networking site to take. In an embodiment of the invention, these attributes will be incorporated into the system so as to allow any variable data that can be associated with any reverse automation script.

Next, at decision branch 1177, the user is asked if he wishes to input additional attributes. This selection is provided either with the user's spoken input or with touch-tones. If he wishes to add additional attributes, he is directed back to 1175. If he is done with attribute input, the logic flow continues to step 1180. At step 1180, the user is asked to choose a common reverse automation routine from a menu. This selection is provided either with the user's spoken input or with touch-tones. Such reverse automation routines will have been created and described in the service creation and provisioning server 183 on behalf of the vendor in question.

At decision block 1182, the user is asked if he wishes to input more reverse automation routines. This selection is provided either with the user's spoken input or with touch-tones. If he wishes to add additional reverse automation routine, he is directed back to step 1180. If he is done with attribute input, the logic flow continues to decision block 1185. Here, the user is asked if he wishes to input data for more social networking sites. This selection is provided either with the user's spoken input or with touch-tones. If he wishes to add additional social networking sites, he is directed back to step 1167. If he is done with social networking site input, the logic flow continues to decision block 1187, where the user is asked if he wishes to input data for more personas. This selection is provided either with the user's spoken input or with touch-tones. If he wishes to add additional personas, he is directed back to step 1165. If he is done with persona input, the logic flow continues to step 1190. At step 1190, the system synchronizes all of the data collected from the user. This data is stored in the appropriate databases and also distributed in real time to the affected servers so the most recent user selects may be put to use immediately. The user is returned to step 1150, which is the persona creation and editing main menu for a telephone or speech device.

Figure 20:
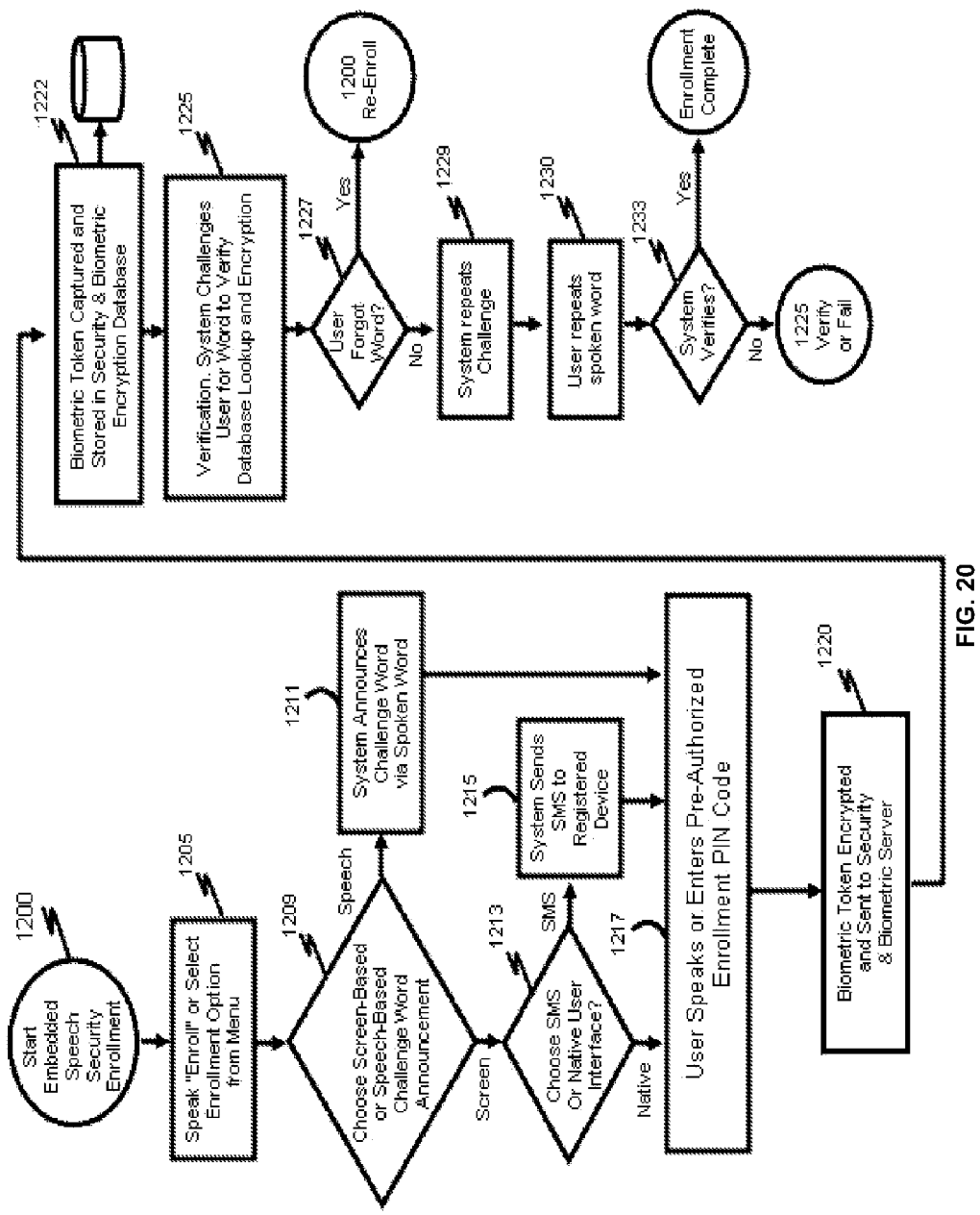
FIG. 20 is a flowchart setting forth the security enrollment routine for the embedded speech device.

FIG. 20 illustrates the security enrollment routine for the embedded speech device. At step 1200, the embedded speech security enrollment starts, and continues to step 1205, where the user is prompted to enroll by responding with a speech command based on a verbal menu. This menu is designed primarily to be presented verbally as per an Interactive Voice Response (IVR) dialog. Alternately, it can be used to present abbreviated SMS-type menu prompts or abbreviated soft-key prompts for VoIP Soft Phones or VoIP physical phones. As described above with reference to FIG. 13, the user interface aggregator matrix 900 architecture may be used to establish a common means to present data to users. In particular, this persona creation and editing menu for an embedded speech device can be made to work with a smart phone environment 322, or it can be made to work in a VoIP Software-Based Telephone Environment 344. In this aspect of the invention, the presentation of menu selections and session establishment described here is achieved primarily over the phone in an IVR-type dialog. In one aspect of the invention, such speech-based prompts may be uttered and also collected and processed by an embedded speech device associated with the terminal device itself. This may include, but is not limited to an embedded speech device attached to a multimedia/TV set top box 360, or a smart phone 320, or a speech-enabled pc running a web browser 300.

At decision branch 1209, the system will present the user with a prompt asking for the user to verbally enunciate a challenge word or phrase. In an embodiment of the invention, this challenge word or phrase will have been randomly chosen. Such a challenge word will be generated by the system using random phrase generator based on a pre-programmed corpus of recorded phonemes or whole words. These utterances are stored in the security and biometric encryption database 195. Likewise, after the user responds, the user-uttered phrase will be stored in the security and biometric encryption database 195 for later comparison when the user is subsequently challenged to start subsequent sessions. These comparisons will be governed based on the session established by the secure session servers 165. The establishment of a secure session is described above with reference to FIG. 15 which shows the multi-phased biometric security schema 500.

Also at decision branch 1209, the system will provide an alternative for providing the prompt asking for the challenge word or phrase. In one case, the system will announce the challenge word or phrase verbally as in 1211 and in another case, the system will provide a screen-based presentation of the same word or phrase as in 1215.

At decision branch 1213, the system will ask the user to choose if they want the challenge word or phrase to be presented via an SMS message to the user's registered SMS device, or whether the user wants the challenge word or phrase to be presented via the native user interface of the particular device that is registered for that user. The terminal device protocol server 189 holds the particular protocols and methods for delivering such information to the user as described in FIG. 8 and these terminal device data are also stored in the terminal device database 191 as described in FIG. 7. If the user chose an SMS message the system will send the SMS to the registered device as per 1215. If the user chooses for the delivery method to be via the native screen of the user device, the challenge word or phrase will be presented on the native device.

At step 1217, regardless as to the presentation method chosen by the user, the user will respond with spoken confirmation on the presented challenge word or phrase provided by the system. At step 1220, the biometric token thus collected from the user will be sent to the security and biometric server 189 and follow the protocol described in FIG. 15 called the multi-phased biometric security schema 500. Then, at step 1222, the biometric token will be stored in the security and biometric encryption database 195 for later comparison when the user is subsequently challenged to start subsequent sessions. At step 1225, the system confirms the successful capture of the biometric token by prompting for it to be spoken again, this time verifying the process by doing the aforementioned comparison that is described in FIG. 15 called the multi-phased biometric security schema 500.

At decision branch 1227, the system provides an error recovery routine to determine if the user forgot the word if the utterance did not properly compare to the stored biometric token. If there is a failure, the user will return to step 1200 to re-enroll. If the comparison is a success, the logic flow continues to step 1229, where as part of the error recovery routine, the user is asked by the system to repeat the challenge word or phrase. At step 1230, as part of the error recovery routine, the user speaks the challenge word or phrase. Then, at step 1233 the system verifies the success of the routine. If the system confirms the successful capture of the biometric token, the enrollment is complete, otherwise the verification process repeats at 1225 or aborts based on the implementation preference of the practitioner.

Figure 21:
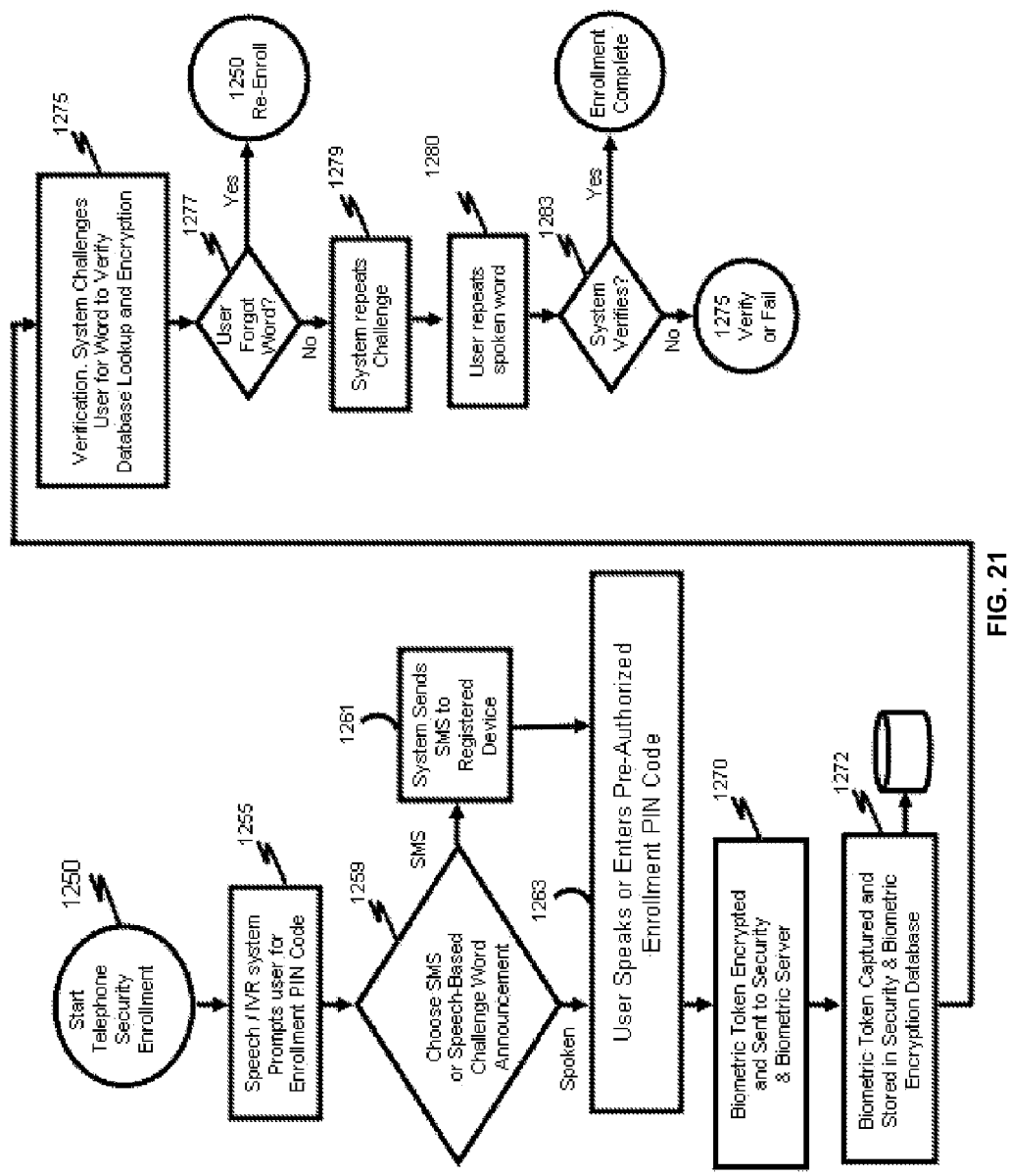
FIG. 21 is a flowchart of a security enrollment routine for the telephone-based device.

FIG. 21 includes a flowchart illustrating the security enrollment routine for the telephone-based device. At step 1250, the telephone-based security enrollment starts. At step 1255, the user is prompted to enroll by responding with a speech command based on a verbal menu presented verbally as an Interactive Voice Response (IVR) dialog. Alternately, it can be used to present abbreviated SMS-type menu prompts or abbreviated soft-key prompts for VoIP soft phones or VoIP physical phones. FIG. 13 illustrates how the user interface aggregator matrix 900 architecture may be used to establish a common means to present data to users. In particular, this persona creation and editing menu for a telephone-based device can be made to work with a smart phone environment 322 as described in FIG. 10, or it can be made to work in a VoIP software-based telephone environment 344, as described above with reference to FIG. 11. In this aspect of the invention, the presentation of menu selections and session establishment described here is achieved primarily over the phone in an IVR-type dialog. The terminal devices that may be used for the user to have an IVR-based telephone dialog may include, but is not limited to a telephone 340 (including a regular PSTN telephone or VoIP telephone), a smart phone 320, or a web browser 300 equipped with a VoIP soft phone.

At decision branch 1259, the system will present the user with a choice of having the challenge word verbally enunciated over the phone or alternately sent to a registered SMS device. If the user chooses the SMS device, the challenge word or phrase will be transmitted via SMS as per step 1261, otherwise it will be spoken via voice prompt over the phone. In an embodiment of the invention, this challenge word or phrase will have been randomly chosen. Such a challenge word will be generated by the system using random phrase generator based on a pre-programmed corpus of recorded phonemes or whole words. These utterances are stored in the security and biometric encryption database 195. The terminal device protocol server 189 holds the particular protocols and methods for delivering such information to the user as described in FIG. 8 and these terminal device data are also stored in the terminal device database 191 as described above with reference to.

At step 1263, regardless of the presentation method chosen by the user, the user will respond with spoken confirmation on the presented challenge word or phrase provided by the system. at step 1270, the biometric token thus collected from the user will be sent to the security and biometric server 189 and follow the protocol described in FIG. 15 called the multi-phased biometric security schema 500. At step 1272, the biometric token will be stored in the security and biometric encryption database 195 for later comparison when the user is subsequently challenged to start subsequent sessions. Next, at step 1275, the system confirms the successful capture of the biometric token by prompting for it to be spoken again, this time verifying the process by doing the aforementioned comparison that is described in FIG. 15 called the multi-phased biometric security schema 500.

At decision branch 1277, the system provides an error recovery routine to determine if the user forgot the word if the utterance did not properly compare to the stored biometric token. If there is a failure, the user will return to step 1250 to re-enroll. If the comparison is a success, the logic flow continues to step 1279, where as part of the error recovery routine, the user is asked by the system to repeat the challenge word or phrase. At step 1280, as part of the error recovery routine, the user speaks the challenge word or phrase. Then, at decision branch 1283, the system verifies the success of the routine. If the system confirms the successful capture of the biometric token, the enrollment is complete, otherwise the verification process repeats at step 1275 or aborts based on the implementation preference of the practitioner.

Figure 22:
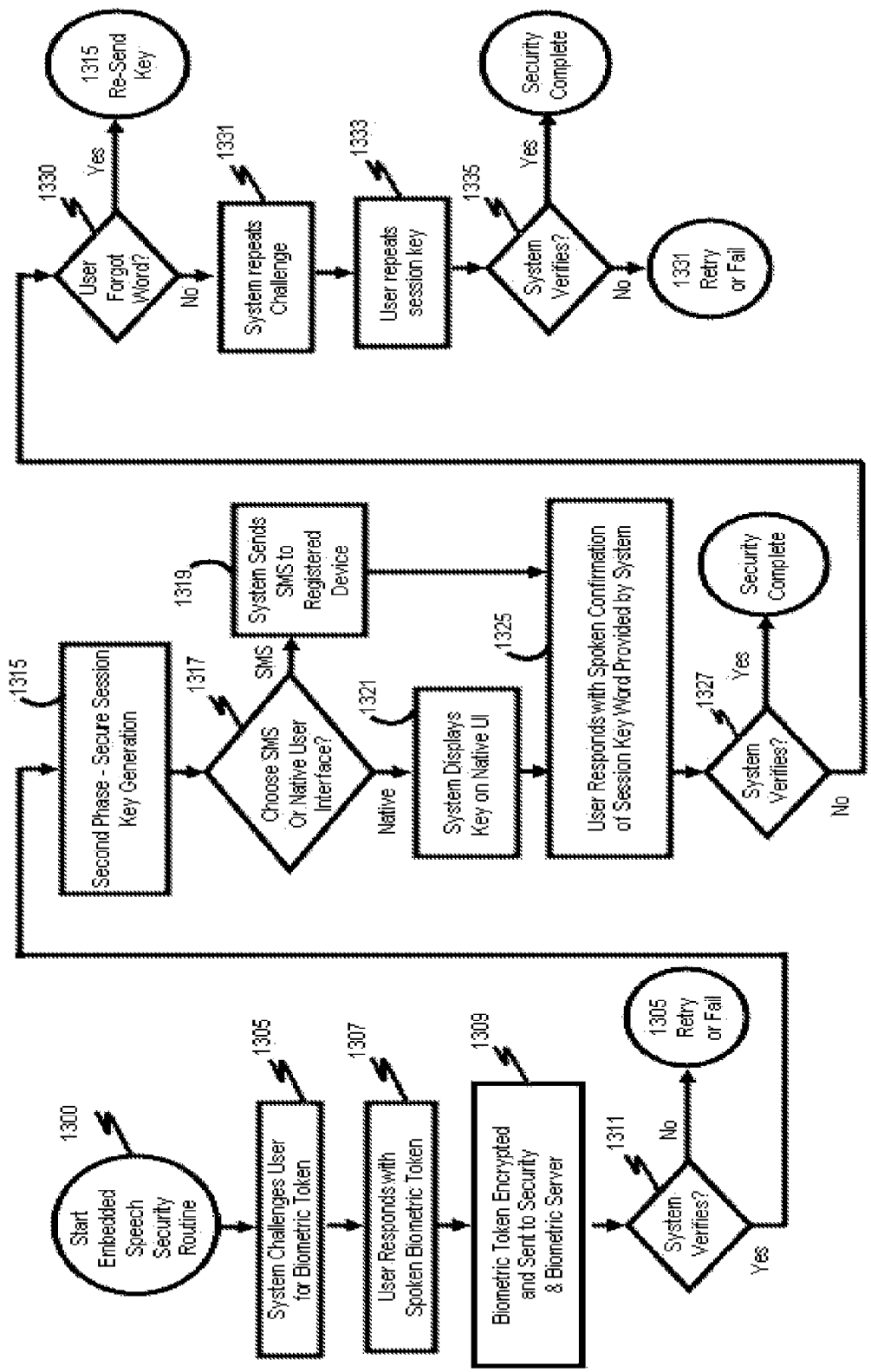
FIG. 22 is a flowchart of a two-phased security routine for the embedded speech device.

FIG. 22 is a flowchart of the two-phased security routine for the embedded speech device. At step 1300, the two-phased security routine—embedded speech device starts, and at step 1305, the system will challenge the user to speak the stored word or phrase associated with the biometric key produced from the security enrollment routine described above with reference to FIG. 20 and FIG. 21. At step 1307, the user speaks the word or phrase, and at step 1309, the biometric token thus collected from the user will be sent to the security and biometric server 189 and follow the protocol described above with reference to FIG. 15 called the multi-phased biometric security schema 500.

At decision branch 1311, the system confirms the successful capture of the biometric token. If the routine fails, the system prompts the user to retry as in step 1305, otherwise the logic flow continues to step 1315.

At step 1315, the system goes into the second phase of the Two-Phased Security Routine in which a secure session key is generated and presented to the user. This is done using the protocols outlined in the session-specific key generation routine 540 as described above referencing the block diagram of FIG. 15.

At decision branch 1317, the system will provide an alternative for presenting the secure session key token. In one case, the system will present the token for the secure session key as per the native capabilities of the embedded speech device registered to the user as per step 1321. The terminal device protocol server 189 holds the particular protocols and methods for delivering such information to the user as described above referencing the block diagram of FIG. 8 and these terminal device data are also stored in the terminal device database 191 as described above with reference to FIG. 7. In another case, the system will present the token for the secure session key via an SMS message to the user's registered SMS device as per step 1319.

At step 1325, regardless as to the presentation method chosen by the user, the user will respond with spoken confirmation on the presented token provided by the system. At decision branch 1327, the system confirms the successful capture and verification of the token for the secure session key. If the token is verified the security routine is complete, otherwise the logic flow continues to decision branch 1330.

At step 1330, the system provides an error recovery routine to determine if the user forgot the word if the utterance did not properly compare to the automatically generated secure session key. If the user forgot the word, he will be returned to step 1315 for the key to be resent. If the user did not forget the word but the verification nonetheless failed, the logic flow continues to step 1331, where as part of the error recovery routine, the user challenged once again to repeat the word or phrase to compare to the secure session key. Next, at step 1333, as part of the error recovery routine, the user speaks the word or phrase again. At step 1335, the system verifies the success of the routine. If the system confirms the successful capture of the Biometric Token, the enrollment is complete, otherwise the verification process repeats at step 1331 or aborts based on the implementation preference of the practitioner.

Figure 23:
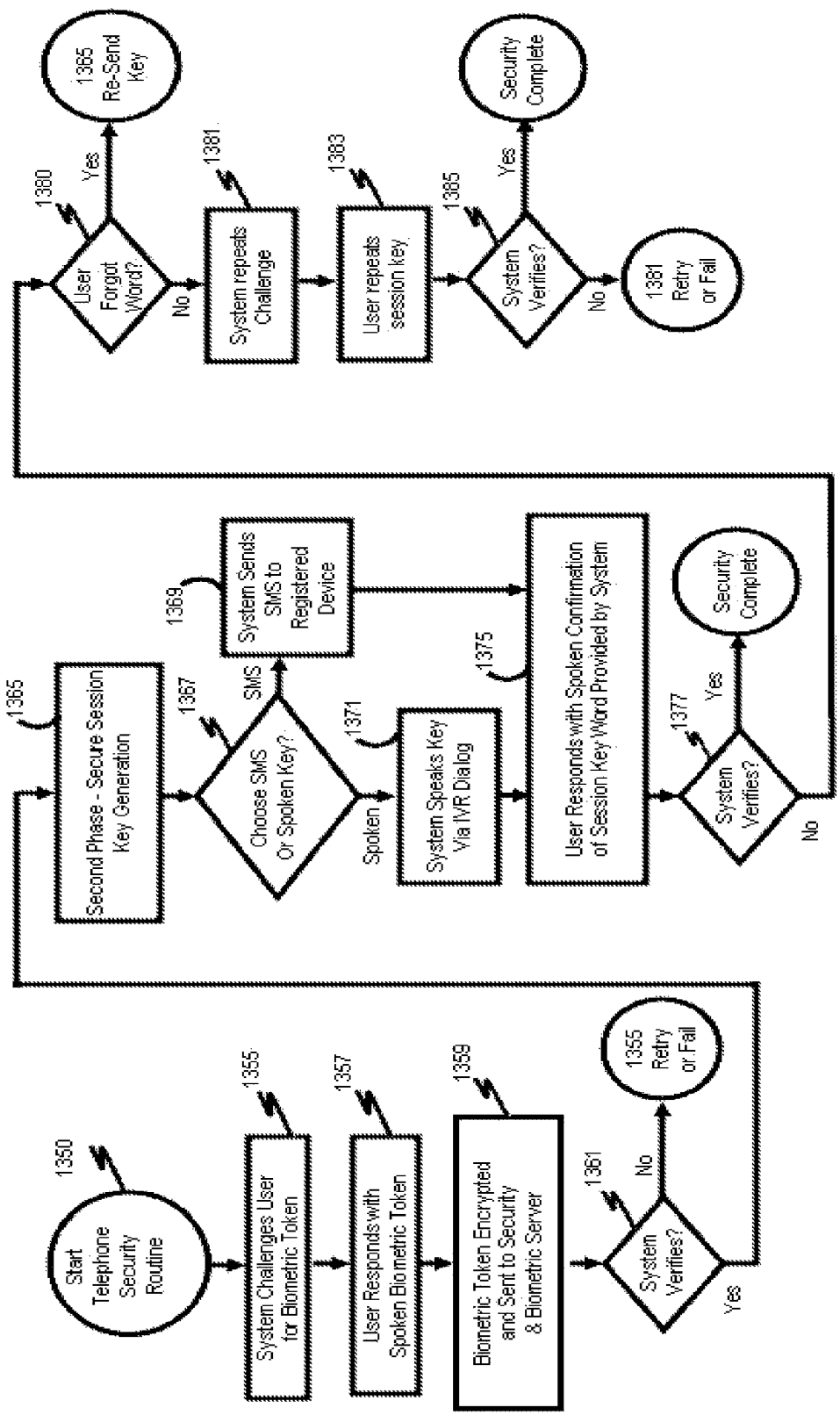
FIG. 23 is a flowchart of a two-phased security routine for the telephone-based device.

FIG. 23 is a flowchart illustrating the two-phased security routine for the telephone-based device. At step 1350, the two-phased security routine—telephone starts. In step 1355, the system will then challenge the user to speak the stored word or phrase associated with the biometric key produced from the security enrollment routine described above with reference to FIG. 21 and FIG. 22. Then, at step 1357, the user speaks the word or phrase. At step 1359, the biometric token thus collected from the user will be sent to the security and biometric server 189 and follow the protocol described above with reference to the block diagram of FIG. 15 called the multi-phased biometric security schema 500.

At decision branch 1361, the System confirms the successful capture of the biometric token. If the routine fails, the system prompts the user to retry as in 1355, otherwise the logic flow continues to step 1365, where the system goes into the second phase of the two-phased security routine in which a secure session key is generated and presented to the user. This is done using the protocols outlined in the session-specific key generation routine 540 as described above with reference to FIG. 15.

At decision branch 1367, the system will provide an alternative for presenting the secure session key token. In one case, the system will present the token for the secure session key via a speech prompt as in a regular Interactive Voice Response (IVR) dialog as per step 1371. the terminal device protocol server 189 holds the particular protocols and methods for delivering such information to the user as previously described and these terminal device data are also stored in the terminal device database 191. In another case, the system will present the token for the secure session key via an SMS message to the user's registered SMS device as per step 1369.

At step 1375, regardless as to the presentation method chosen by the user, the user will respond with spoken confirmation on the presented token provided by the System.

Next, at decision branch 1377 the system confirms the successful capture and verification of the token for the secure session key. If the token is verified, the security routine is complete, otherwise the logic flow continues to decision branch 1380.

In decision branch 1380, the system provides an error recovery routine to determine if the user forgot the word if the utterance did not properly compare to the automatically generated secure session key. If the user forgot the word, he will be returned to step 1365 for the key to be resent. If the user did not forget the word but the verification nonetheless failed, the logic continues to step 1381, where, as part of the error recovery routine, the user challenged once again to repeat the word or phrase to compare to the secure session key. At step 1383, as part of the error recovery routine, the user speaks the word or phrase again.

At decision branch 1385, the system verifies the success of the routine. If the system confirms the successful capture of the biometric token, the enrollment is complete, otherwise the verification process repeats at step 1381 or aborts based on the implementation preference of the practitioner.

Figure 24:
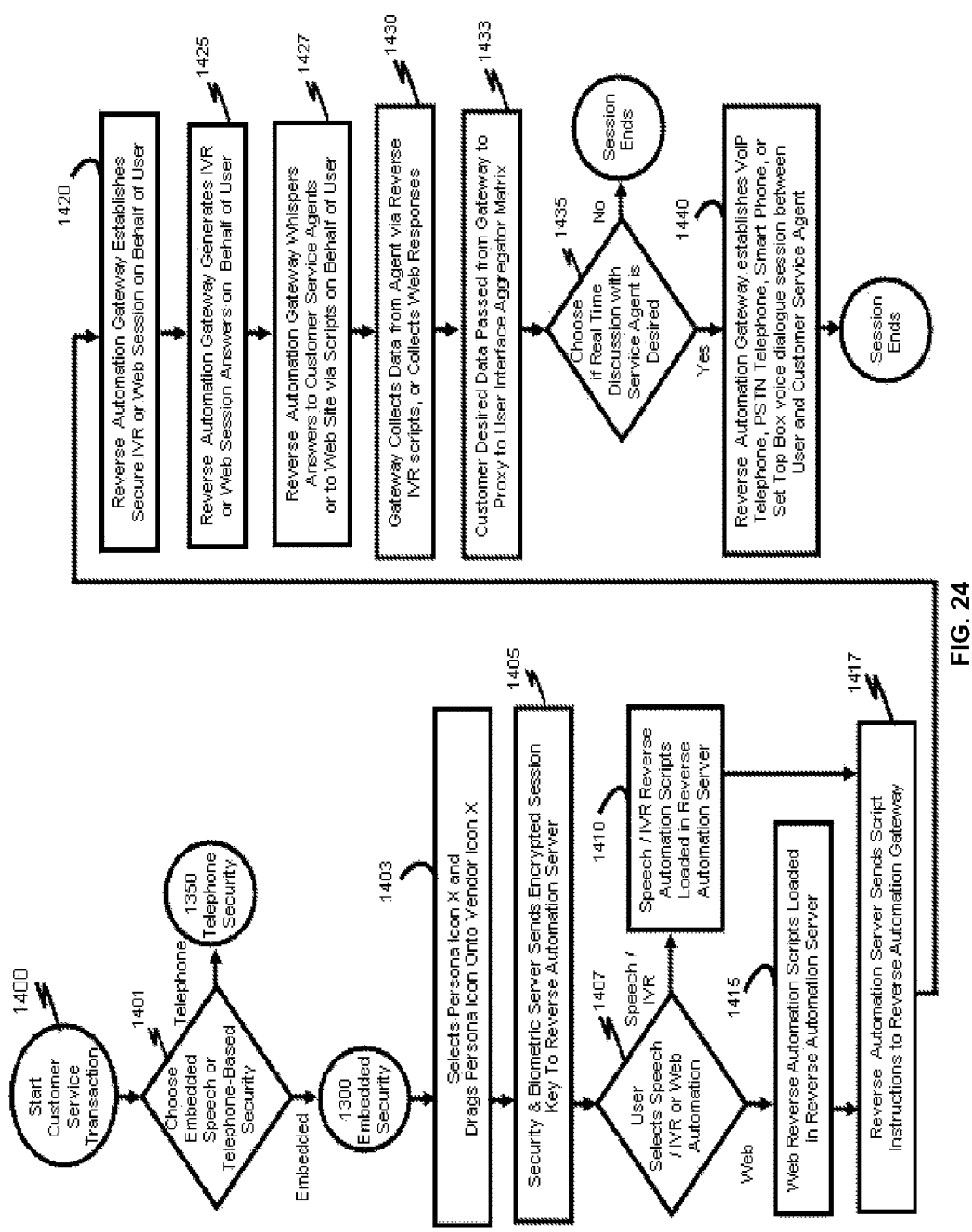
FIG. 24 is a flowchart illustrating the launching of a secure transaction using the common user interface for a customer service oriented transaction.

FIG. 24 describes the logic flow for launching a secure transaction using the common user interface for a customer service oriented transaction. The customer service routine 1400 starts at step 1401, where the user chooses between partaking in the biometric security routine via an embedded speech device or via a telephone. If the user chooses telephone, the routine described above with reference to FIG. 23, referred to as the two-phased security routine—telephone 1350 is used, otherwise, the routine described above with reference to FIG. 22 called two-phased security routine—embedded speech device 1300 is used.

The customer service routine continues at 1403, when the user selects a particular persona icon or avatar based on the precepts of the common user interface aggregator matrix 900 architecture. Once the persona is selected, the user associates the persona with the icon representing the vendor in question. The practitioner will note that the association of a persona with more than one vendor is allowed. For example, if the chosen persona was programmed by the selected script to log on and get an account balance as the core script function, the association of that persona with two vendors would cause the system to fetch the account balance from both vendors, and so on. None of the myriad routines possible should be limited in scope by way of the example set forth.

At step 1405, the requisite encrypted session key and security procedures are performed by the secure session servers 165 and the security and biometric server 184 as described in the multi-phased biometric security schema 500.

At decision branch 1407, the system asks the user to choose between a contact center type of dialog for customer service or a web-based dialog for customer service. In one embodiment of the invention, a contact center type of dialog will consist of transactions with the vendor's Interactive Voice Response (IVR) system, contact center system, and ultimately an agent if live intervention is required. Such transactions will be done in a reverse automation mode, that is with the secure customer service proxy portal doing the work of logging on to these systems, supplying passwords automatically, choosing pre-defined menu choices and even having an automated "whisper" dialog with the agent. All of this is being done on behalf of the customer or caller, who can go about his other business while these automated routines are happening.

Also in one embodiment of the invention, a web-based dialog may consist of similar steps as in a contact center type of dialog with the possible exception of the IVR transaction. Similarly, the log on and automatic passing of the requisite passwords and other identifiers will be done by the secure customer service proxy portal 100 on behalf of the customer. However, instead of traversing voice-based menus that may ultimately lead to a voice conversation with an agent, the web-based dialog may instead request a chat dialog on behalf of the customer. In such a dialog, the secure customer service proxy portal 100 will feed the chat interface on the web site a string of predetermined chat messages in order to automate all or at least some of the dialog with a chat-based agent. All of these robotic dialogs that are done by the secure customer service proxy portal 100 on behalf of the customer are based on reverse automation scripts stored in the database as per the reverse automation scripts & library 192 as described above with reference to FIG. 7. In addition to these scripts, the protocols required to communicate with various web sites and IVR systems are also stored in the database such as in the vendor IVR protocol database 193.

These scripts and protocols are loaded into and executed on by a variety of servers in the secure customer service proxy portal 100. For example, the secure session servers 165 manage the overall session management, set up and tear down of sessions and the handling of security on those sessions along with the security & biometric server 184. For example, the vendor IVR protocol server 182 and the reverse automation server 181, both further detailed in FIG. 8, work together with the secure session servers 165 and the reverse automation gateway 600 to determine what scripts and what dialogs need to be executed on. At the level of the individual reverse automation gateway 600, the script instructions are broken down into individual commands which are fed to the reverse automation gateway 600 as customer emulator scripts. What customer emulator scripts are used depends on what vendor is chosen by the user when the user associates a persona from the persona corral with a vendor icon using the user interface aggregator matrix 900.

In another aspect of the invention, customer emulator script instructions and the reverse automation server 181 use of reverse automation scripts may manipulate vendor web sites in a hybrid fashion. For example, it is not uncommon for web sites to have web-based callback technology installed so users can type in their phone number which then triggers a live phone call back to the customer. Still other web sites may use (Voice Over Internet Protocol (VoIP) technology which allows customers to establish a live phone call using the web as the carriage for the call with an associated VoIP phone instead of the traditional Public Switched Telephone Network. The invention contemplates these scenarios as all of them can be robotically automated on behalf of customers using the aforementioned reverse automation scripts outlined here. The practitioner will find myriad approaches to connect customers with vendor web sites, contact centers and IVR systems utilizing the invention. None of these examples here will be at the exclusion of other possible communications modes with the use of automated, robotic scripts can be implemented.

At step 1410, based on the selection of a contact center type dialog with an IVR system, the appropriate reverse automation scripts are loaded in the reverse automation server 181. Then, at step 1415, based on the selection of a web-type dialog, the appropriate reverse automation scripts are loaded in the reverse automation server 181. At step 1417, the reverse automation server 181, in tandem with the secure session servers 165 sends script instructions to the appropriate reverse automation gateway 600. Such scripts are used by the reverse automation gateway 600 to dynamically assemble customer emulation scripts as depicted in FIG. 3.

At step 1420, the reverse automation gateway 600 establishes a secure IVR or web session on behalf of the user. This may include, but is not limited to the secure passing of customer personal account numbers and PIN numbers. Such numbers will have been collected from the user in a previous secure session in the creation of the customer's persona corral as described above.

At step 1425, the reverse automation gateway 600 will traverse either IVR system or web site menus and provide additional information to the vendor in an automated fashion. Such robotic traversal of the customer-facing IVR system or Web site is being executed upon on behalf of the customer, but still the customer is not directly connected to the IVR system or Web site. At this point it is only the secure customer service proxy portal 100 that is connected to the vendor IVR system or web site via the reverse automation gateway 600.

Then, at step 1427, the reverse automation gateway 600 may "whisper" information to the agent who finally answers the phone after the automated traversal of the IVR system. Such may also be the case in a VoIP dialog propagated with a similar web-based automated traversal. This whisper is achieved by the play-out of pre-recorded prompts. Such play-out of prompts may be achieved by the media server function. For example, the whisper may say to the live agent: "I am calling on behalf of Mr. Jones and have entered the required account number. Will you please stay on the line so I can go get him on the phone." In this specific scenario, the customer service routine may end when the reverse automation gateway 600 facilitates a live conference call between the agent and the caller. Such a conference can be achieved by use of the reverse automation scripts so instructions for making a phone call using the phone numbers stored in the terminal device database 191 can happen. The network interface connections and means to facilitate such a connection is described above with reference to FIG. 2 and FIG. 3. The practitioner will be familiar with the common use of a "whisper" device. It is well known that any IVR system may be natively programmed to pass caller ID information to an agent. This is well-established and well-known industry practice. However, in the context of this invention, a "whisper" is not happening as a native IVR function, but rather under the control of an entirely separate system acting on behalf of an individual caller or many callers. Such whisper devices may be programmed into the reverse automation scripts and subsequent customer emulator scripts so as to adapt to a plurality of IVR systems. Assuming the whisper function is a precursor to other activity, the logic flow of FIG. 24 continues, otherwise the customer service routine ends when the parties hang up the phone after they are connected.

At step 1430, the reverse automation gateway 600 may collect information from the live agent who finally answers the phone after the automated traversal of the IVR system. Such may also be the case in a VoIP dialog propagated with a similar web-based automated traversal. This collection of data may come in the form of a speech recognition dialog or in the form of a touch-tone response but will not be limited to these response methods. Such play-out of prompts and collection of spoken responses either by speech input or touch tone input may be achieved by the media server function described above with reference to FIG. 3. For example, a whisper may be used to solicit an answer from the live agent: "Mr. Jones would like to know if his payroll deposit has been made today. Please say yes or no." The agent may then speak as into an IVR system. In fact the reverse automaton gateway 600 is behaving as an IVR system but in this circumstance making the agent do what a customer would normally have to do—that is input information to a machine. The questions asked by the reverse automation server are created as part of the script building and service creation routine done by the administrator in the service creation & provisioning server. Such scripts are stored on behalf of each vendor. Likewise, the scripts act as templates that are then associated with each user when the user creates his persona corral.

At step 1433, the answers to the queries collected at 1430 are now sent to the user. This sending of data can be achieved in a variety of ways but will not be limited to: an SMS message sent to the user's registered terminal device, via a "whisper" in which the system calls the user and speaks the answer, via a spoken message on an embedded speech device on the user's terminal device, or via a visual message sent to the native screen of the registered terminal device. The practitioner will discover no limit to the uses of the reverse automation scripts and approach to customer service dialogs associated with this invention.

Such messaging to the end user terminal devices can be achieved by use of the reverse automation scripts so instructions for sending specific messages to devices is done based on data stored in the terminal device database 191. The network interface connections and means to facilitate such messaging is described in both FIG. 2 and FIG. 3. Assuming the additional data collection function is a precursor to other activity, the logic flow continues to decision branch 1435, otherwise the customer service routine ends when the user retrieves the sent data.

At decision branch 1435, the system may optionally ask the customer if a live discussion with the agent is desired. If the customer does not want a live call, the session ends, otherwise the logic flow continues to step 1440, where the reverse automation gateway facilitates a live conference call between the agent and the caller. Such a conference can be achieved by use of the reverse automation scripts so instructions for making a phone call using the phone numbers stored in the terminal device database 191 can happen. The network interface connections and means to facilitate such a connection is described in both FIG. 2 and FIG. 3. The customer service routine session ends at the termination of the phone call between the agent and the customer.

Figure 25:
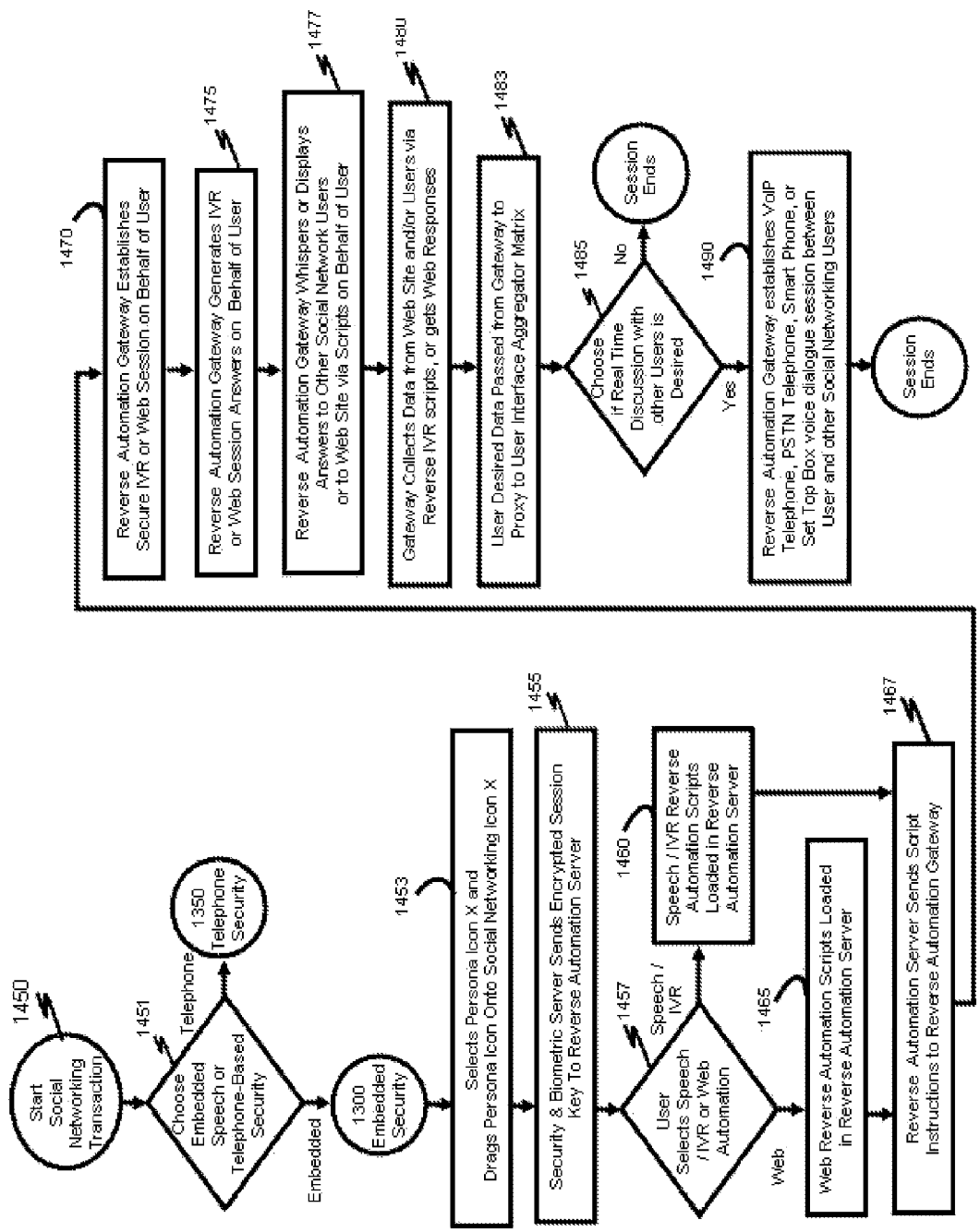
FIG. 25 is a flowchart illustrating the launching of a secure transaction using the common user interface for a social networking oriented transaction.

With reference to FIG. 25, the logic flow for launching a secure transaction using the common user interface for a social networking oriented transaction begins with a step 1450. At step 1451, the user chooses between partaking in the biometric security routine via an embedded speech device or via a telephone. If the user chooses telephone, the routine described above with reference to FIG. 23 called two-phased security routine—telephone 1350 is used, otherwise, the routine described above with reference to FIG. 22 called Two-phased security routine—embedded speech device 1300 is used.

The customer service routine continues with step 1453, when the user selects a particular persona icon or avatar based on the precepts of the common user interface aggregator matrix 900 architecture as described above with reference to FIG. 13. Once the persona is selected, the user associates the persona with the icon representing the social networking site in question. The practitioner will note that the association of a persona with more than one social networking site is possible. For example, if the chosen persona was programmed by the selected script to log on and post a micro-blog as the core script function, the association of that persona with two social networking sites would allow the blog post to be automatically posted on both sites, and so on. None of the myriad routines possible should be limited in scope by way of the example set forth herein. Next, in step 1455, all of the requisite encrypted session key and security procedures are performed by the secure session servers 165 and the security & biometric server 184 as described in the multi-phased biometric security schema 500 described above with reference to FIG. 15.

At decision branch 1457 the system asks the user to choose between a speech/IVR type of dialog or a traditional web-based dialog for interacting with the social networking site. In an embodiment of the invention, a speech/IVR type of dialog will consist of transactions with the social networking site's IVR system, and ultimately an agent if live intervention is required. Such transactions will be done in a reverse automation mode, that is with the secure customer service proxy portal 100 doing the work of logging on to these systems, supplying passwords automatically, choosing pre-defined menu choices and even having an automated "whisper" dialog with the agent. All of this is being done on behalf of the customer or caller, who can go about his other business while these automated routines are happening. Also in an embodiment of the invention, a web-based dialog may consist of similar steps as in a speech/IVR type of dialog with the possible exception of the IVR transaction. Similarly, the log on and automatic passing of the requisite passwords and other identifiers will be done by the secure customer service proxy portal 100 on behalf of the customer. However, instead of traversing voice-based menus that may ultimately lead to a voice conversation with an agent, the Web-based dialog may instead request a chat dialog on behalf of the customer. In such a dialog, the secure customer service proxy portal 100 will feed the chat interface on the social networking site a string of predetermined chat messages in order to automate all or at least some of the dialog to establish a session with other social networking site visitors. Such a dialog may be a simple log-on sequence wherein the rest of the dialog could be accomplished "live" by the user.

In fact, if more than one social networking site were associated with the persona, the user may have a single chat window in which a conversation with visitors of both sites were governed. All of these robotic dialogs that are done by the Secure customer service proxy portal 100 on behalf of the customer are based on reverse automation scripts stored in the database as per the reverse automation scripts & library 192 as described above with reference to FIG. 7. In addition to these scripts, the protocols required to communicate with various web sites and IVR systems are also stored in the database such as in the vendor IVR protocol database 193 also depicted in FIG. 7. These scripts and protocols are loaded into and executed on by a variety of servers in the secure customer service proxy portal 100. For example, the secure session servers 165 manage the overall session management, set up and tear down of sessions and the handling of security on those sessions along with the security & biometric server 184. For example, the vendor IVR protocol server 182 and the reverse automation server 181, both depicted in FIG. 8 work together with the secure session servers 165 and the reverse automation gateway 600 to determine what scripts and what dialogs need to be executed on. At the level of the individual reverse automation gateway 600, the script instructions are broken down into individual commands which are fed to the reverse automation gateway 600 as customer emulator scripts as described above with reference to FIG. 3. What customer emulator scripts are used depends on what social networking site or sites is chosen by the user when the user associates a persona from the persona corral with one or more social networking site icons using the user interface aggregator matrix 900.

In another aspect of the invention, customer emulator script instructions and the reverse automation server 181 use of reverse automation scripts may manipulate social networking sites and associated IVR systems in a hybrid fashion. For example, it is not uncommon for web sites to have web-based callback technology installed so users can type in their phone number which then triggers a live phone call back to the customer. Still other web sites may use Voice Over Internet Protocol (VoIP) technology which allows customers to establish a live phone call using the web as the carriage for the call with an associated VoIP phone instead of the traditional Public Switched Telephone Network. The invention contemplates these scenarios as all of them can be robotically automated on behalf of customers using the aforementioned reverse automation scripts outlined here. The practitioner will find myriad approaches to connect customers with social networking sites and IVR systems utilizing the invention. None of these examples here will be at the exclusion of other possible communications modes with the use of automated, robotic scripts can be implemented.

At step 1460, based on the selection of a speech or IVR dialog, the appropriate Reverse automation scripts are loaded in the reverse automation server 181. At step 1465, based on the selection of a web-type dialog, the appropriate reverse automation scripts are loaded in the reverse automation server 181. Then, at step 1467, the reverse automation server 181, in tandem with the secure session servers 165 sends script instructions to the appropriate reverse automation gateway 600. Such scripts are used by the reverse automation gateway 600 to dynamically assemble customer emulation scripts as depicted in FIG. 3.

At 1470, the reverse automation gateway 600 establishes a secure IVR or web session on behalf of the user. This may include, but is not limited to the secure passing of customer personal account numbers and PIN numbers. Such numbers will have been collected from the user in a previous secure session in the creation of the customer's persona corral as depicted in FIG. 16, FIG. 17, FIG. 18, and FIG. 19. At step 1475, the reverse automation gateway 600 will traverse either IVR system or web site menus and provide additional information to the social networking site in an automated fashion. Such robotic traversal of the social networking IVR system or web site is being executed upon on behalf of the customer, but still the customer is not directly connected to the IVR system or web site. At this point, it is only the secure customer service proxy portal 100 that is connected to the social networking IVR system or web site via the reverse automation gateway 600.

At step 1477, the reverse automation gateway 600 may make a phone call to and then "whisper" a greeting and conference announcement to another social networking site user. In fact, the reverse automation gateway 600 may have instructions to do this with multiple users in order to set up a live conference call between those other users and the user of the secure customer service proxy portal. Such may also be the case in a VoIP dialog propagated with a similar web-based automated traversal. This whisper is achieved by the play-out of pre-recorded prompts. Such play-out of prompts may be achieved by the media server function described above with reference to FIG. 3. For example, the whisper may say to the live agent: "I am calling on behalf of Mr. Jones who would like you to join a conference with himself and other Social Networking users. Will you please stay on the line so I can go get him on the phone." In this specific scenario, the social networking routine may end when the reverse automation gateway facilitates a live conference call between the other users and the user of this invention. Such a conference can be achieved by use of the reverse automation scripts so instructions for making a phone call using the phone numbers stored in the terminal device database 191 can happen. The network interface connections and means to facilitate such a connection is described above with reference to both FIG. 2 and FIG. 3. The practitioner will be familiar with the common use of a "whisper" device. It is well known that any IVR system may be natively programmed to pass caller ID information to an agent. This is well-established and well-known industry practice. However, in the context of this invention, a "whisper" is not happening as a native IVR function, but rather under the control of an entirely separate system acting on behalf of an individual caller or many callers. Such whisper devices may be programmed into the reverse automation scripts and subsequent customer emulator scripts so as to adapt to a plurality of IVR systems. Assuming the whisper function is a precursor to other activity, the logic flow continues to step 1480, otherwise the social networking routine ends when the parties hang up the phone after they are connected.

At step 1480, the reverse automation gateway 600 may collect information from other social networking site users via IVR-type dialogs or web dialogs. In one aspect of the invention, such a dialog may also be the case in a VoIP dialog propagated with a similar web-based automated traversal. This collection of data may come in the form of a speech recognition dialog or in the form of a touch-tone response but will not be limited to these response methods. Such play-out of prompts and collection of spoken responses either by speech input or touch tone input may be achieved by the media server function depicted in FIG. 3. For example, a whisper may be used to solicit an answer from another social networking site user: "Mr. Jones would like to know if you want to see his daily microblog." The agent may then speak as into an IVR system. In fact the reverse automaton gateway 600 is behaving as an IVR system but in this circumstance having a dialog with another social networking site user on behalf of this user. The questions asked by the reverse automation server are created as part of the script building and service creation routine done by the administrator in the service creation & provisioning server. Such scripts are stored on behalf of each social networking site. Likewise, the scripts act as templates that are then associated with each user when the user creates his persona corral as depicted in FIG. 16, FIG. 17, FIG. 18, and FIG. 19.

At step 1483, the answer to the queries collected at 1430 are now sent to the user. This sending of data can be achieved in a variety of ways but will not be limited to: an SMS message sent to the user's registered terminal device, via a "whisper" in which the system calls the user and speaks the answer, via a spoken message on an embedded speech device on the users' terminal device, or via a visual message sent to the native screen of the registered terminal device. The practitioner will discover no limit to the uses of the reverse automation scripts and approach to customer service dialogs associated with this invention. Such messaging to the end user terminal devices can be achieved by use of the reverse automation scripts so instructions for sending specific messages to devices is done based on data stored in the terminal device database 191. The network interface connections and means to facilitate such messaging is described in both FIG. 2 and FIG. 3. Assuming the additional data collection function is a precursor to other activity, the logic flow continues to decision branch 1485, otherwise the social networking routine ends when the user retrieves the sent data.

At decision branch 1485, the system may optionally ask the customer if a live discussion with other social networking site users is desired. If the customer does not want a live call, the session ends, otherwise the logic flow continues to step 1490. where the reverse automation gateway facilitates a live conference call between the chosen social networking site users and this user. Such a conference can be achieved by use of the reverse automation scripts so instructions for making conferences using the phone numbers stored in the terminal device database 191 can happen. The network interface connections and means to facilitate such a connection is described in both FIG. 2 and FIG. 3. The social networking routine session ends at the termination of the phone call between the chosen social networking site users and this user.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A communications portal system for one or more contact centers each having an associated user interface configured as an interactive voice response (IVR) system that provides service functionalities, comprising:

a network gateway configured to logically connect to a user device and the one or more contact centers, wherein the network gateway includes a first network signaling interface for communicating over a first type of telecommunication network and a second network signaling interface for communicating over a second type of telecommunication network;

a reverse automation gateway configured to logically connect to the network gateway, a first contact center with an associated first user interface, and a second contact center with an associated second user interface, wherein the reverse automation gateway stores a first emulator program for interacting with the first contact center and a second emulator program for interacting with the second contact center, and wherein the reverse automation gateway is configured to execute the first emulator program based on an input associated with the user device to generate an output for interacting with the first contact center using the first user interface; and a user interface aggregation matrix configured to operate at the user device to transform an input from the user device to a unified input that can be used by the first emulator program and second emulator program.

2. The system of claim 1, wherein the first emulator program is configured to hold a call position in a waiting queue of the first contact center on behalf of a user.

3. The system of claim 1, wherein the first emulator program is receptive to outputs from the first contact center and is configured to generate a corresponding response to be transmitted to the user device through the network gateway.

4. The system of claim 3, wherein the response transmitted to the user device is in a predetermined format particular to the user device.

5. The system of claim 3, wherein the response is transmitted to the user device in real-time.

6. The system of claim 3, wherein the response is transmitted to the user device in non real-time.

7. The system of claim 1, wherein the network gateway is logically connected to the one or more contact centers over an emulated inbound toll free network.

8. The system of claim 1, wherein:

the one or more contact centers are behind an enterprise firewall; and the communications portal system is logically connected to the one or more contact centers from outside the enterprise firewall.

9. The system of claim 1, further comprising:

a profile associated with a user, the profile including a first persona defined by one or more configuration attributes;

wherein the first emulator program is at least partially regulated by the one or more configuration attributes.

10. The system of claim 9, wherein a first one of the configuration attributes is selected from a group consisting of: an account identifier, contact identifiers, a user device identifier, and an external account identifier.

11. The system of claim 10, wherein a second one of the configuration attributes defines an extent to which the first one of the configuration attributes is transmitted to the first contact center.

12. The system of claim 1, further comprising:

a security module connected to the network gateway and the reverse automation gateway, wherein the security module restricts access to the first emulator program prior to an authentication by a user.

13. The system of claim 12, wherein the authentication includes transmitting a biometric identifier from the user device to the security module.

14. The system of claim 1, further comprising:

a database in communication with the reverse automation gateway and the user interface aggregation matrix, wherein data associated with the reverse automation gateway and data associated with the user interface aggregation matrix are stored in the database.

15. The system of claim 1, further comprising:

a media server connected to the network gateway, the media server including one or more multimedia content transferable to the user device for playback thereon.

16. The system of claim 15, wherein the multimedia content is selected from a group consisting of: call progress sounds, music on hold, and status messages.

17. The system of claim 1, wherein the network gateway is configured to logically connect to the user device over a network selected from a group consisting of: a mobile telephone switch office network (MTSO), a public switched telephone network (PTSN), an Internet Protocol network (IP), a cable television network, an IP television network, a satellite network, and a multimedia network.

18. The system of claim 1, wherein the user device is selected from a group consisting of: a web browser, a smart phone, a telephone, a Voice over IP-based telephone, and a set-top television box.

19. The system of claim 1, wherein the first contact center is selected from a group consisting of: a business website and a social networking website.

20. The system of claim 1, wherein the user interface aggregation matrix includes a communication plugin that defines a communications protocol which the user device uses to communicate with a terminal device protocol server.

21. The system of claim 1, wherein the user interface aggregation matrix includes a security plugin that defines rules and protocols over which the system communicates with a security server.

22. The system of claim 1, wherein the user interface aggregation matrix includes a vendor plugin for arranging and selecting vendor-based connections by a user.

23. The system of claim 1, wherein the user interface aggregation matrix includes a persona plugin for configuring, arranging, and selecting a persona defined by attributes of a relationship between a user and a vendor.

24. The system of claim 1, wherein the user interface aggregation matrix one or more plugins includes a social plugin for arranging and selecting a social-networking-site-based connections by a user.

* * * * *